(12) United States Patent
Nakatake et al.

(10) Patent No.: US 12,406,545 B2
(45) Date of Patent: Sep. 2, 2025

(54) PAPER SHEET TRANSPORT SYSTEM AND RESTORATION METHOD

(71) Applicant: JAPAN CASH MACHINE CO., LTD., Osaka (JP)

(72) Inventors: Kazuo Nakatake, Osaka (JP); Masaaki Ichikawa, Osaka (JP); Hirokazu Arai, Osaka (JP)

(73) Assignee: JAPAN CASH MACHINE CO., LTD., Osaka (JP)

( * ) Notice: Subject to any disclaimer, the term of this patent is extended or adjusted under 35 U.S.C. 154(b) by 300 days.

(21) Appl. No.: 18/043,957

(22) PCT Filed: Aug. 17, 2021

(86) PCT No.: PCT/JP2021/030055
§ 371 (c)(1),
(2) Date: Mar. 3, 2023

(87) PCT Pub. No.: WO2022/054509
PCT Pub. Date: Mar. 17, 2022

(65) Prior Publication Data
US 2023/0316843 A1     Oct. 5, 2023

(30) Foreign Application Priority Data
Sep. 8, 2020 (JP) ................................ 2020-150572

(51) Int. Cl.
    *G07D 11/16*     (2019.01)
    *A63F 7/02*     (2006.01)
    (Continued)

(52) U.S. Cl.
    CPC ............ *G07D 11/16* (2019.01); *B65G 51/16* (2013.01); *B65G 54/025* (2013.01); *A63F 7/022* (2013.01); *G07D 2211/00* (2013.01)

(58) Field of Classification Search
CPC .................................................. B65G 54/025
See application file for complete search history.

(56) References Cited

U.S. PATENT DOCUMENTS

| | | | | |
|---|---|---|---|---|
| 1,719,231 A | * | 7/1929 | McLaren | B65G 54/02 104/156 |
| 4,754,691 A | * | 7/1988 | Rogerson | F15B 15/086 91/410 |

(Continued)

FOREIGN PATENT DOCUMENTS

| | | |
|---|---|---|
| JP | 2019-101172 A | 6/2009 |
| JP | 2010-024058 A | 2/2010 |
| JP | 2016-160038 A | 5/2016 |

OTHER PUBLICATIONS

WIPO, Japan International Search Authority, International Search Report (with English Translation) and Written Opinion mailed Sep. 21, 2021in International Patent Application No. PCT/JP2021/030055, 10 pages.

*Primary Examiner* — William R Harp
(74) *Attorney, Agent, or Firm* — MASUVALLEY & PARTNERS; Peter Martinez

(57) ABSTRACT

The present invention includes a configuration to move a transport body (500) in conjunction with movement of a moving body (200) due to repulsion applied between respective magnetic materials (213) and (523) when the moving body and the transport body are in a close location relation, and, when the moving body separates from a range of the close location relation due to halfway stop of the transport body, the transport body is moved in the opposite direction to stop at a predetermined end portion stop position, subsequently only the moving body is caused to travel in a direction further away from the transport body, and the moving body is returned into the range of the close location relation by causing the moving body to travel toward the (Continued)

transport body at a speed resistible against the repelling force.

2 Claims, 32 Drawing Sheets

(51) Int. Cl.
*B65G 51/16* (2006.01)
*B65G 54/02* (2006.01)

(56) References Cited

U.S. PATENT DOCUMENTS

| | | | | |
|---|---|---|---|---|
| 5,388,526 | A * | 2/1995 | Imai | B65G 54/025 |
| | | | | 104/138.1 |
| 6,267,058 | B1 * | 7/2001 | Schlienger | B60V 3/04 |
| | | | | 104/138.1 |
| 6,279,485 | B1 * | 8/2001 | Schlienger | B65G 54/025 |
| | | | | 104/138.1 |
| 6,360,670 | B1 * | 3/2002 | Schlienger | B61C 11/06 |
| | | | | 104/283 |
| 2019/0163123 | A1 | 5/2019 | Kanemitsu et al. | |

* cited by examiner

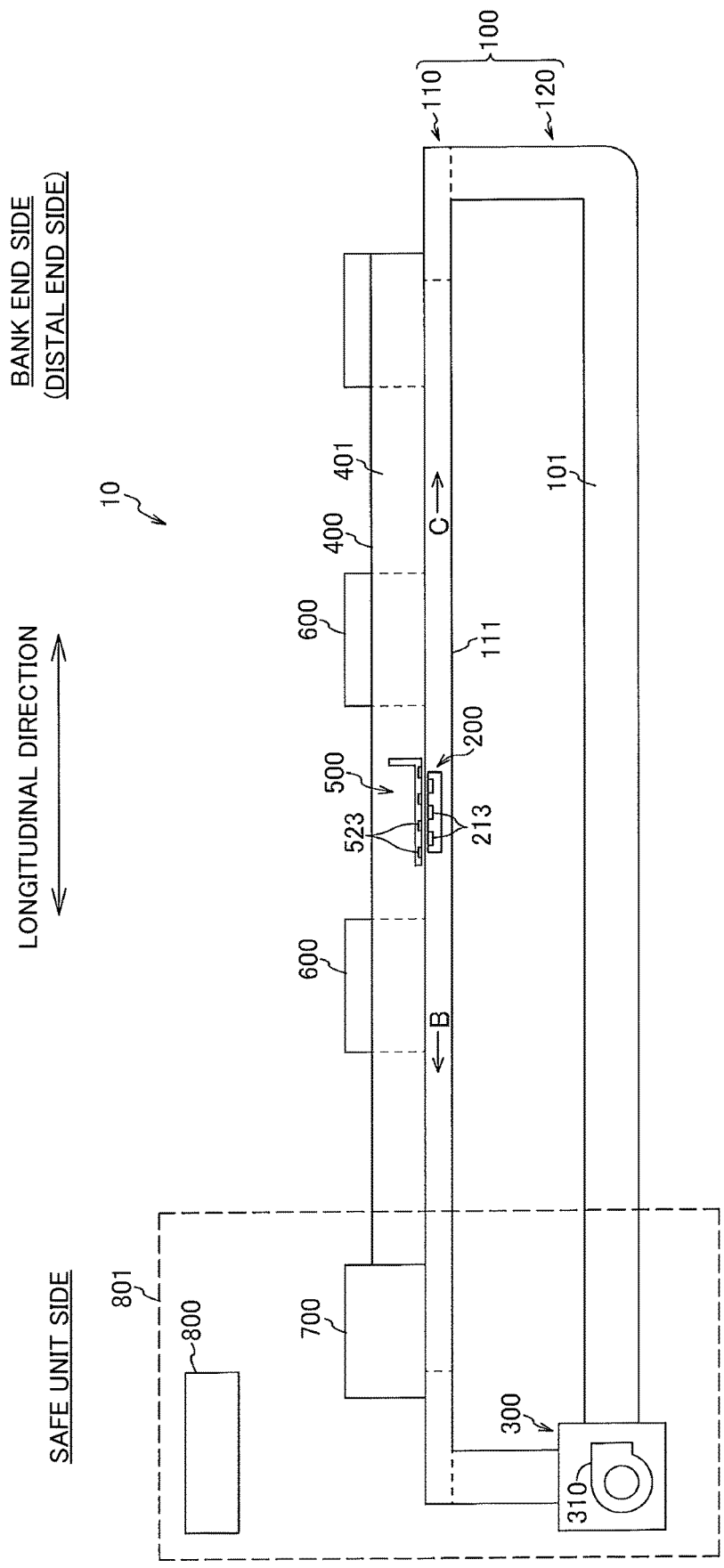

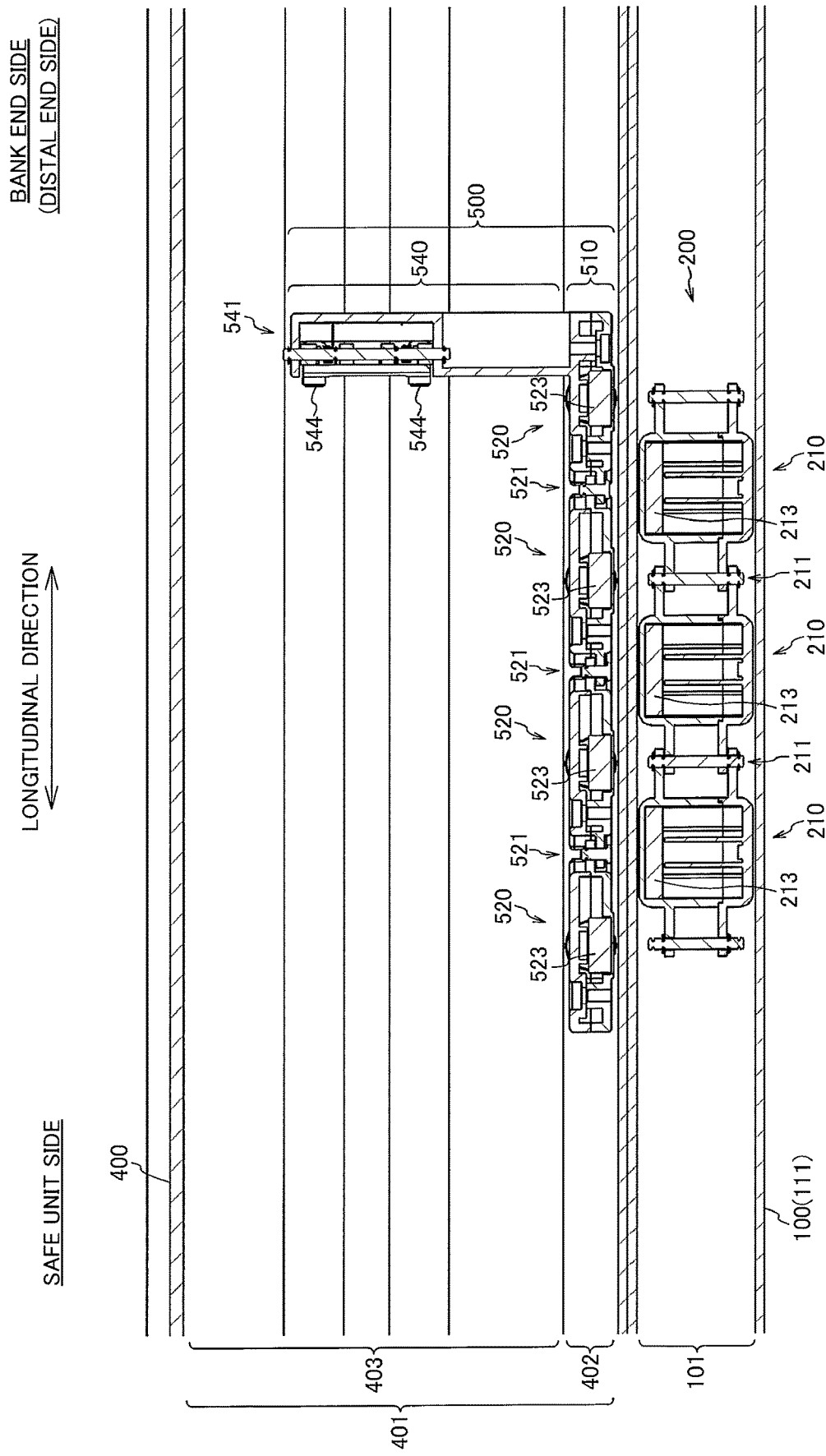

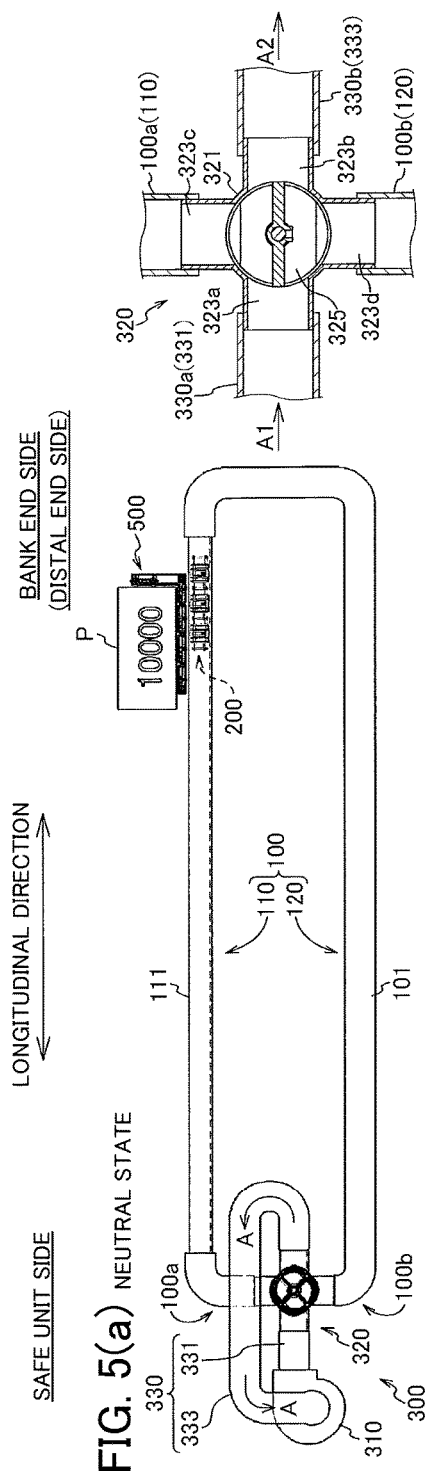
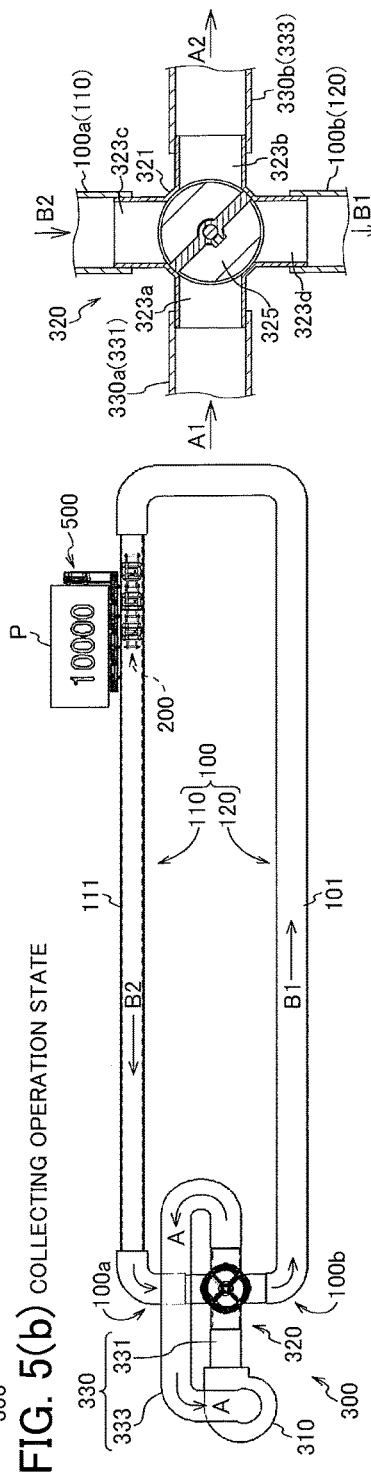
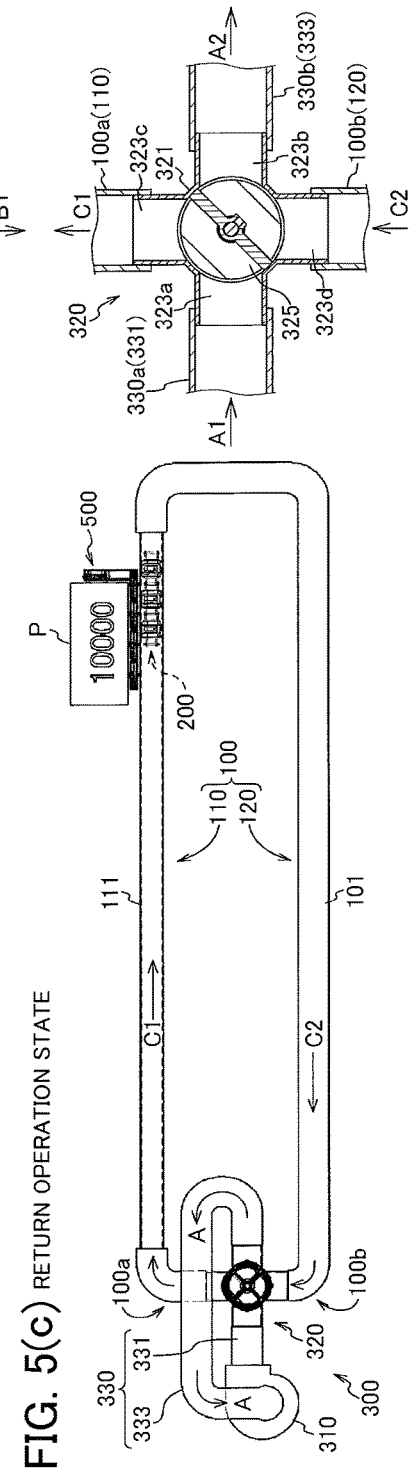

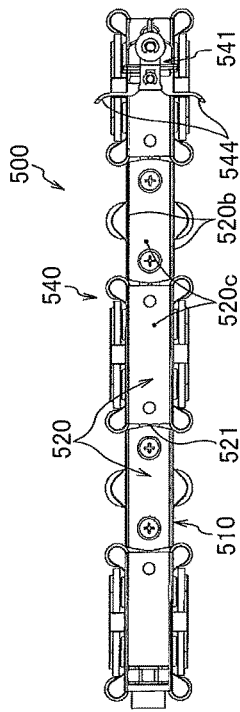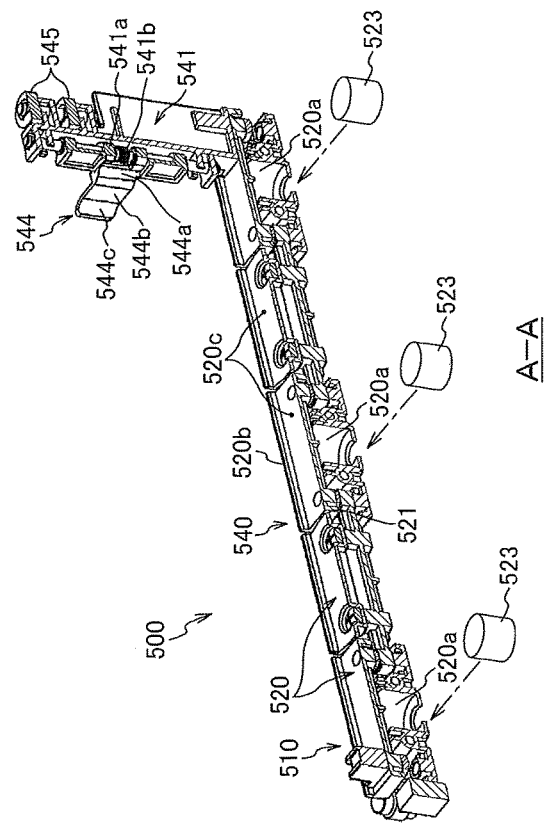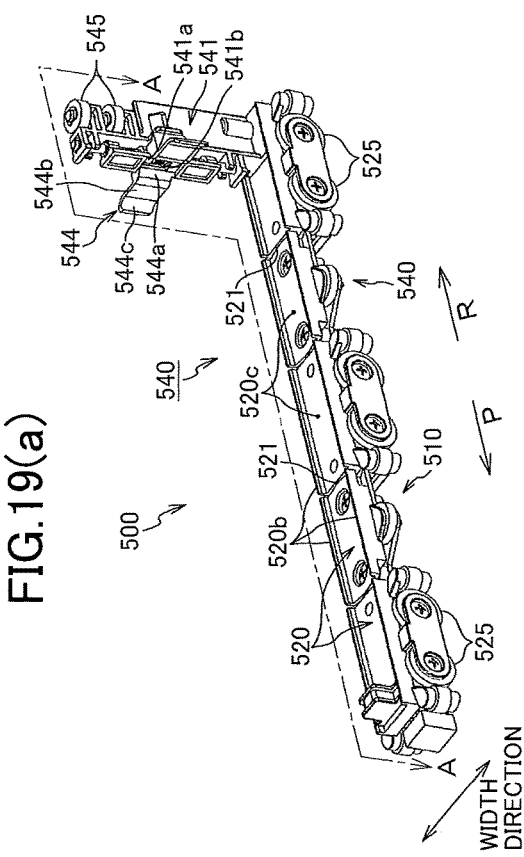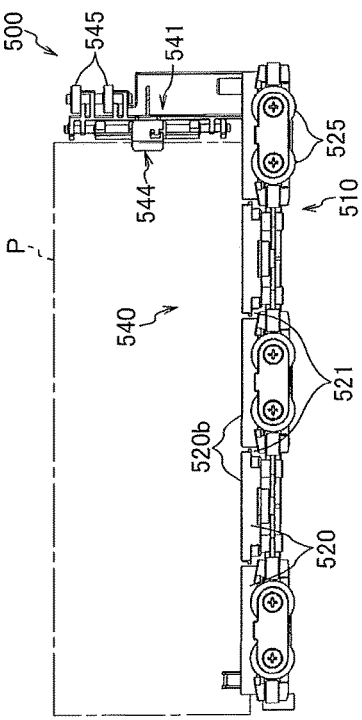

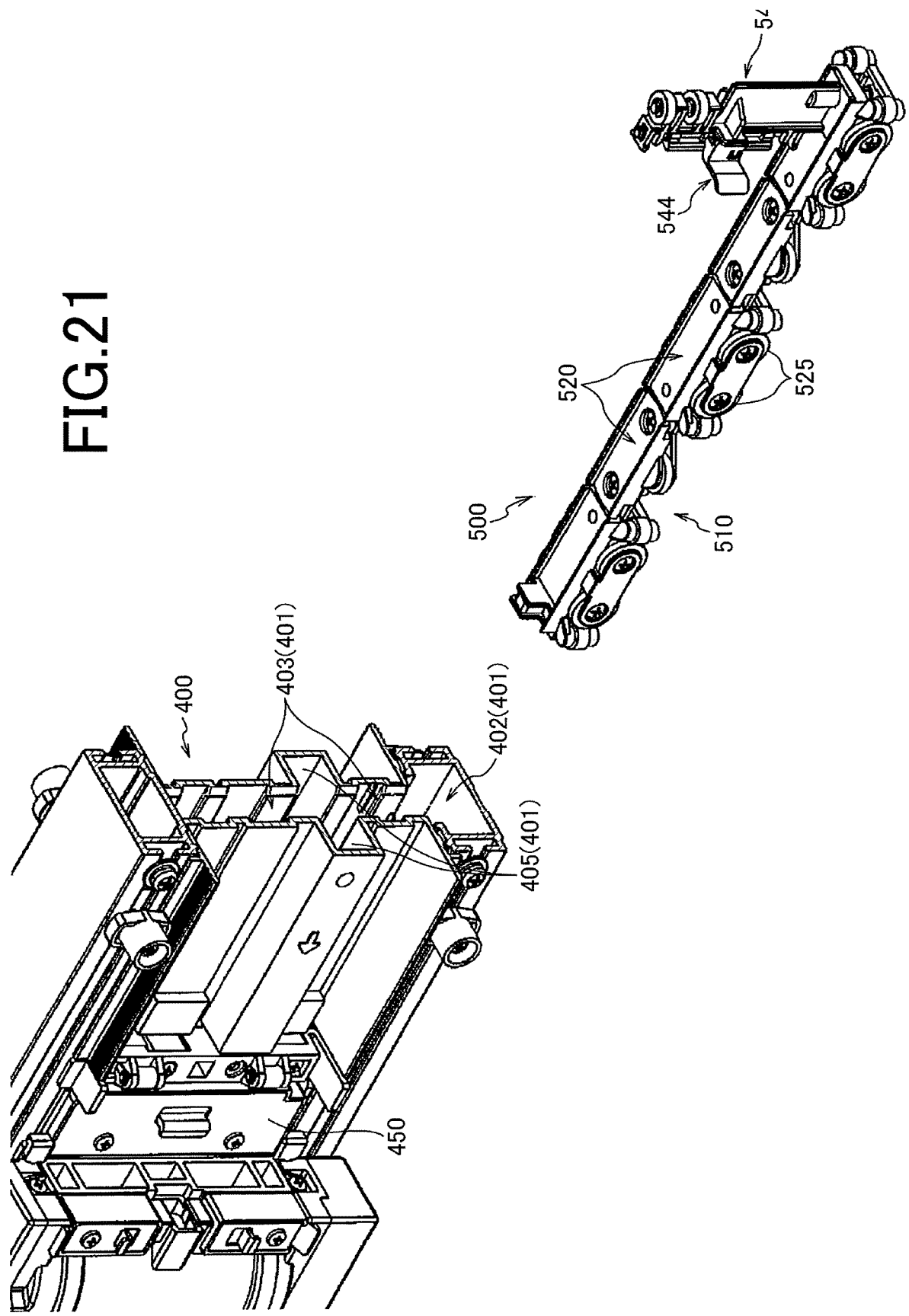

BANK END UNIT

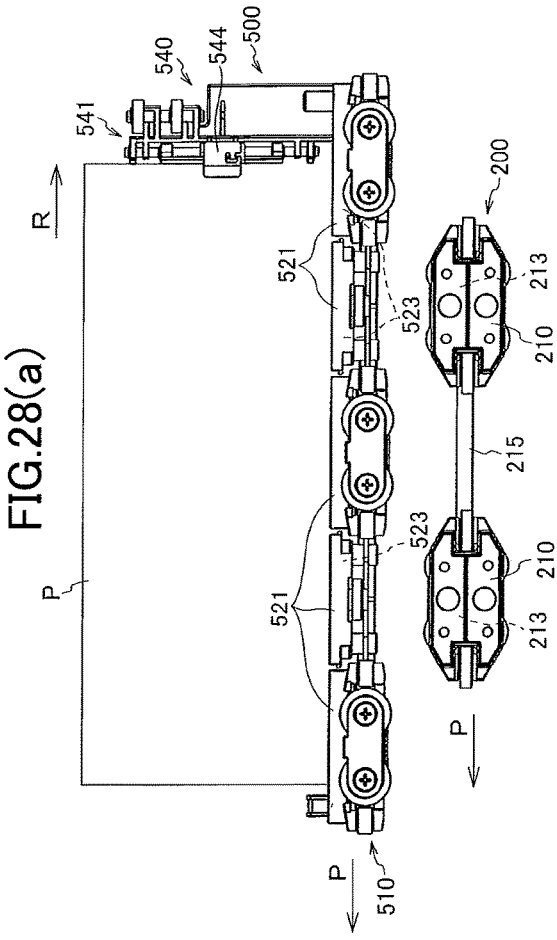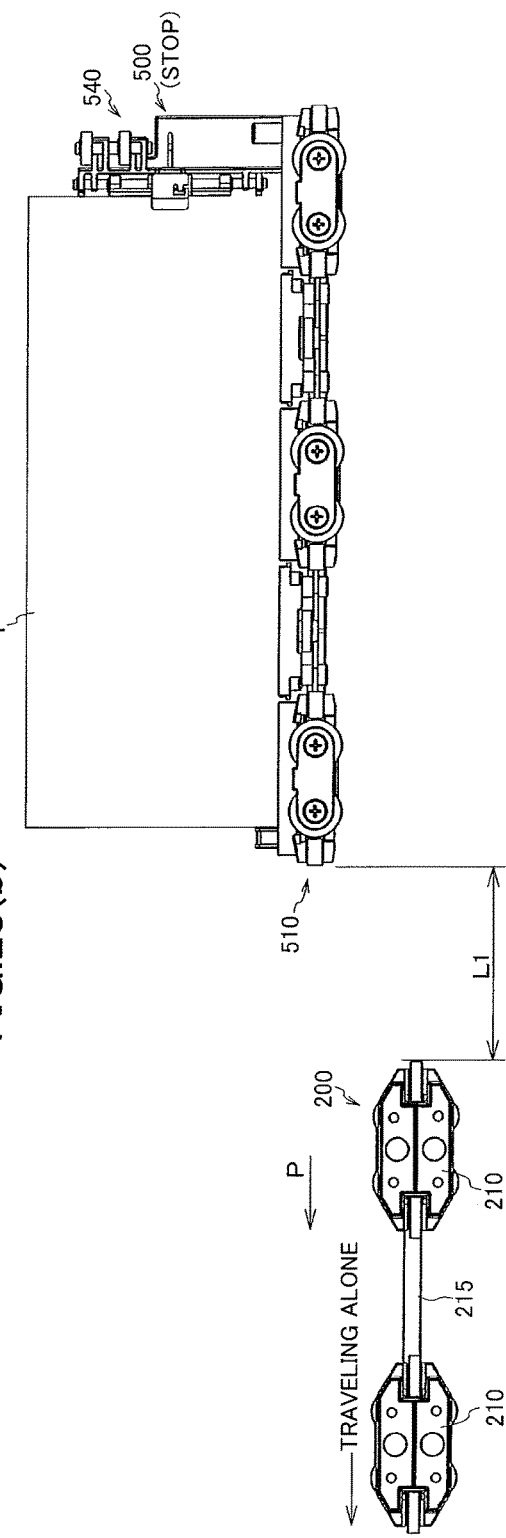

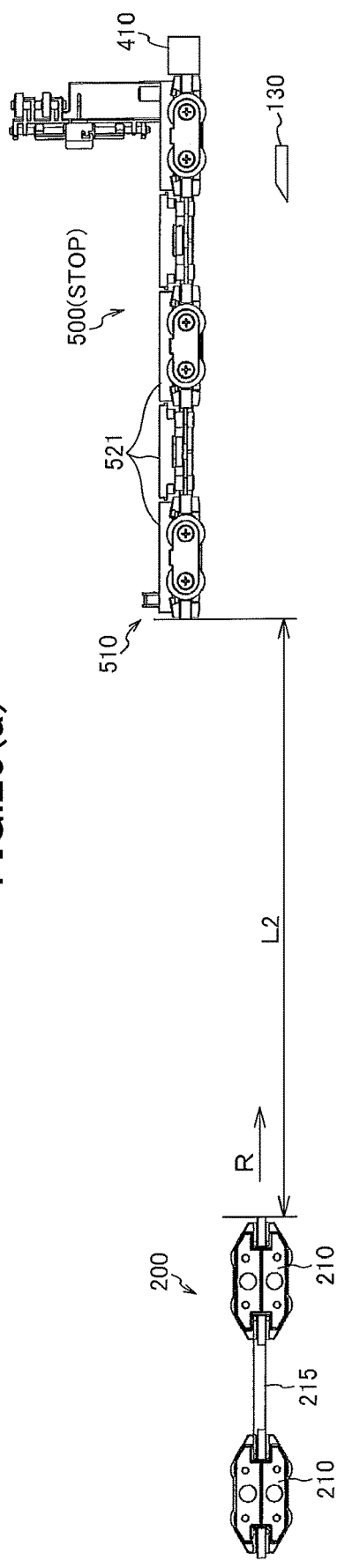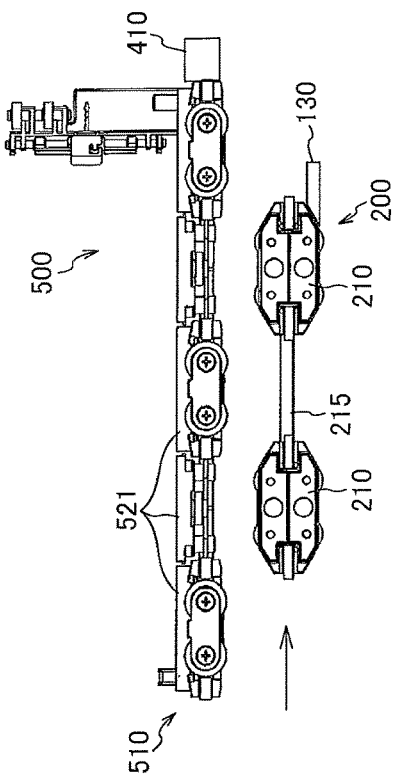

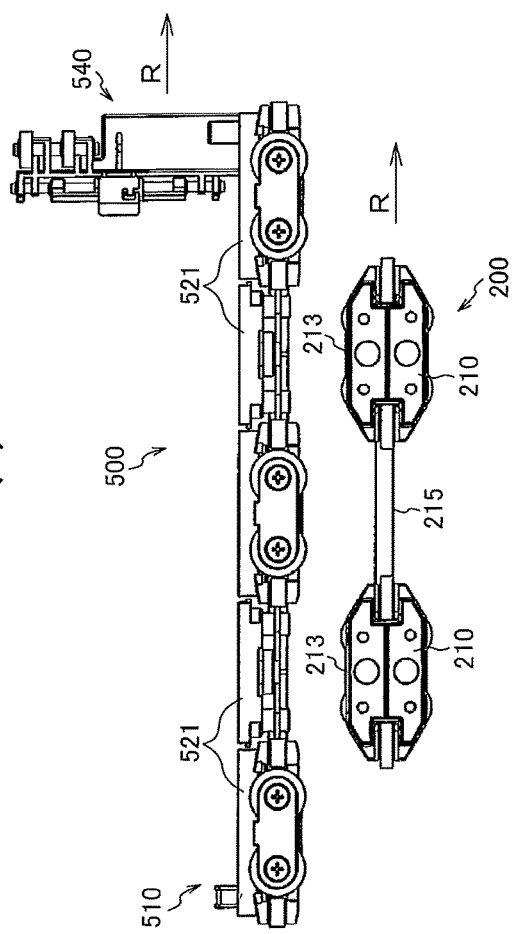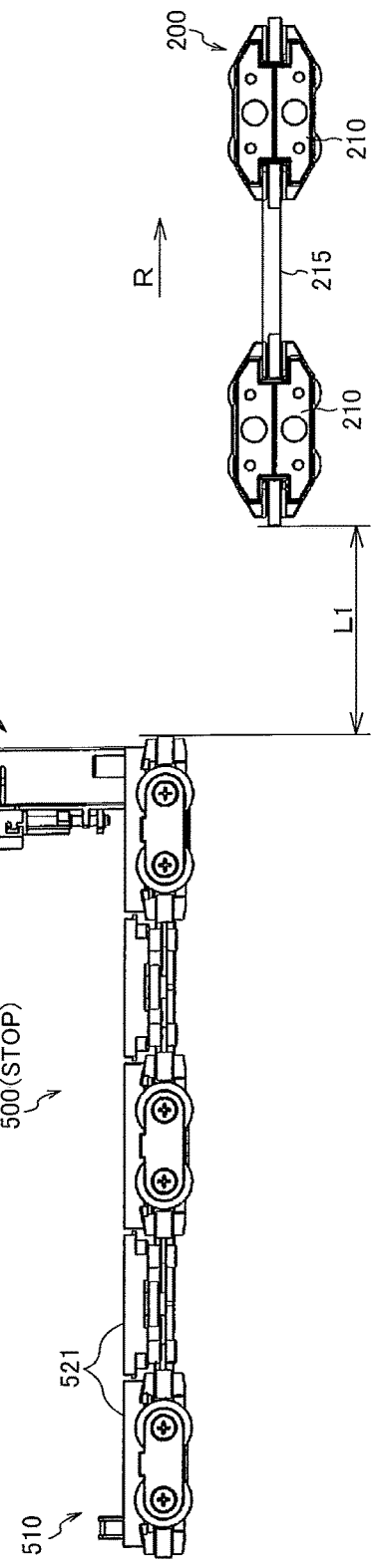

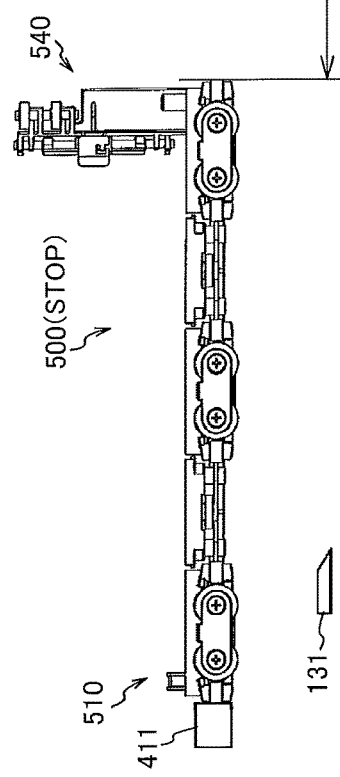
FIG.32(a)
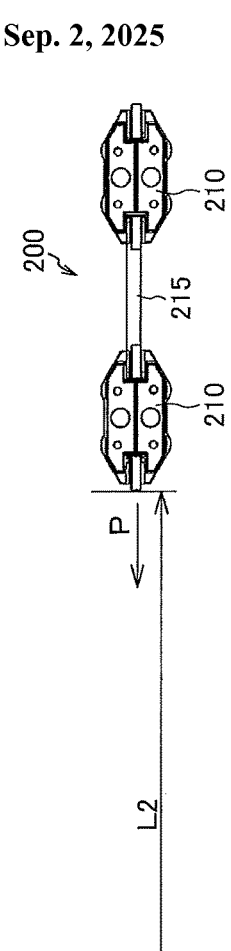
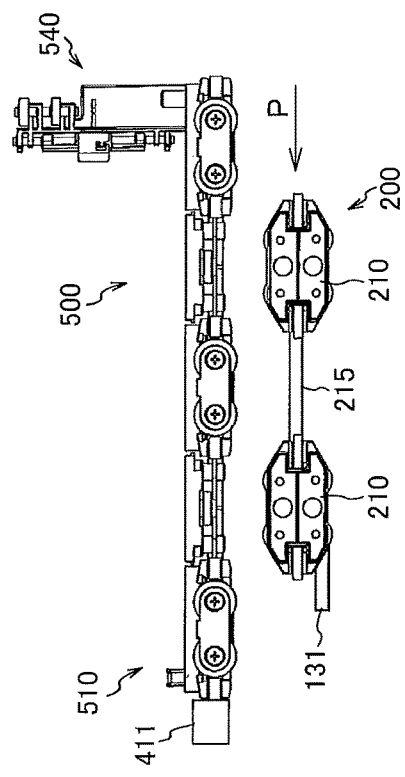
FIG.32(b)

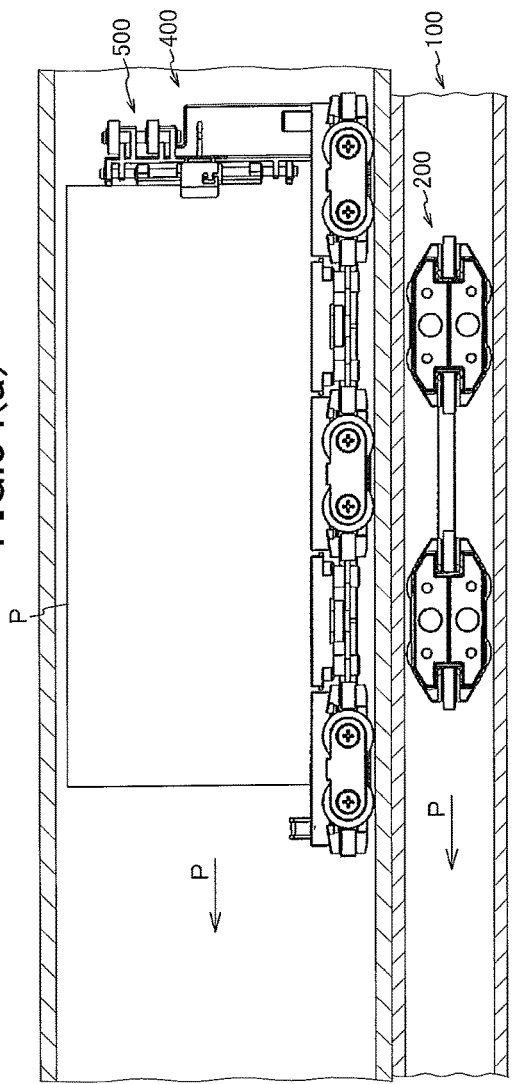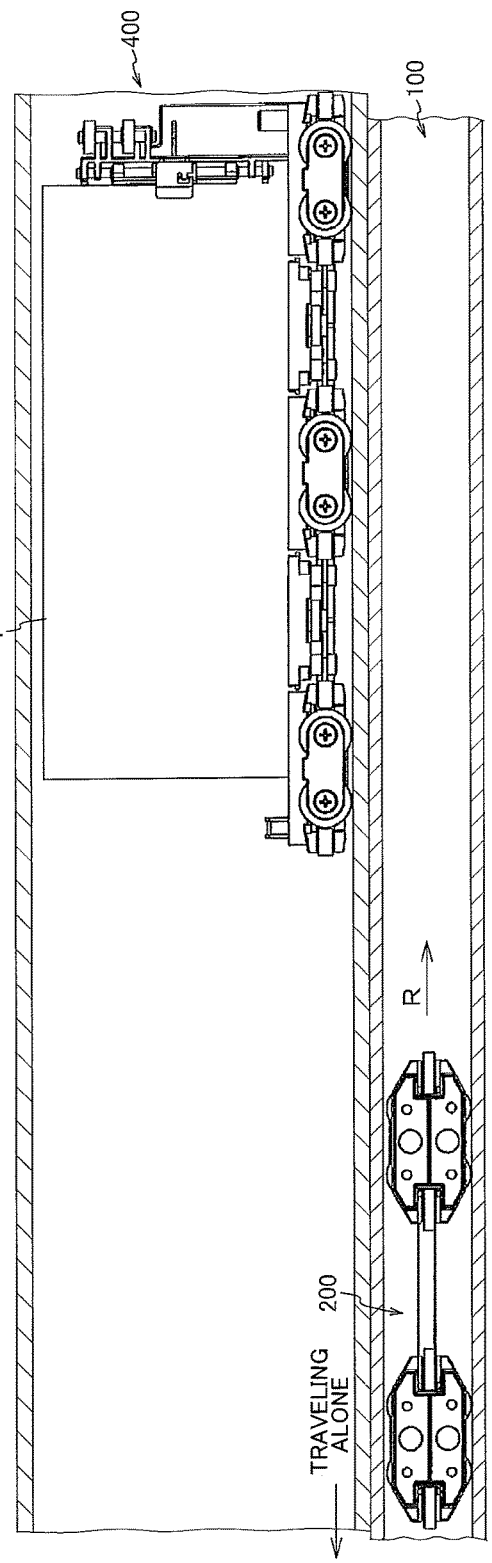

PAPER SHEET TRANSPORT SYSTEM AND RESTORATION METHOD

RELATED APPLICATIONS

This application is the U.S. National Phase of and claims priority to International Patent Application No. PCT/JP2021/030055, International Filing Date Aug. 17, 2021, entitled Paper Sheet Transport System, And Restoration Method; which claims benefit of Japan Application No. 2020-150572 filed Sep. 8, 2020; both of which are incorporated herein by reference in their entireties.

FIELD

The present invention relates to a transport system for paper sheets such as banknotes, and a restoration method thereof.

BACKGROUND

In a game hall where various types of game machines such as pachinko machines or pachislot (pachinko-slot) machines are installed, game media dispensing devices for renting pachinko balls or tokens being game media to players according to a money amount of banknotes input through a banknote inlet are placed adjacent to the game machines. Various banknote transport devices are developed and proposed to enable the game media dispensing devices to safely and smoothly transport received banknotes to a safe.

Patent Literature 1 discloses a paper sheet transport mechanism that causes a moving body to travel with an air flow and that causes a banknote transport body to travel with a magnetic force in conjunction with movement of the moving body. In the course of moving on a moving route along game media dispensing devices, the transport body transports banknotes received by each of the game media dispensing devices to a safe while sequentially collecting and retaining the banknotes. Since no mechanical driving means such as a motor, a gear, and a transport belt are required to cause the moving body and the transport body to travel, the durability of members constituting the transport mechanism can be increased and the running cost of the transport mechanism can be reduced.

CITATION LIST

Patent Literature

Patent Literature 1: Japanese Patent Application Laid-open No. 2019-101172

SUMMARY

Technical Problem

However, the paper sheet transport mechanism described in Patent Literature 1 has a configuration to move the transport body in conjunction with the moving body with a repelling force applied thereto only when a transport body magnetic material is in a predetermined close location relation with a moving body magnetic material. Therefore, when the transport body is prevented from moving due to a cause such as contact of banknotes on the transport body with an obstacle during a reciprocating operation and suddenly stops, a situation where the transport body cannot move from the stopped position while only the moving body that is not prevented from moving separates from the transport body and moves ahead occurs.

FIG. 34(a) illustrates a state where a moving body 200 in an air blowing tube 100 and a transport body 500 in a transport body route 400 are in a normal close location relation in which these bodies can move in conjunction with each other, and FIG. 34(b) illustrates a state where only the moving body 200 moves ahead due to stop of the transport body 500. In the example of FIG. 34(b), some banknotes P on the transport body have a deformed portion such as a creased portion, and this deformed portion interferes with an inner wall of the transport body route 400, particularly, an inner wall of a curved route during movement of the transport body to cause jam of the whole banknotes and resists the travel of the transport body to stop the transport body.

In this case, at the time when stop of the transport body that is supposed to be traveling is detected, the operation of the entire transport mechanism including the moving body is stopped to prevent damages of the banknotes. Thereafter, an operator removes the banknotes from the transport body and a restoration operation to return the moving body to a location proximate to the transport body illustrated in FIG. 34(a) is subsequently performed.

In the restoration operation, the moving body separated from the transport body as in FIG. 34(b) needs to be moved back to return to the normal close location as in FIG. 34(a). This return operation is an operation of moving the moving body back with an air flow or by human hands.

However, when the moving body 200 is moved in a return direction as indicated by an arrow R in FIG. 34(b) to be brought close to the transport body 500 stopping halfway on the transport body route 400, the transport body recedes in the direction R due to repulsion based on a magnetic force before the moving body catches up with the transport body, and the moving body 200 can never crawl immediately under the transport body. Even when the moving body at the location illustrated in FIG. 34(b) is attempted to be brought close to the transport body and to enter the location immediately under the transport body in a state where the transport body is stopped in an unmovable manner, it is difficult to slip (dock) the moving body under the transport body because the repelling force of the magnet is strong.

The present invention has been achieved in view of the circumstances described above, and has an object to provide a paper sheet transport system that moves a transport body including a magnetic material in conjunction with a moving body with a repelling force between the transport body and a magnetic material mounted on the moving body, and that can effectively return (restore) the moving body to a location proximate to the transport body when a situation in which only the moving body separates from the transport body and moves ahead because the transport body stops during traveling in a predetermined direction, and movement in conjunction with each other with a magnetic force is disabled occurs, and a restoration method thereof.

Solution to Problem

In order to achieve the above object, the present invention comprises an air flow generating device, an air blowing tube that forms therein a flow path of an air flow generated by the air flow generating device, a switching unit that controls switching of directions of an air flow in the air blowing tube, a controlling unit that controls the air flow generating device and the switching unit a moving body that travels inside the air blowing tube while receiving an air flow flowing within the air blowing tube, a transport body route having at least a portion arranged along the air blowing tube to be adjacent to the air blowing tube and a transport body configured to be able to retain paper sheets and traveling inside the transport body route, wherein the moving body includes a moving body magnetic material, and the transport body includes a transport body magnetic material, a configuration to move the transport body in conjunction with movement of the moving body due to repulsion based on a magnetic force applied between the moving body magnetic material and the transport body magnetic material when the moving body magnetic material and the transport body magnetic material are in a close location relation is included, and when the moving body separates from a range of the close location relation due to halfway stop of the transport body in a process of the moving body moving the transport body in the close location relation in a predetermined direction, the controlling unit causes the moving body to move the transport body in an opposite direction to an original travel direction to stop the transport body at a predetermined end portion stop position, subsequently causes only the moving body to travel in a direction further away from the transport body to temporarily stop the moving body, and then returns the moving body into the range of the close location relation by causing the moving body to travel toward the transport body at a speed resistible against the repelling force.

Advantageous Effects of Invention

According to the present invention, it is possible to effectively restore the moving body to a location proximate to the transport body when a situation in which only the moving body separates from the transport body and moves ahead because the transport body stops halfway during traveling in a predetermined direction, and movement in conjunction with each other with a magnetic force is disabled occurs.

BRIEF DESCRIPTION OF DRAWINGS

FIG. 3 is a schematic diagram illustrating a schematic configuration of a banknote transport system according to a first invention.

FIG. 4 is a vertical sectional view of a moving body, an air blowing tube including the moving body, a transport body, and a transport tube including the transport body in a case in which the moving body and the transport body repel each other due to a magnetic force.

FIGS. 5(a) to 5(c) are schematic diagrams illustrating a relation between the air blowing tube and an air-blow control unit according to one embodiment of the first invention.

FIGS. 19(a), 19(b), 19(c), and 19(d) are an exterior perspective view, a front view, a plan view, and a sectional view along A-A in FIG. 19(a) of a transport body 500 in a state where collecting members (collecting pawls) are opened.

FIG. 21 is a partial sectional view illustrating a location relation between the transport tube 400 and the transport body 500.

FIGS. 28(a) and 28(b) are a front view illustrating a state where the moving body causes the transport body to normally travel for collection of banknotes, and a front view illustrating a state where the moving body solely travels ahead because the transport body has stopped.

FIGS. 29(a) and 29(b) are front views for explaining a control procedure for restoration.

FIGS. 31(a) and 31(b) are a front view illustrating a state where the moving body causes the transport body to normally travel to return to the initial position after collection of banknotes and transfer of banknotes to the safe unit are completed, and a front view illustrating a state where the moving body solely travels ahead because the transport body has stopped.

FIGS. 32(a) and 32(b) are front views for explaining a control procedure for restoration.

FIG. 34(a) is a diagram illustrating a state where the moving body in the air blowing tube and the transport body in a transport body route are in a normal close location relation, and FIG. 34(b) is a diagram illustrating a state where only the moving body moves ahead due to halfway stop of the transport body.

DESCRIPTION OF EMBODIMENTS

Figure 1:
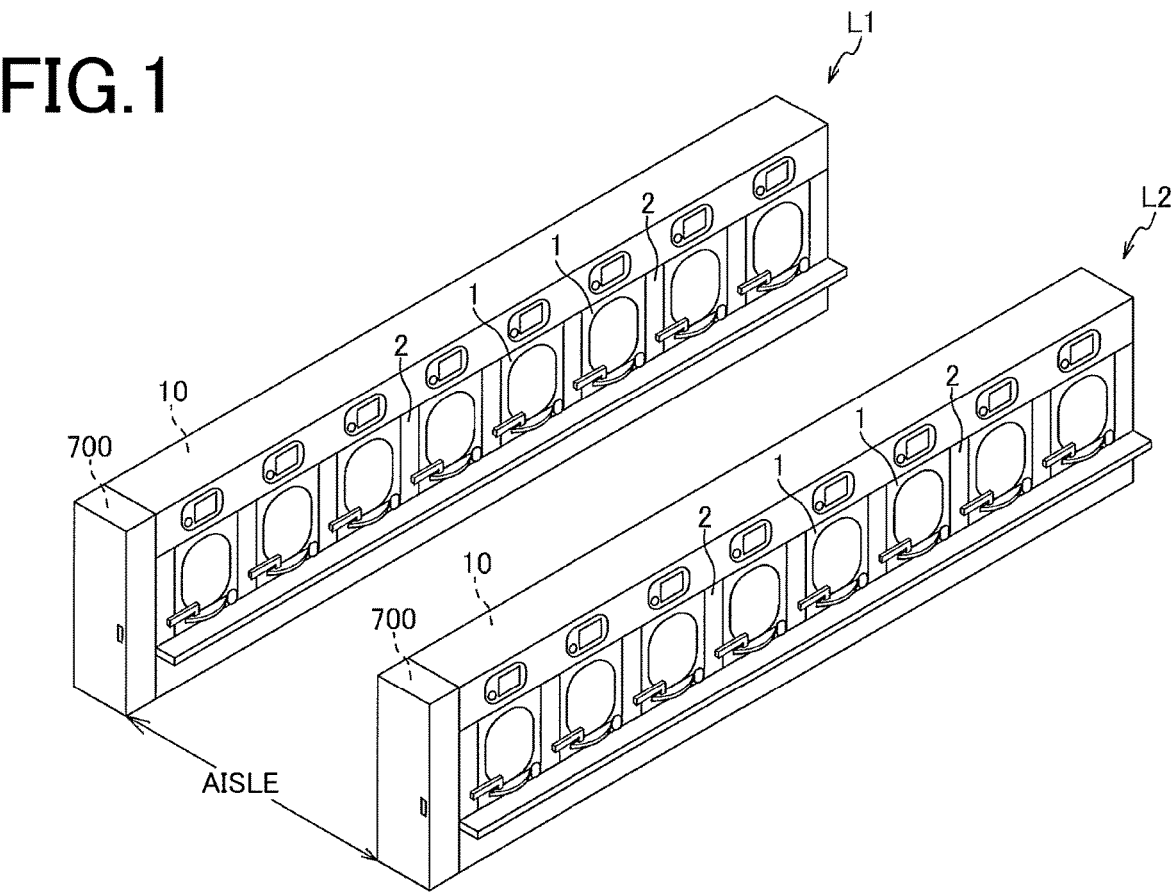
FIG. 1 is a perspective view illustrating a schematic configuration of bank facilities including a plurality of game machines.

The present invention will be described below in detail with embodiments illustrated in the drawings. Constituent elements, types, combinations, shapes, and relative arrangements described in the following embodiments are merely explanatory examples, and are not intended to limit the scope of the present invention solely thereto unless otherwise specified.

Embodiments of the present invention are described below in detail.

A. Paper Sheet Transport System According to First Invention

A basic configuration of a paper sheet transport system according to a first invention, and an operation thereof are described below.

The paper sheet transport system is installed on bank facilities in a game hall where various types of game machines such as pachinko machines or pachislot (pachinko-slot) machines are installed. While banknotes are mainly described as an example of paper sheets in the following embodiments, the present invention is also applicable to paper sheets (sheets) other than banknotes, including securities such as cash vouchers and gift certificates, and cards.

[Schematic Configuration of Bank Facilities]

FIG. 1 is a perspective view illustrating a schematic configuration of bank facilities including a plurality of game machines.

Game machines 1 are installed on bank facilities L (L1, L2, . . . ) and eight game machines 1 are arranged back to back on each of two opposing side surfaces of each of the bank facilities L, that is, a total of 16 game machines 1 are arranged back to back. An aisle on which players or clerks of the game hall walk is provided between the bank facilities L and a chair (not illustrated) is provided for each of the game machines 1 on the aisles.

A sandwiched machine 2 is installed for each of the game machines 1 on the bank facilities L. The sandwiched machine 2 includes a banknote inlet (a banknote input part) that receives input banknotes, and a game media dispensing device that dispenses a number of pachinko balls corresponding to the amount of input banknotes, and the like. A banknote transport system 10 that transports banknotes inserted through the sandwiched machines 2 to a safe unit 700 placed at one end portion of the associated bank facility L is installed in each of the illustrated bank facilities L.

Figure 2:
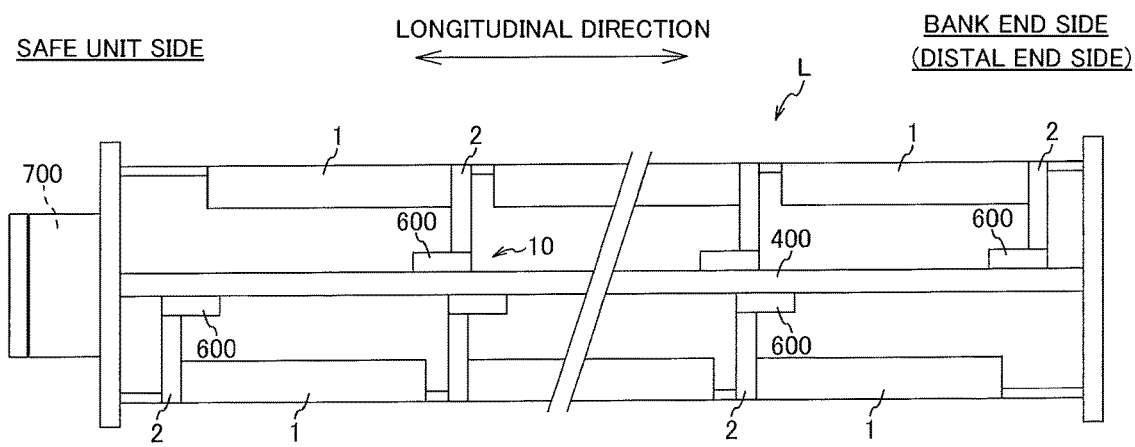
FIG. 2 is a plan view illustrating a schematic configuration of the bank facility including a plurality of the game machines.

FIG. 2 is a plan view illustrating a schematic configuration of the bank facility including a plurality of the game machines.

The banknote transport system 10 installed in each of the bank facilities L includes receiving units (banknote receiving devices) 600 that each receive banknotes inserted from the banknote inlet of the associated sandwiched machine 2 therein, a transport tube 400 that extends in a longitudinal direction of the bank facility L (an array direction of the game machines 1) and that transports the banknotes received by the receiving units 600, the safe unit 700 that is arranged at one end of the transport tube 400, and the like.

[Schematic Configuration of Banknote Transport System]
<Overall Outline>

FIG. 3 is a schematic diagram illustrating a schematic configuration of the banknote transport system. The banknote transport system (a paper sheet transport mechanism) 10 according to one embodiment of the first invention is characterized in transporting banknotes using an air flow and a magnetic force.

The banknote transport system 10 includes an air blowing tube 100 that forms a flow path (an air flow path 101) of a gas, a moving body 200 that travels (moves) inside the air blowing tube 100 while receiving an air flow flowing in a predetermined direction within the air blowing tube 100, an air-blow control unit 300 that controls the air flow flowing inside the air blowing tube 100, the transport tube 400 (a transport path 401) that has at least a portion arranged along the air blowing tube 100 to be adjacent to the air blowing tube 100, and a transport body 500 that is configured to be able to retain banknotes (paper sheets) and that travels (moves) inside the transport tube 400. The transport tube 400 forms the transport path 401 (a banknote (paper sheet) transport route and a transport space) for banknotes.

The moving body 200 includes a moving body magnetic material (moving body magnets 213), and the transport body 500 includes a transport body magnetic material (transport body magnets 523). At least one of the moving body magnetic material and the transport body magnetic material is formed of a magnet.

The banknote transport system 10 includes the receiving units 600 that receive banknotes input from outside and keep the banknotes at predetermined locations in the transport tube 400, respectively, the safe unit 700 that includes a banknote accommodating part that accommodates therein banknotes transported by the transport body 500, and a management unit (controlling unit) 800 that controls the components constituting the banknote transport system 10.

In the present example, the air-blow control unit 300 and the safe unit 700 are accommodated in a body 801 that has the management unit 800 accommodated therein.

The banknote transport system 10 is characterized in moving in an advancing/retracting manner the moving body 200 arranged in the air blowing tube 100 in the longitudinal direction of the air blowing tube 100 with the air flow flowing inside the air blowing tube 100, and in moving the transport body 500 arranged in the transport tube 400 along the longitudinal direction of the air blowing tube 100 with a magnetic force acting between the transport body 500 and the moving body 200. That is, the banknote transport system 10 is characterized in moving the transport body 500 in conjunction with movement of the moving body 200 receiving the air flow due to attraction and/or repulsion based on a magnetic force acting between the moving body magnets 213 and the transport body magnets 523.

<Outline of Components>

The air blowing tube 100 includes a moving route part 111 in at least a portion in the longitudinal direction, on which the moving body 200 travels along the longitudinal direction of the air blowing tube 100. The moving route part 111 is arranged in parallel and adjacently to the transport tube 400.

The moving body 200 moves inside the air blowing tube 100 while receiving an air flow flowing in a predetermined direction within the air blowing tube 100. The moving body magnets 213 mounted on the moving body 200 provide a repelling action and/or an attracting action due to a magnetic force to the transport body 500. The moving body 200 moves the moving body 200 in conjunction with its own movement due to the magnetic force.

The air-blow control unit 300 includes a blower (an air flow generating device) 310 that generates (produces) an air flow in a predetermined direction inside the air blowing tube 100 and that can change the flow volume and the flow speed of the air flow. The air-blow control unit 300 alternately generates an air flow in a first direction (a banknote collecting direction and an arrow-B direction) and an air flow in a second direction (a transport body returning direction and an arrow-C direction) being an opposite direction to the first direction inside the air blowing tube 100 to reciprocate the moving body 200 inside the air blowing tube 100.

The transport tube 400 forms a space through which banknotes and the transport body 500 move.

The transport body 500 receives the banknotes kept at predetermined locations in the transport path 401 to retain the banknotes in a standing manner, and moves inside the transport path 401 to transport the banknotes to the safe unit 700. The transport body magnets 523 mounted on the transport body 500 are subjected to the attracting action and/or the repelling action due to the magnetic force from the moving body magnets 213 included in the moving body 200. The transport body 500 moves inside the transport tube 400 in conjunction with the movement of the moving body 200 receiving the air flow.

When only the attracting force is to be applied between the moving body 200 and the transport body 500, both the magnetic materials mounted on the moving body 200 and the transport body 500 can be magnets, or one of the magnetic materials of the moving body 200 and the transport body 500 may be magnets and the other one may be a magnetic material such as iron. When only the repelling force is to be applied between the moving body 200 and the transport body 500, both the magnetic materials mounted on the moving body 200 and the transport body 500 are formed of magnets.

The receiving unit (the banknote receiving device) 600 receives banknotes inserted from the banknote inlet (a banknote inserting part) of the associated sandwiched machine 2 therein and keeps the banknotes at a predetermined location in the transport path 401. The receiving unit 600 is provided for each of the sandwiched machines 2. A plurality of the receiving units 600 are installed in the longitudinal direction of the transport tube 400 at a predetermined interval.

The safe unit 700 includes a banknote accommodating part that accommodates therein banknotes transported by the transport body 500, a drive mechanism that drives members related to accommodation of the banknotes in the banknote accommodating part, and the like.

The management unit (controlling unit) 800 controls operations of the components constituting the banknote transport system 10. The management unit 800 is configured to include a general computer device that includes a CPU (Central Processing Unit), a ROM (Read Only Memory), a RAM (Random Access Memory), and the like and in which these units are connected via a bus. The CPU is an arithmetic unit that controls the entire banknote transport system 10. The ROM is a nonvolatile memory that has a control program to be executed by the CPU, data, and the like stored therein. The RAM is a volatile memory to be used as a work area for the CPU. The CPU reads the control program stored in the ROM to load the control program into the RAM and execute the control program, so that various functions are realized.

[Detailed Configuration of Banknote Transport System]

Detailed configurations of the components of the banknote transport system according to the embodiment of the first invention are explained.

<Air Blowing Tube>

The air blowing tube is explained with reference to FIGS. 3 and 4.

FIG. 4 is a vertical sectional view of the moving body, the air blowing tube including the moving body, the transport body, and the transport tube including the transport body in a case in which the moving body and the transport body repel each other due to a magnetic force.

The air blowing tube 100 illustrated in FIG. 3 includes a first air blowing tube 110 including the moving route part 111, and a second air blowing tube 120 forming the air flow path 101 in an endless manner with the first air blowing tube 110 through a switching valve 325 (see FIG. 5), which will be described later.

Since the banknote transport system 10 moves the transport body 500 using a magnetic force, the moving route part 111 of the air blowing tube 100 includes a configuration that does not affect the travel of the moving body 200 and the travel of the transport body 500 based on the magnetic force. While it is desirable that the moving route part 111 is entirely formed of a non-magnetic material, the moving route part 111 may include a magnetic material in a portion within a range that does not affect the travel of the moving body 200 and the transport body 500.

The moving route part 111 includes a configuration (the thicknesses of the tube, the spacing between tubes, the shape thereof, and the like) that can apply a magnetic force between the moving body 200 arranged inside the moving route part 111 and the transport body 500 arranged inside the transport tube 400.

With the configuration of the air blowing tube 100 separate from and independent of the transport tube 400, an airtight flow path can be formed in the air blowing tube 100. Reduction in the transport force of the moving body 200 due to air leakage to outside of the air blowing tube 100 can be prevented. Furthermore, the blower 310 being relatively inexpensive and outputting low power can be adopted as a blower to be used to generate an air flow and reduction in the cost of the banknote transport system 10 can be realized. The air flow inside the air blowing tube 100 can be reliably controlled even when the air blowing tube 100 is elongated with an increase in the banknote transport distance. Since the moving body 200 is caused to travel with the air flow, the need to arrange a mechanical configuration such as a gear or a transport belt, lines, or electrical contacts inside the air blowing tube 100 is eliminated and the durability of the air blowing tube 100 and the moving body 200 arranged therein is increased. Furthermore, external air does not flow in the air flow path 101 airtightly configured, so that grit and dust in the external air are not drawn therein and the inside of the air flow path 101 can be kept clean.

<Moving Body>

It suffices that the moving body 200 has a shape and a configuration that enables movement in the air blowing tube 100 by being subjected to an air pressure.

As illustrated in FIG. 4, the moving body 200 has a configuration in which a plurality of divided pieces 210, 210, . . . are sequentially coupled to each other with hinge parts 211 along a travel direction of the moving body 200 (the longitudinal direction of the air blowing tube 100). The divided pieces 210 illustrated in the present example have same configurations and each of the divided pieces 210 has the moving body magnet 213.

The moving body 200 includes the moving body magnets 213 respectively arranged at locations, in attitudes, and in shapes that enable to apply a magnetic force to the transport body 500. In the present example, the moving body magnets 213 are arranged on a side of the moving body 200 nearer the transport tube 400. The moving body magnets 213 included in the moving body 200 are arranged spaced apart from each other in the travel direction of the moving body 200. In the present example, each of the moving body magnets 213 is attached to the associated divided piece 210 in such a manner that the N pole (one of the poles) faces the side of the transport tube 400 (the upper side in FIG. 4) and the S pole (the other pole) faces the lower side in FIG. 4.

The moving body 200 illustrated in the present example is constituted of three divided pieces 210. The divided pieces 210 are coupled to each other to be angularly displaceable within a predetermined range in the upper-lower direction in FIG. 4 and the depth direction of the plane of the paper centering on the hinge parts 211, respectively. With this configuration, the moving body 200 can smoothly move in the air blowing tube 100 while the divided pieces 210 are displaced even when the air blowing tube 100 forms the air flow path 101 curved in the upper-lower or right-left direction.

<Relation Between Air Blowing Tube and Moving Body>

The inner surface shape of the moving route part 111 and the outer surface shape (the configuration) of the moving body 200 are formed in such a manner that the moving body 200 does not relatively rotate on a virtual axis extending along the longitudinal direction of the moving route part 111 with respect to the moving route part 111. For example, the horizontal sectional shape (the shape on a cross section orthogonal to the longitudinal direction) of the moving route part 111 and the horizontal sectional shape of the divided pieces 210 of the moving body 200 are respectively formed into rectangular shapes. With provision of the configuration described above, the attitude of the moving body 200 in the moving route part 111 can be maintained to cause the N pole (one of the poles) of each of the moving body magnets 213 to always face the side of the transport tube 400.

<Air-Blow Control Unit>

FIGS. 5(a) to 5(c) are schematic diagrams illustrating a relation between the air blowing tube and the air-blow control unit according to one embodiment of the first invention.

The air-blow control unit 300 according to the present embodiment includes a single blower 310 that generates an air flow flowing in a certain direction, and a switching unit 320 (the switching valve 325) that controls the direction of the air flow in the air blowing tube 100. The air-blow control unit 300 is characterized in switching the direction of the air flow in the air blowing tube 100 between the first direction (the banknote collecting direction and the arrow-B direction) and the second direction (the moving body returning direction and the arrow-C direction) opposite to the first direction using the switching unit 320.

The air-blow control unit (an air-flow control apparatus) 300 includes the switching unit (an air flow switching unit) 320 that controls the discharge direction of the air flow, a first circulation pipe 330 that forms an endless air flow path through the switching unit 320, and the blower 310 that is arranged at an appropriate place in the first circulation pipe 330 to generate an air flow flowing in a certain direction inside the first circulation pipe.

The switching unit 320 includes a casing 321 in which four flow paths 323 (a first flow path 323a to a fourth flow path 323d: ports) respectively connecting to external pipes are formed, and the switching valve 325 that is arranged in a joint portion (an intersecting portion) of the four flow paths 323 to switch the communication state among the flow paths 323 and/or the opening degrees at the time of communication. The flow paths 323 are communicated with and connected to an air discharge tube 331, an air intake tube 333, the first air blowing tube 110, and the second air blowing tube 120 that are external pipes, respectively. In the present example, the flow paths 323 are arranged in a cross manner (a radial manner). The switching valve 325 illustrated in the present example is a rotary valve such as a ball valve and the switching valve 325 rotates in the casing 321 by a predetermined angle, whereby the communication states of the flow paths 323 and the opening degrees of the flow paths 323 are switched.

The switching valve 325 is an electric-operated valve and is driven by a motor to control the rotation angle. For example, a stepping motor can be used as the motor. The switching valve 325 is, for example, controlled to have a desired rotation angle by the management unit 800 that controls the rotation angle of the stepping motor on the basis of a drive pulse. Of course, other methods may be used for driving means for rotating the switching valve 325 and control of the rotation angle of the switching valve 325. For example, a configuration in which a rotary encoder that rotates in conjunction with the switching valve 325, and a sensor that detects the rotation angle of the rotary encoder are mounted on the switching unit 320 and in which the management unit 800 executes feedback control of the rotation angle of the switching valve 325 may be adopted.

The first circulation pipe 330 includes the air discharge tube 331 that has one end portion (one end portion 330a of the first circulating pipe 330) communicatively connected to the first flow path 323a of the switching unit 320 and the other end portion communicatively connected to the outlet of the blower 310, and the air intake tube 333 that has one end portion communicatively connected to the inlet of the blower 310 and the other end portion (the other end portion 330b of the first circulation pipe 330) communicatively connected to the second flow path 323b of the switching unit 320.

The air blowing tube (the second circulation pipe) 100 has one end portion 100a communicatively connected to the third flow path 323c of the switching unit 320 and the other end portion 100b communicatively connected to the fourth flow path 323d of the switching unit 320, and forms an endless air flow path through the switching unit 320. The air blowing tube 100 reciprocates the moving body 200 placed therein in the arrow-B direction and the arrow-C direction in FIG. 5 with the air flow.

The air blowing tube 100 according to the present example includes the first air blowing tube 110 forming the moving route part 111 of the moving body 200, and the second air blowing tube 120 communicatively connected to the first air blowing tube 110. The first air blowing tube 110 is communicatively connected to the third flow path 323c and the second air blowing tube 120 is communicatively connected to the fourth flow path 323d.

<<Operation of Switching Unit: Neutral State>>

FIG. 5(a) illustrates a neutral state.

The switching valve 325 is at a neutral position for establishing communication between the first flow path 323a and the second flow path 323b while not establishing communication between the first and second flow paths 323a and 323b and the third and fourth flow paths 323c and 323d.

Accordingly, the air flow circulates in the first circulation pipe 330 in an arrow-A (A1 and A2) direction and no air flow is generated inside the air blowing tube 100. Therefore, the moving body 200 is in a state stopped in the air blowing tube 100.

<<Operation of Switching Unit: First Communication State>>

FIG. 5(b) illustrates a first state in which an air flow flowing in the air blowing tube 100 in the first direction (an arrow-B1 or B2 direction) is generated inside the air blowing tube 100. This state is, for example, a banknote collecting operation state for transporting banknotes collected by the transport body 500 to the safe unit 700.

The switching valve 325 is in a first communication position for establishing communication between the first flow path 323a and the fourth flow path 323d and establishing communication between the second flow path 323b and the third flow path 323c. At this time, the first flow path 323a and the fourth flow path 323d are not communicated with the second flow path 323b and the third flow path 323c.

The air circulates in an endless manner between the first circulation pipe 330 and the air blowing tube 100. That is, air (in the arrow-A1 direction) discharged from the discharge tube 331 to flow in the first flow path 323a flows in the second air blowing tube 120 from the fourth flow path 323d (in the arrow-B1 direction) due to the switching valve 325. Air flowing in the arrow-B2 direction inside the first air blowing tube 110 to flow in the third flow path 323c flows in the intake tube 333 from the second flow path 323b (in the arrow-A2 direction) due to the switching valve 325, returns to the blower 310, and is discharged again from the discharge tube 331.

<<Operation of Switching Unit: Second Communication State>>

FIG. 5(c) illustrates a second state in which an air flow flowing in the second direction (an arrow-C1 or C2 direction) is generated inside the air blowing tube 100. This state is, for example, a return operation state for returning the transport body 500 from the side of the safe unit 700 (the side of the management unit 800) to the distal end side of the transport tube 400.

The switching valve 325 is in a second communication position for establishing communication between the first flow path 323a and the third flow path 323c and establishing communication between the second flow path 323b and the fourth flow path 323d. At this time, the first flow path 323a and the third flow path 323c are not communicated with the second flow path 323b and the fourth flow path 323d.

The air circulates in an endless manner between the first circulation pipe 330 and the air blowing tube 100. That is, air (in the arrow-A1 direction) discharged from the discharge tube 331 to flow in the first flow path 323a flows in the first air blowing tube 110 from the third flow path 323c (the arrow-C1 direction) due to the switching valve 325. Air flowing in the arrow-C2 direction inside the second air blowing tube to flow in the fourth flow path 323d flows in the intake tube 333 from the second flow path 323b (in the arrow-A2 direction) due to the switching valve 325, returns to the blower 310, and is discharged again from the discharge tube 331.

<<Operation Of Switching Unit: Summary>>

By connecting two endless pipes (the first circulation pipe 330 and the air blowing tube 100) via the switching unit 320 as described above, three states including the neutral state in which no air flow is generated in the air blowing tube 100, the first communication state in which an air flow flowing in the first direction (the arrow-B direction) is generated inside the air blowing tube 100, and the second communication state in which an air flow flowing in the second direction (the arrow-C direction) is generated inside the air blowing tube 100 can be switched by changing the position of the switching valve 325 while an air flow in a certain direction (the arrow-A direction) is generated by the single blower 310.

In intermediate positions taken by the switching valve 325 among the three states described above, the communication state changes from those in the three states. That is, since the communication relation among the flow paths and the opening degrees of the flow paths can be adjusted according to the angle of the switching valve 325 in the casing 321 in the present embodiment, an air volume of the air flow according to the opening degrees of the flow paths can be generated inside the air blowing tube 100. That is, the speed of the moving body 200 can be varied according to the wind speed in the air blowing tube 100.

The moving speed of the moving body 200 may be adjusted by control of the air volume of the blower 310. For example, the air volume of the blower 310 may be adjusted by varying the rotational speed of blades of the blower 310 by PWM (Pulse Width Modulation) control. However, since the rotation responsiveness of the switching valve 325 is higher than the variation responsiveness of the rotational speed of the blower 310, adjustment of the rotation angle of the switching valve 325 is more advantageous to rapidly adjust the speed of the moving body 200.

<Transport Tube>

The transport tube (the transport route) 400 is explained with reference to FIGS. 4 and 6.

Figure 6:
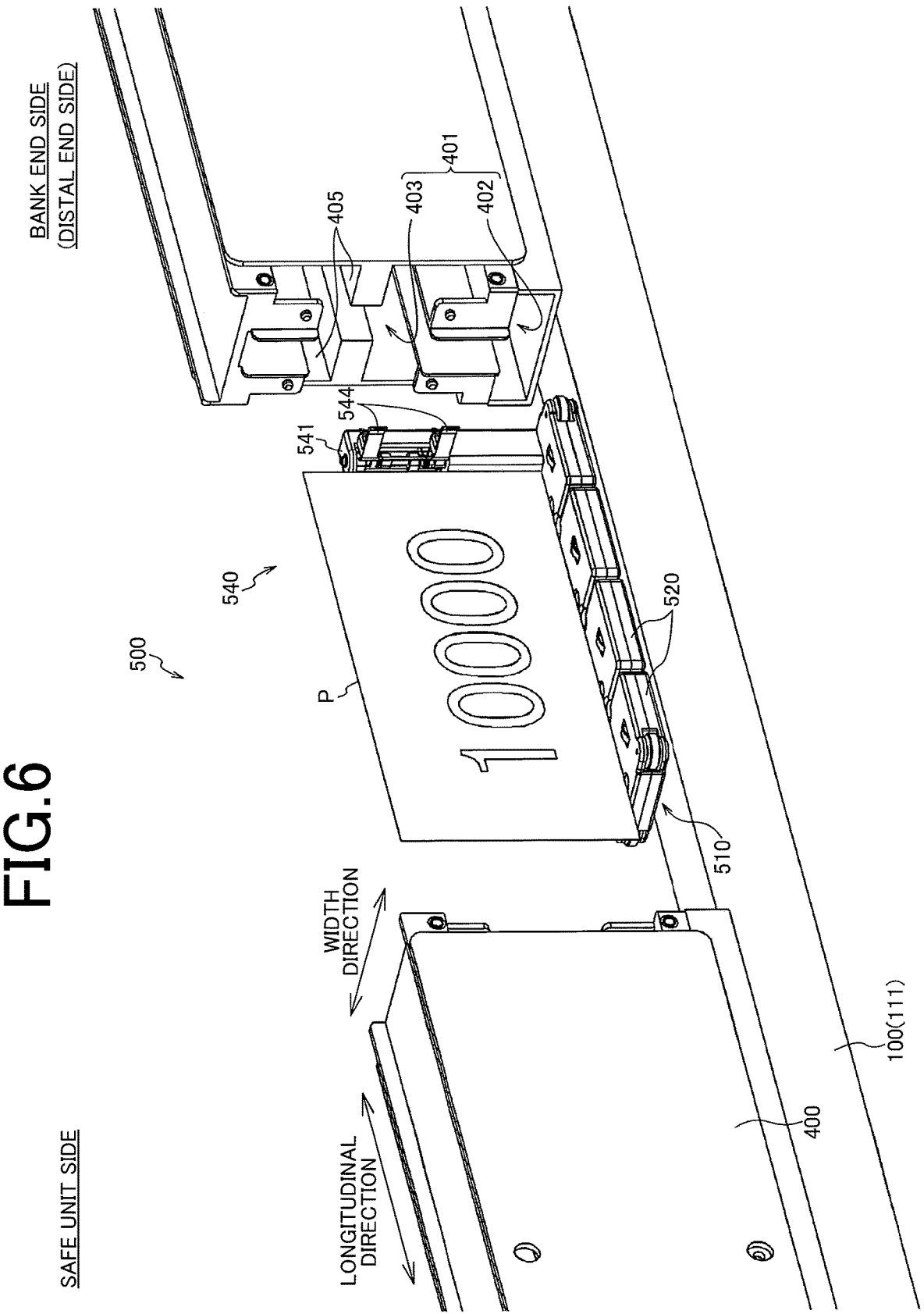
FIG. 6 is a perspective view illustrating a relation between the transport tube and the transport body.

FIG. 6 is a perspective view illustrating a relation between the transport tube and the transport body. FIG. 6 illustrates a state in which the inner part of the transport tube 400 is partially exposed.

Since the transport body 500 is transported with a magnetic force in the banknote transport system 10, the transport tube 400 is formed of a material that does not affect the travel of the transport body 500 based on the magnetic force. Although it is desirable that the transport tube 400 is entirely formed of a non-magnetic material, the transport tube 400 may include a magnetic material in a part thereof without affecting the travel of the transport body 500.

The transport tube 400 includes a configuration (the thickness of the tube, the spacing between the tubes, the shape thereof, and the like) that can apply a magnetic force between the moving body 200 arranged inside the moving route part 111 and the transport body 500 arranged inside the transport tube 400.

Although the transport tube 400 is arranged above the air blowing tube 100 in the present example, the location relation between the air blowing tube 100 and the transport tube 400 is not limited thereto. The transport tube 400 may be arranged below the air blowing tube 100 or the transport tube 400 may be arranged on the lateral side of the air blowing tube 100.

While the transport tube 400 is illustrated as means for constituting the transport path 401, the means for constituting the transport path 401 does not need to be tubular and the present invention can be achieved even with a configuration in which a part or the whole of the transport path 401 is open to outside. That is, the transport tube 400 may have any form as long as it can form therein an elongated space as the transport path 401.

<Transport Body>

As illustrated in FIGS. 4 and 6, the transport body 500 includes a transport base 510 that is arranged at a location nearer the air blowing tube 100 in the transport path 401 and that is subjected to a magnetic force from the moving body 200, and a banknote collecting/retaining part 540 provided on the opposite side of the transport base 510 to the air blowing tube 100.

<<Transport Base>>

The transport base 510 has a configuration in which a plurality of divided pieces 520, 520, . . . are sequentially coupled to each other with hinge parts 521 along the travel direction of the transport body 500 (the longitudinal direction of the transport tube 400). Each of the divided pieces 520 illustrated in the present example includes the transport body magnet 523.

The transport base 510 includes the transport body magnets 523 arranged at locations, in attitudes, and in shapes that can be subjected to the effect of the magnetic force from the moving body 200. In the present example, the transport body magnets 523 are arranged on the side of the transport base 510 nearer the air blowing tube 100. The transport body magnets 523 included in the transport base 510 are arranged spaced apart from each other in the travel direction of the transport body 500. In the present example, each of the transport body magnets 523 is attached to the associated divided piece 520 in such a manner that the N pole (one of the poles) faces the side of the air blowing tube 100 (the lower side in FIGS. 4 and 6) and the S pole (the other pole) faces the upper side in FIGS. 4 and 6. The transport base 510 magnetically levitates in the transport tube 400 under a repelling force due to the magnetic force from the moving body 200.

The transport base 510 illustrated in the present example is constituted of four divided pieces 520. The divided pieces 520 are coupled to each other to be angularly displaceable within a predetermined range in the upper-lower direction in FIGS. 4 and 6 and the depth direction of the plane of paper on the hinge parts 521, respectively. With the configuration described above, the transport body 500 can smoothly move in the transport tube 400 even when the transport tube 400 forms the transport path 401 curved in the upper-lower or right-left direction.

<<Banknote Collecting/Retaining Part>>

The banknote collecting/retaining part 540 is arranged on the transport base 510. The banknote collecting/retaining part 540 includes a support member 541 that is upright in a direction away from the air blowing tube 100, and collecting members (collecting pawls) 544 that are protruded from the support member 541 in the width direction at an end portion on the bank end side in the longitudinal direction of the transport tube 400 (on the distal end side with respect to the safe unit 700). The support member 541 is protruded upward from a middle portion of the transport base 510 in the width direction.

The banknote collecting/retaining part 540 retains banknotes P to cause the long edge direction of the banknotes P to follow the longitudinal direction of the transport tube 400 and in an upright attitude. One of long sides (a long side positioned on the lower side in FIG. 6) of the banknote P is supported by the transport base 510. The rear end edge (one of short sides) of the banknote is supported by the support member 541 or the collecting members 544.

<Relation Between Transport Tube and Transport Body>

The transport tube 400 includes therein a base transport path 402 arranged on the side nearer the air blowing tube 100, and a banknote transport path 403 arranged on the opposite side to the air blowing tube 100. The base transport path 402 is a horizontally-long space where the transport base 510 of the transport body 500 travels, and the banknote transport path 403 is a vertically-long space where the banknote collecting/retaining part 540 of the transport body 500 and banknotes retained by the banknote collecting/retaining part 540 travel.

Since the transport body 500 illustrated in the present example travels while being subjected to a repelling force due to a magnetic force from the moving body 200, the base transport path 402 and the transport base 510 are configured to inhibit separation (movement toward the banknote transport path 403) of the transport base 510 from the base transport path 402 and maintain the transport base 510 at a location where the effect of the magnetic force can be received from the moving body 200.

The inner surface shape of the base transport path 402 and the outer surface shape of the transport base 510 are formed in such a manner that the transport base 510 does not relatively rotate on a virtual axis extending along the longitudinal direction of the base transport path 402 with respect to the base transport path 402. For example, the horizontal sectional shape of the base transport path 402 and the horizontal sectional shape of the transport base 510 are formed in rectangular shapes. With provision of the configuration described above, the attitude of the moving body 200 in the base transport path 402 is maintained to cause the N pole (one of the poles) of each of the transport body magnets 523 to always face the side of the air blowing tube 100.

<Relation Between Moving Body and Transport Body>

A relation between the moving body magnetic material and the transport body magnetic material is explained.

<<Only Repulsion>>

As illustrated in FIG. 4, one or more magnets can be arranged in both the moving body 200 and the transport body 500 in directions repelling each other to apply only the repelling force between the moving body 200 and the transport body 500. When only the repelling force is to be applied between the moving body 200 and the transport body 500, it is desirable that a plurality of magnets are arranged on at least one of the moving body 200 and the transport body 500 at a predetermined interval in the travel direction. With arrangement of the magnets in the travel direction on at least one of the moving body 200 and the transport body 500, the moving body magnets 213 and the transport body magnets 523 are alternately arrayed when the moving body 500 travels while being subjected to the repelling force from the moving body 200. That is, when the transport body 500 travels, the transport body 500 is relatively positioned with respect to the moving body 200. In this case, it is particularly preferable that the difference between the number of magnets included in the moving body 200 and the number of magnets included in the transport body 500 is one. In other words, when n is a natural number, it is preferable that n magnets are arranged on one of the moving body 200 and the transport body 500 and that n+1 magnets are arranged on the other one.

When the transport tube 400 is placed above the air blowing tube 100 and a repelling force is applied between the transport body 500 and the moving body 200, the transport body 500 levitates in the transport tube 400 and therefore the transport body 500 is less likely to be in contact with the transport tube 400. Therefore, it is possible to prevent reduction in the transport force of the transport body 500 due to friction with the transport tube 400 and smoothly move the transport body 500. Since the contact between the transport body 500 and the transport tube 400 is suppressed, generation of fine dust (powdery dust) due to contact between members can be prevented.

When the repelling force is applied between the moving body 200 and the transport body 500, the transport force can be increased by increasing the number of magnets included in the moving body 200 and the transport body 500.

<<Only Attraction>>

Figure 7:
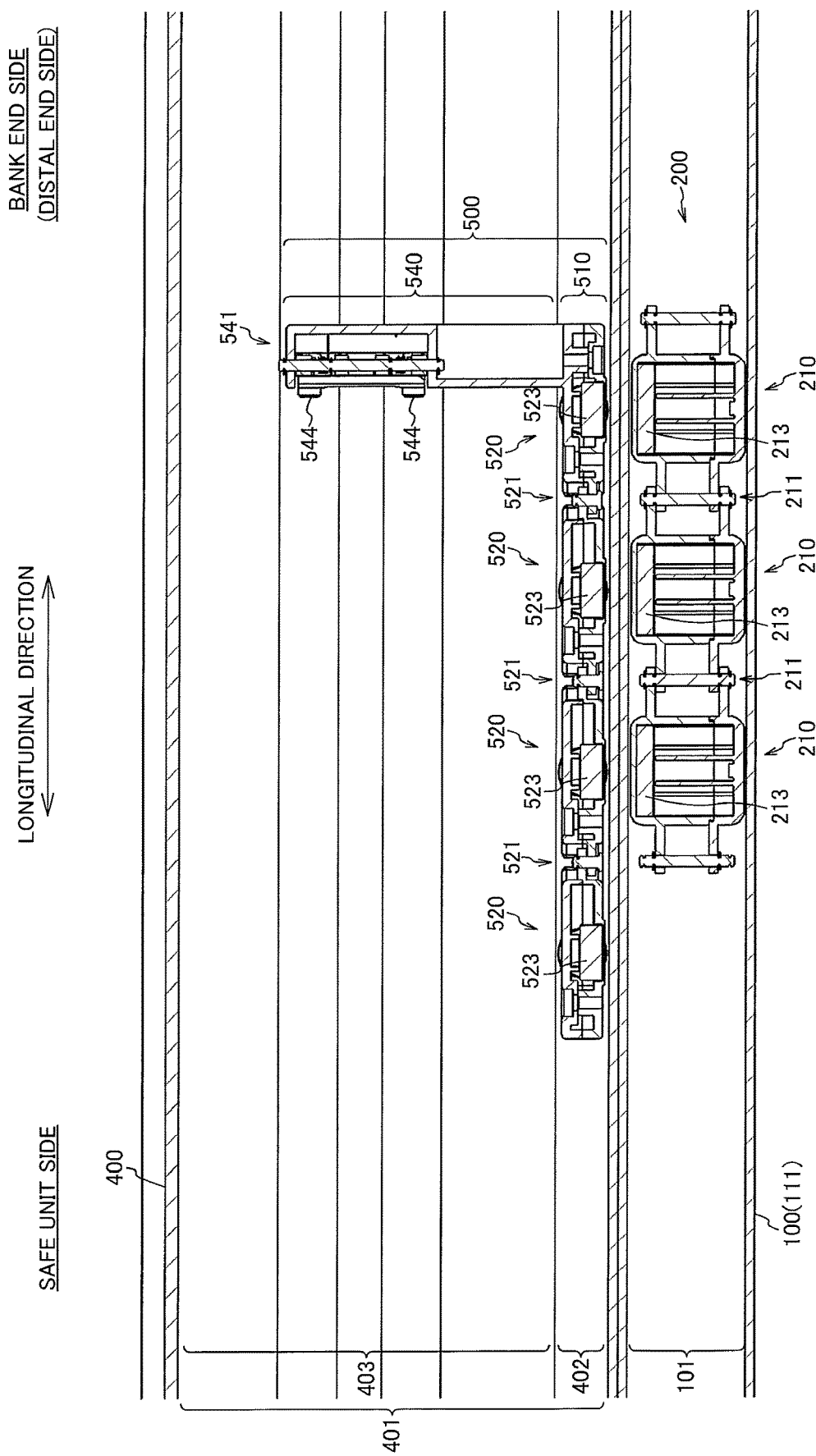
FIG. 7 is a vertical sectional view of the moving body, the air blowing tube including the moving body, the transport body, and the transport tube including the transport body in a case in which the moving body and the transport body attract each other due to a magnetic force.

FIG. 7 is a vertical sectional view of the air blowing tube and the transport tube including the moving body and the transport body in a case in which the moving body and the transport body attract each other due to a magnetic force.

In an illustrated example, the moving body magnets 213 and the transport body magnets 523 are respectively attached to the moving body 200 and the transport body 500 in attitudes attracting each other. Since the locations in the longitudinal direction of the moving body magnets 213 and the transport body magnets 523 match with walls of the air blowing tube 100 and the transport tube 400 interposed therebetween, positioning of the transport body 500 with respect to the moving body 200 is easy.

When only the attracting force based on the magnetic force is to be applied between the moving body 200 and the transport body 500, it suffices that at least either the magnetic material mounted on the moving body 200 or the magnetic material mounted on the transport body 500 is a magnet. For example, magnets may be arranged on one of the transport body 500 and the moving body 200 and a magnetic material (for example, iron plates), other than magnets, that is attracted by magnets may be arranged on the other one.

When only the attracting force based on the magnetic force is to be applied between the moving body 200 and the transport body 500, it suffices that at least one set of magnetic materials (for example, a set of a magnet and a magnet or a set of a magnet and an iron plate) is arranged on the transport body 500 and the moving body 200.

<<Repulsion and Attraction>>

Both the repelling force and the attracting force may be applied between the moving body 200 and the transport body 500. That is, a set of magnets that apply a repelling force to each other, and a set of magnets that apply an attracting force to each other may be mixed on the moving body 200 and the transport body 500. An example in which both the repelling force and the attracting force are applied will be described later with reference to FIG. 8.

<<Orientation of Magnets>>

While the poles of each of the magnets are arranged to face in the upper-lower direction (a staking direction of the air blowing tube 100 and the transport tube 400) in the embodiment described above, the poles of each of the magnets may be arranged to face in the travel direction (for example, to cause the N pole to face toward the safe unit and the S pole to face toward the bank end side/the distal end side). Alternatively, the poles of each of the magnets may be arranged diagonally to the travel direction. The action of the magnetic force can be appropriately adjusted according to the orientation of the magnets.

<<Orientation of Magnets: Arrangement in Tandem>>

Figure 8:
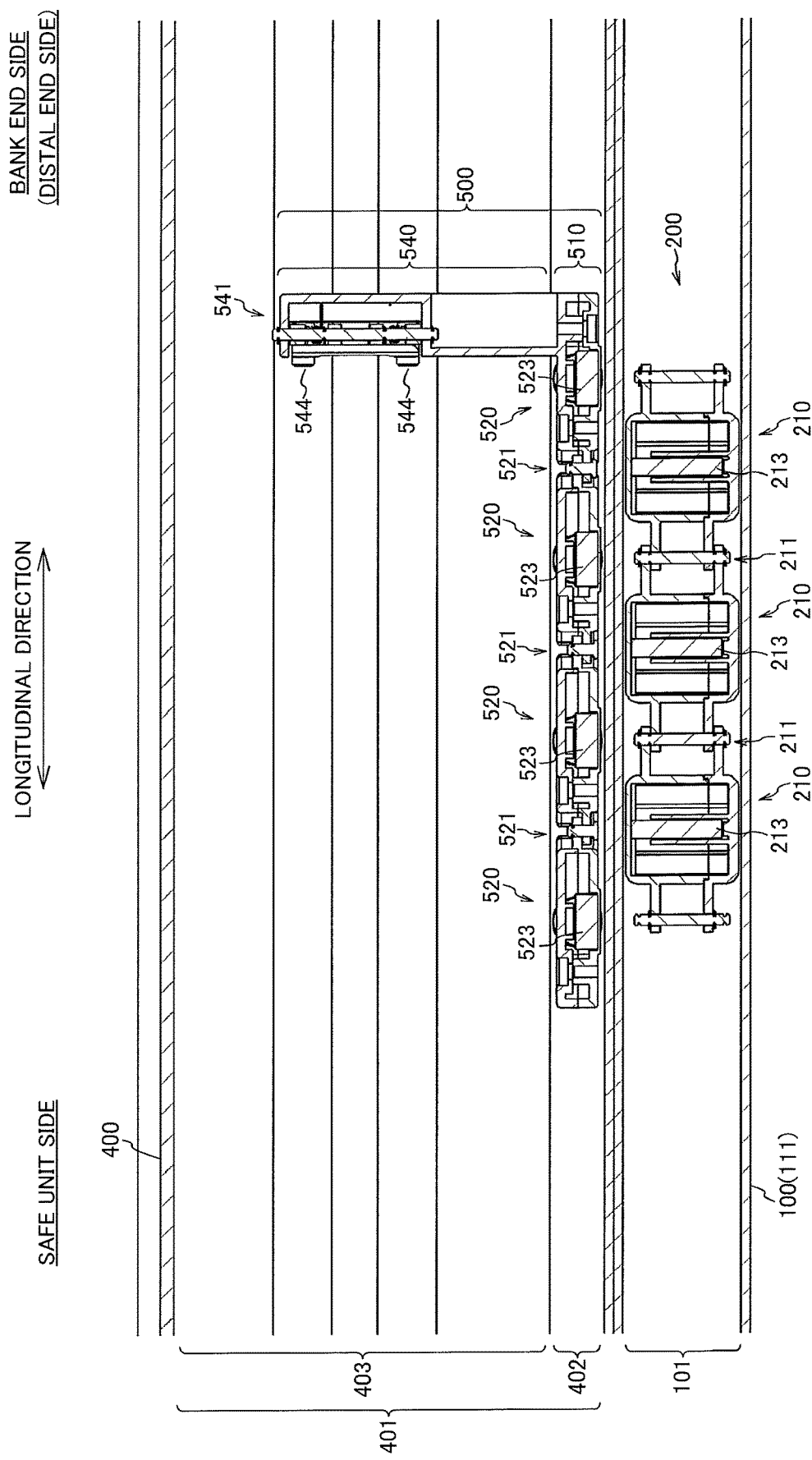
FIG. 8 is a vertical sectional view of the air blowing tube and the transport tube including the moving body and the transport body in a case in which the poles of each of moving body magnets are arranged to face in a travel direction.

FIG. 8 is a vertical sectional view of the air blowing tube and the transport tube including the moving body and the transport body in a case in which the poles of each of the moving body magnets are arranged to face in the travel direction.

In an illustrated example, each of the moving body magnets 213 is attached to the associated divided piece 210 in such a manner that the N pole (one of the poles) faces the side of the safe unit (the left side in FIG. 8) and the S pole (the other pole) faces the distal end side (the right side in FIG. 8). Each of the transport body magnets 523 is attached to the associated divided piece 520 in such a manner that the N pole faces the side of the air blowing tube 100 and the S pole faces the upper side in FIG. 8.

Since surfaces (the N poles) on the safe unit side of the moving body magnets 213 respectively repel the transport body magnets 523 (the N poles), and the surfaces (the S poles) on the distal end side of the moving body magnets 213 respectively attract the transport body magnets 523 (the N poles), both the repelling force and the attracting force can be applied between the moving body 200 and the transport body 500.

[First Modified Embodiment Related to Air Blow Control]

Figure 9:
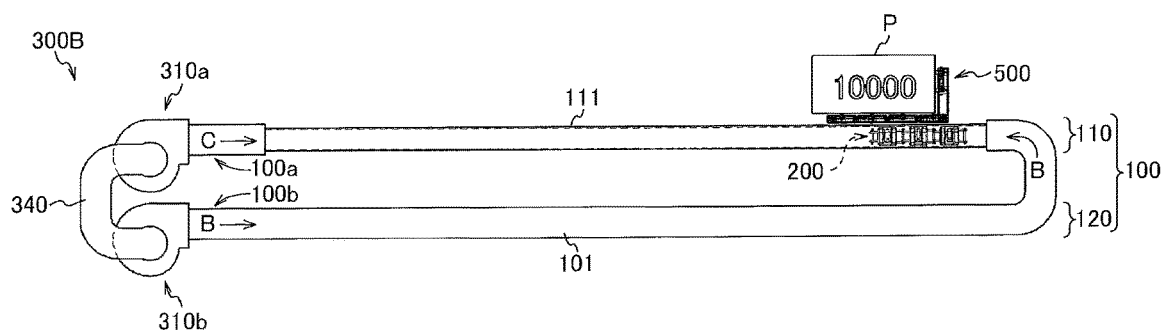
FIG. 9 is a diagram illustrating a first modification of an air-blow control unit.

FIG. 9 is a diagram illustrating a first modification of the air-blow control unit.

An air-blow control unit 300B may have a configuration including a blower 310a having an outlet connected to one end portion 100a of the air blowing tube 100, a blower 310b having an outlet connected to the other end portion 100b of the air blowing tube 100, and a connection pipe 340 that connects the inlets of the blowers 310a and 310b to each other. The air blowing tube 100 (the first air blowing tube 110 and the second air blowing tube 120) is configured in an endless manner through the two blowers 310a and 310b and the connection pipe 340.

Turning on/off of the blowers 310a and 310b and the air volume thereof are controlled by the management unit 800.

When an air flow flowing in a first direction (an arrow-B direction) is to be generated inside the air blowing tube 100 (the first state and the banknote collecting operation state), one blower 310b is turned on to generate an air flow and the other blower 310a is turned off. Air flowing inside the air blowing tube 100 flows in the outlet of the blower 310a and is discharged from the inlet of the blower 310a. The air further passes through the connection pipe 340 to return to the inlet of the blower 310b and is discharged from the outlet of the blower 310b.

When an air flow flowing in a second direction (an arrow-C direction) is to be generated inside the air blowing tube 100 (the second state and the transport body returning state), it suffices to turn one blower 310b off and turn the other blower 310a on to generate the air flow.

In this way, the use of two blowers also enables the air flow in the first direction and the air flow in the second direction to be generated inside the air blowing tube 100.

Since the inlets of the two blowers 310a and 310b are connected with the connection pipe 340 in the present example, air can be efficiently circulated inside the air flow path 101 airtightly configured.

[Second Modified Embodiment Related to Air Blow Control]

Figure 10:
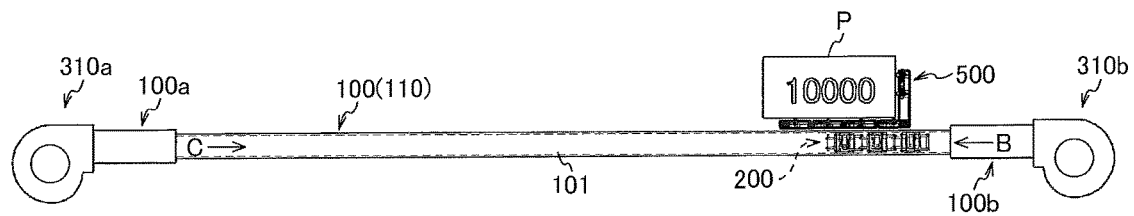
FIG. 10 is a diagram illustrating a second modification of the air-blow control unit.

FIG. 10 is a diagram illustrating a second modification of the air-blow control unit.

An air-blow control unit 300C may have a configuration including the blowers 310a and 310b at one end portion 100a and the other end portion 100b of the air blowing tube 100, respectively. Turning-on/off of the blowers 310a and 310b and the air volume thereof are controlled by the management unit 800.

When an air flow flowing in a first direction (an arrow-B direction) is to be generated inside the air blowing tube 100 (the first state and the banknote collecting operation state), one blower 310b is turned on to generate an air flow and the other blower 310a is turned off. The blower 310b takes external air to the inside from the inlet and discharges the air, thereby generating the air flow in the arrow-B direction inside the air blowing tube 100. This air flow is taken into the blower 310a from the outlet of the blower 310a and is discharged from the inlet.

When an air flow flowing in a second direction (an arrow-C direction) is to be generated inside the air blowing tube 100 (the second state and the transport body returning state), it suffices to turn one blower 310b off and turn the other blower 310a on to generate the air flow.

Since the present example does not require pipes for causing the air flow path 101 to be a circulation path, the configuration is simplified.

B. Paper Sheet Transport System According to Second Invention

<<Basic Configuration of Paper Sheet Transport System>>

A paper sheet transport system according to a second invention is described next.

The second invention has further embodied contents of the receiving units (paper sheet receiving devices) 600, the transport tube 400, the transport body 500, and the like in the paper sheet transport system 10 according to the first invention, and like parts are denoted by like reference signs and are described with reference to FIGS. 1 to 10.

Figure 11:
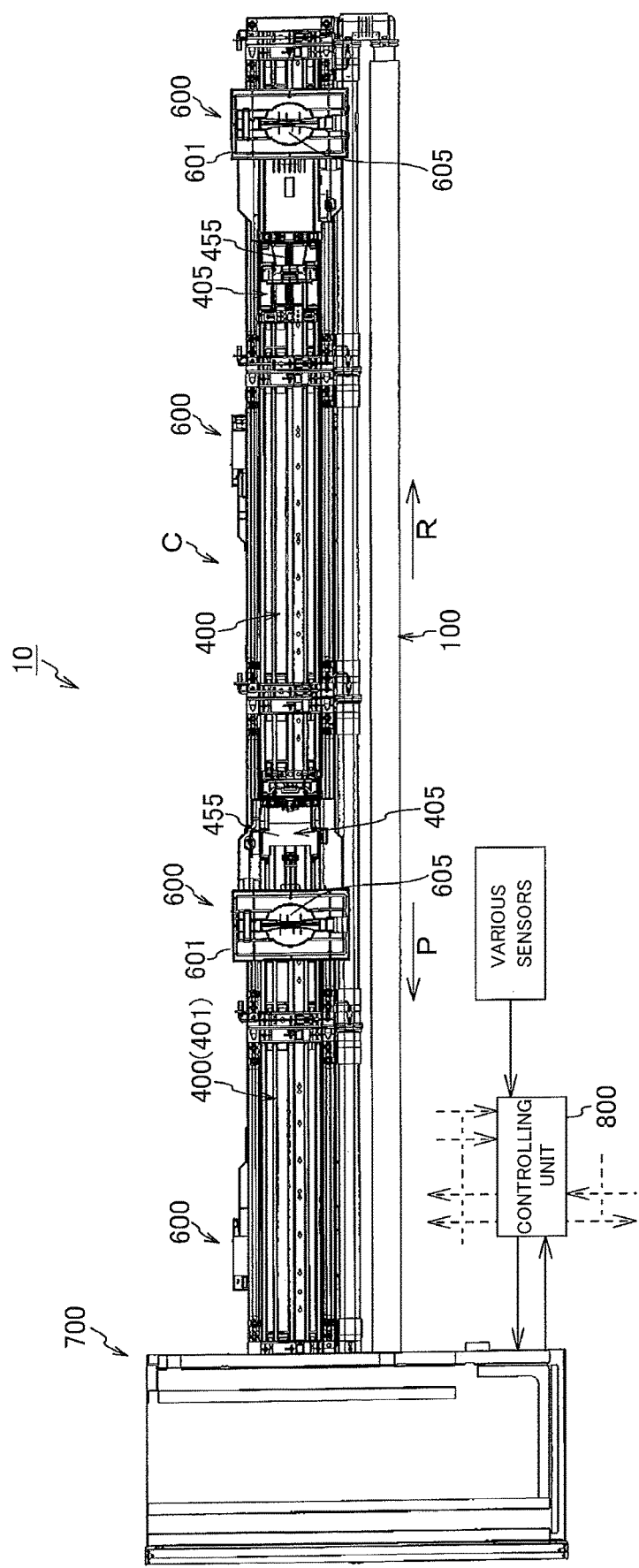
FIG. 11 is a front view of a banknote transport system 10 including receiving units (banknote receiving devices) 600.
Figure 12:
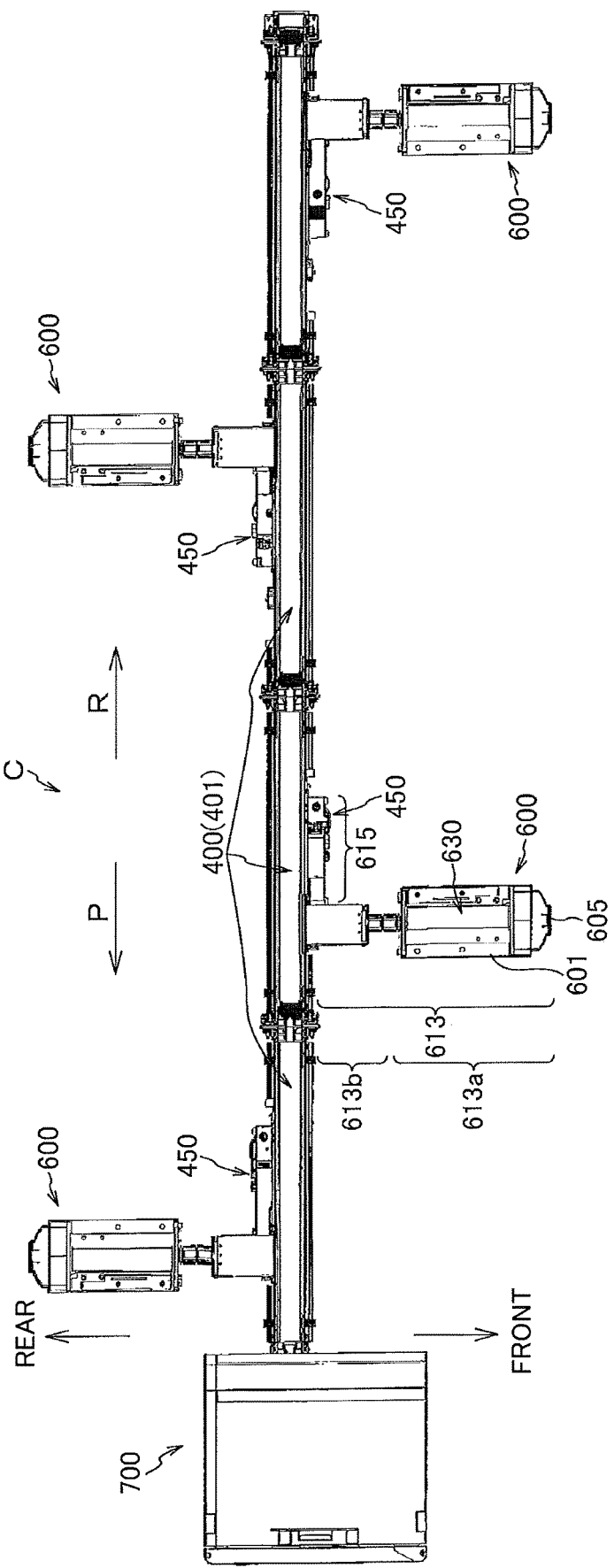
FIG. 12 is a plan view of the banknote transport system.
Figure 13:
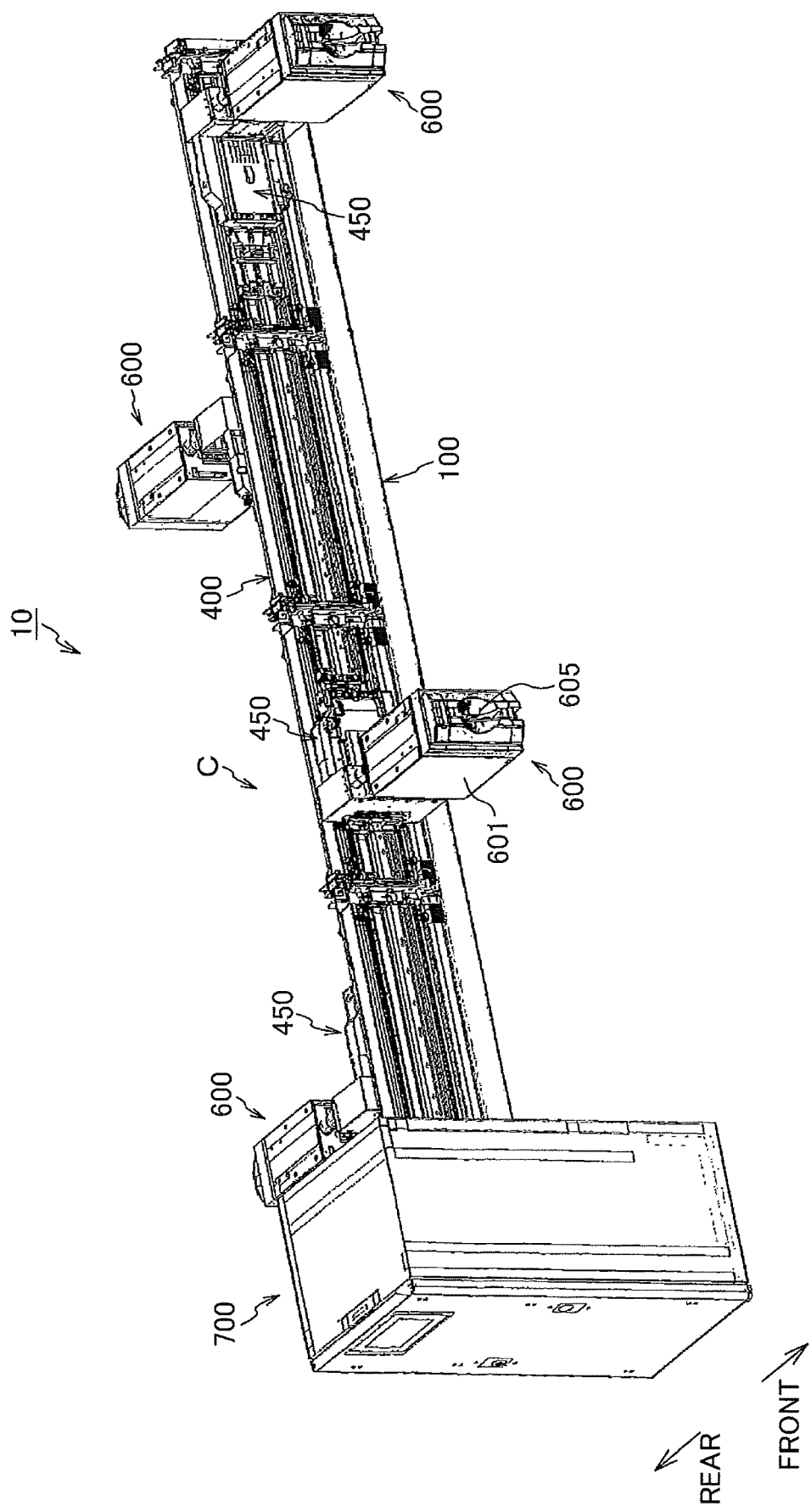
FIG. 13 is a front left perspective view of the banknote transport system.
Figure 14:
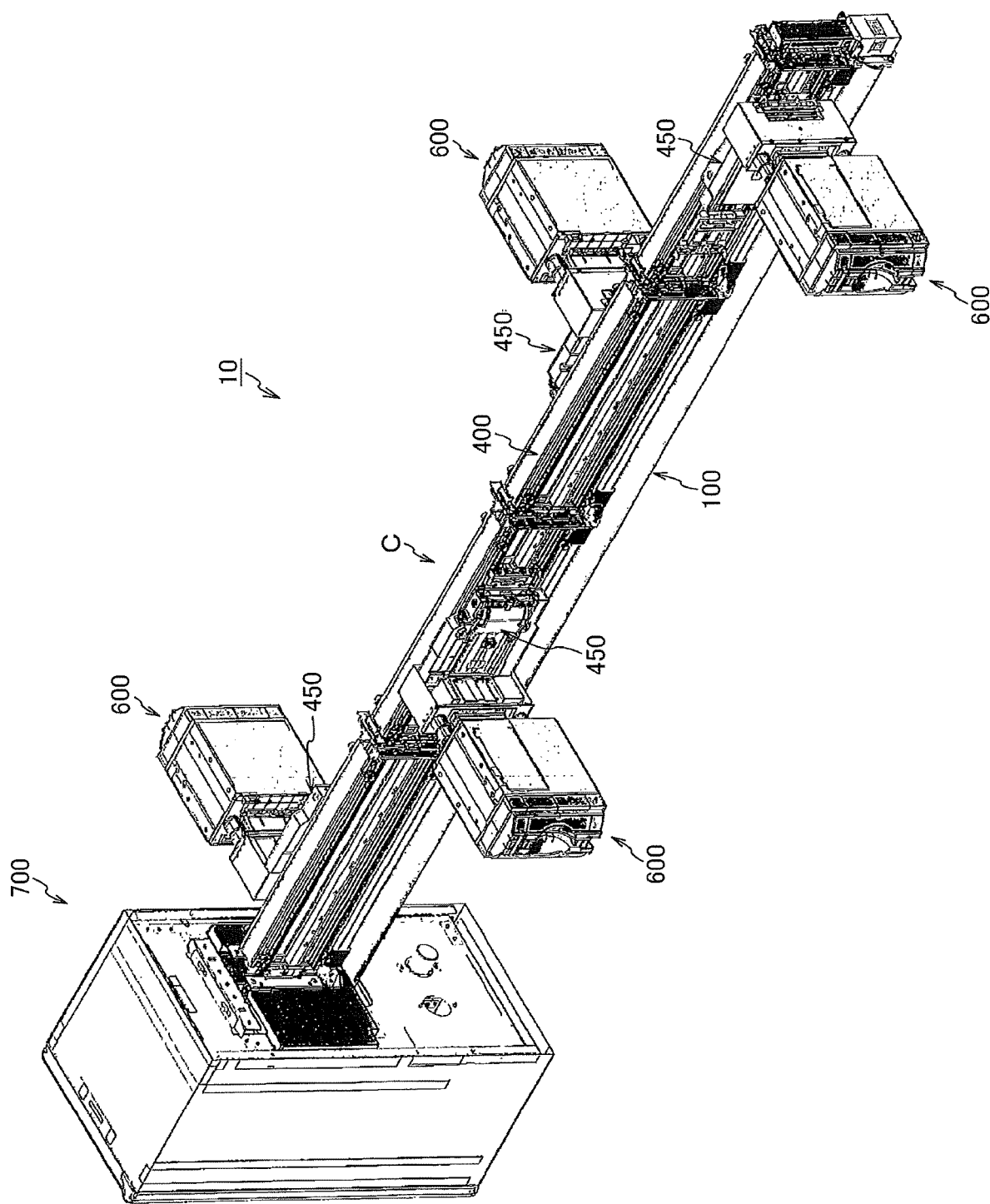
FIG. 14 is a front right perspective view of the banknote transport system.

FIG. 11 is a front view of the banknote transport system 10 including the receiving units (the banknote receiving devices) 600, FIG. 12 is a plan view of the banknote transport system, FIG. 13 is a front left perspective view of the banknote transport system, and FIG. 14 is a front right perspective view of the banknote transport system.

Figure 15:
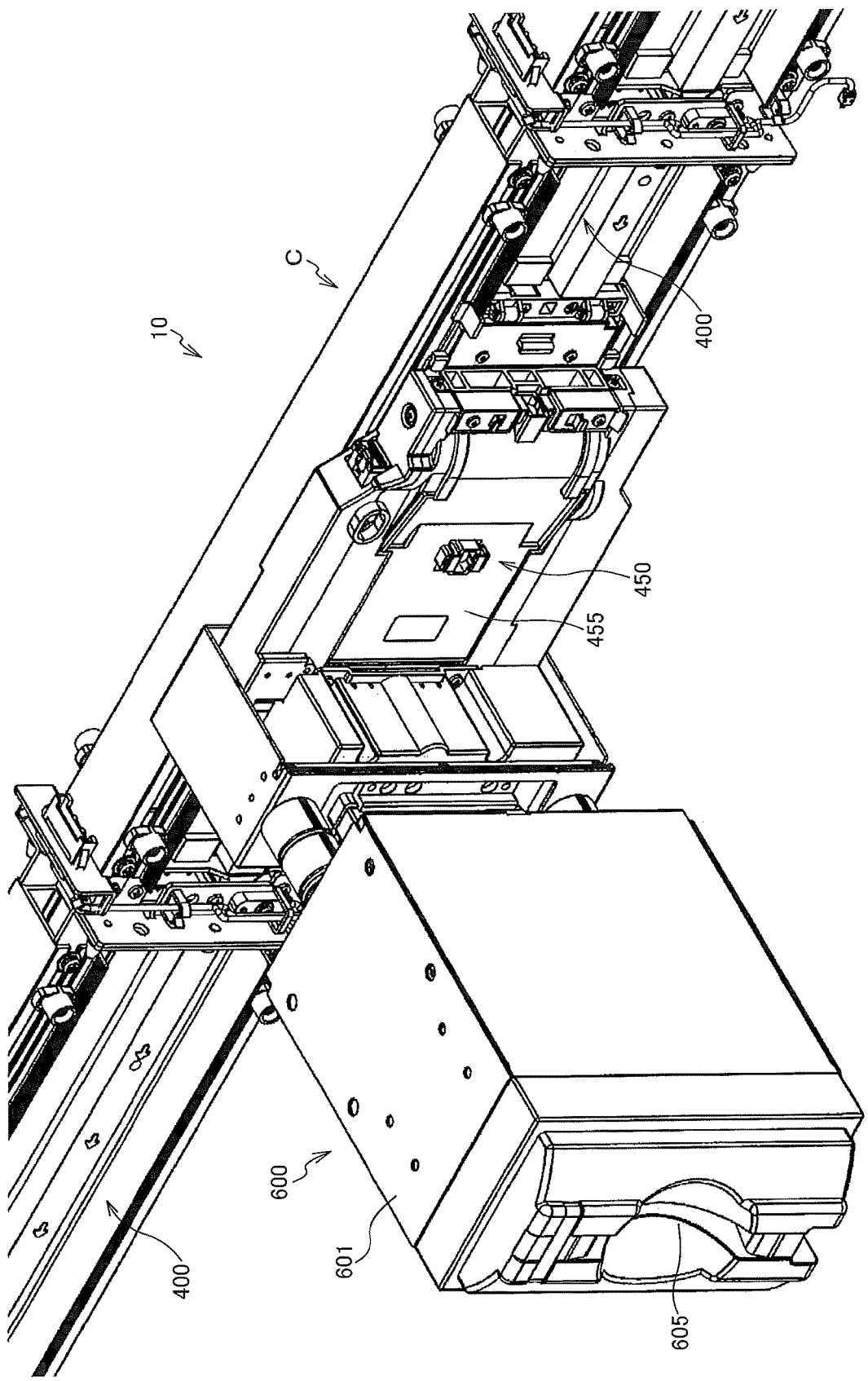
FIG. 15 is a perspective view illustrating a configuration of a coupling portion between the receiving unit and a transport tube 400.
Figure 16:
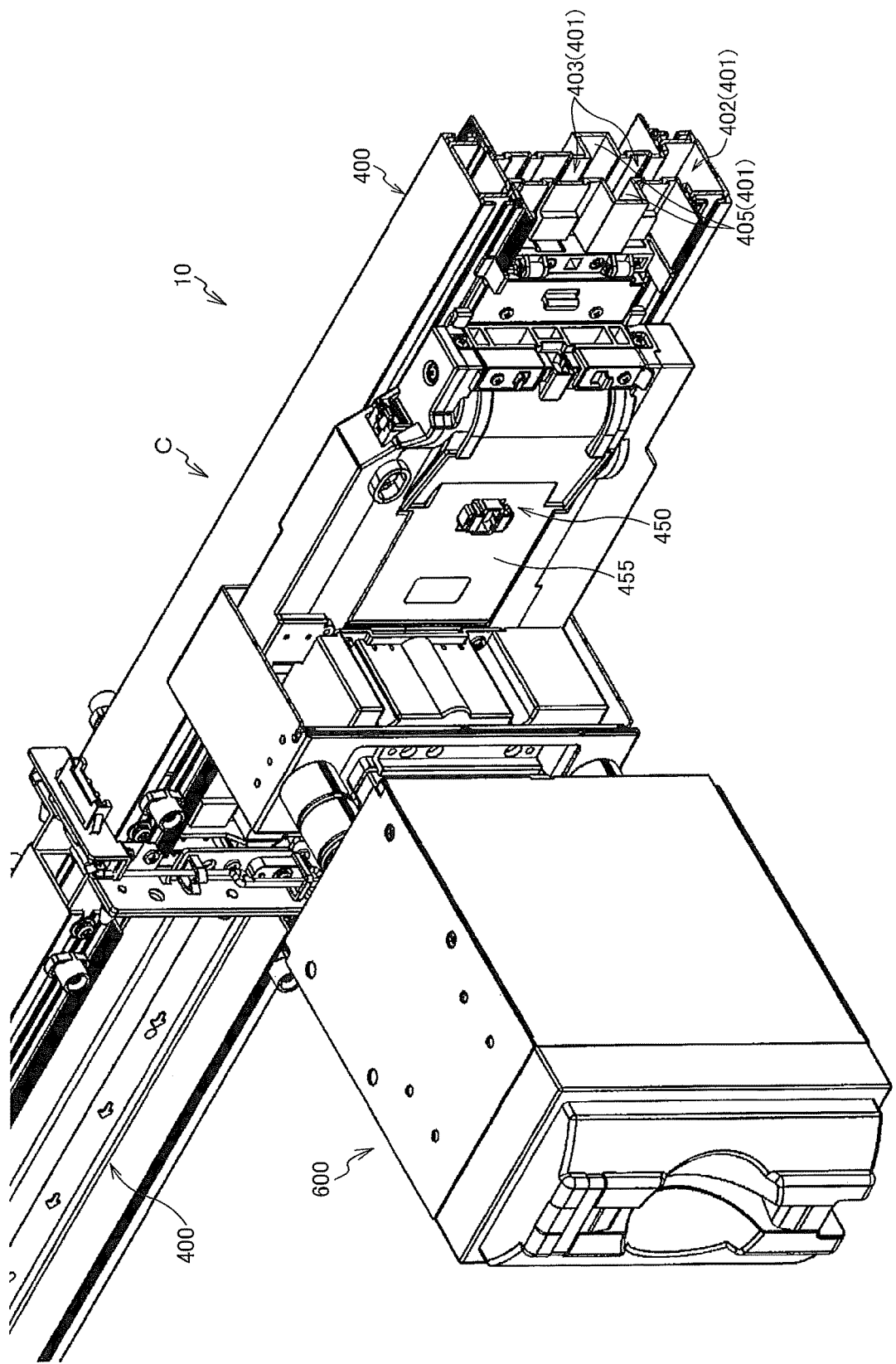
FIG. 16 is a perspective view illustrating a portion of the transport tube in FIG. 15 in vertical cross section.
Figure 17:
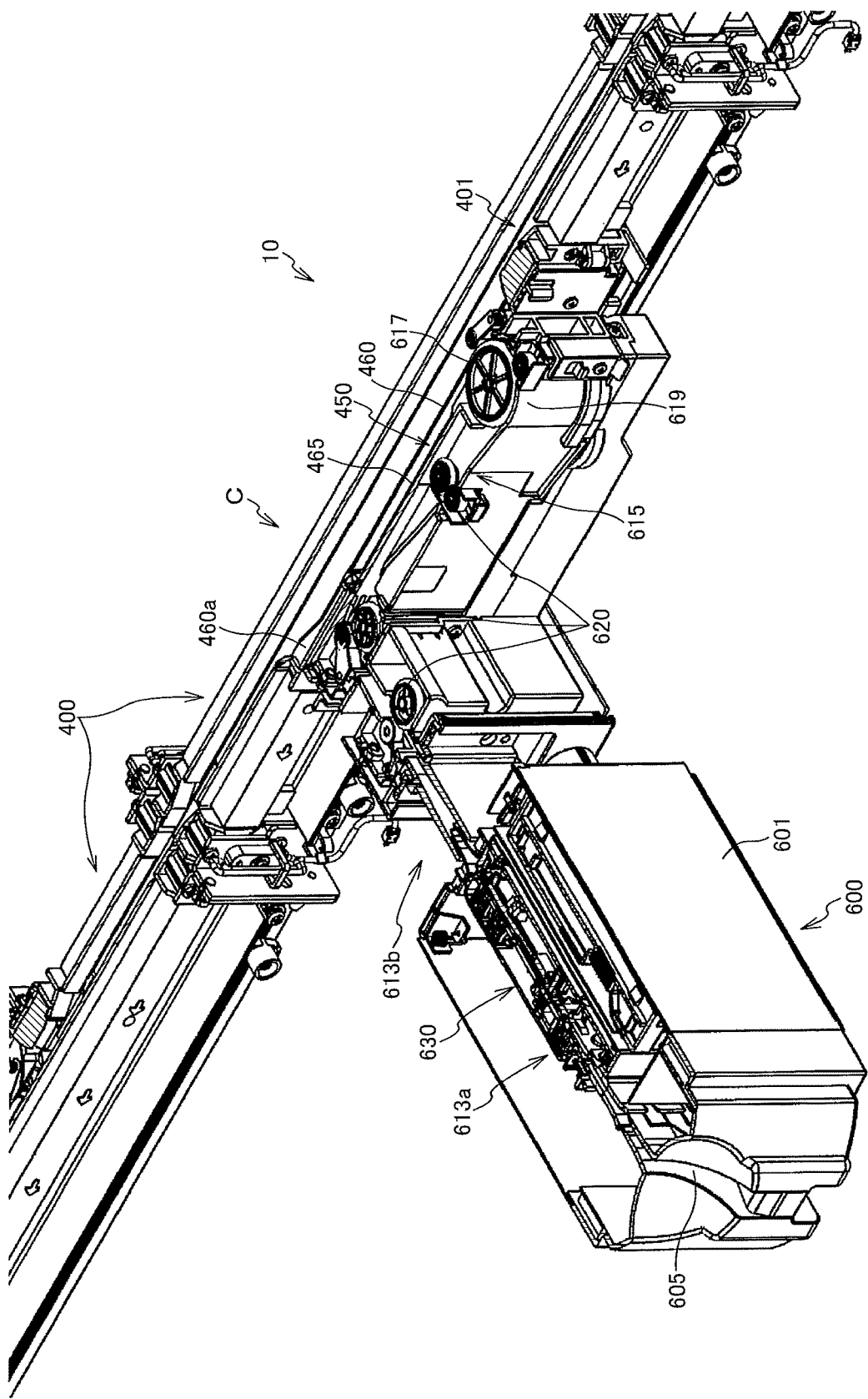
FIG. 17 is a horizontal sectional perspective view illustrating a configuration of the coupling portion between the receiving unit and the transport tube 400.
Figure 18:
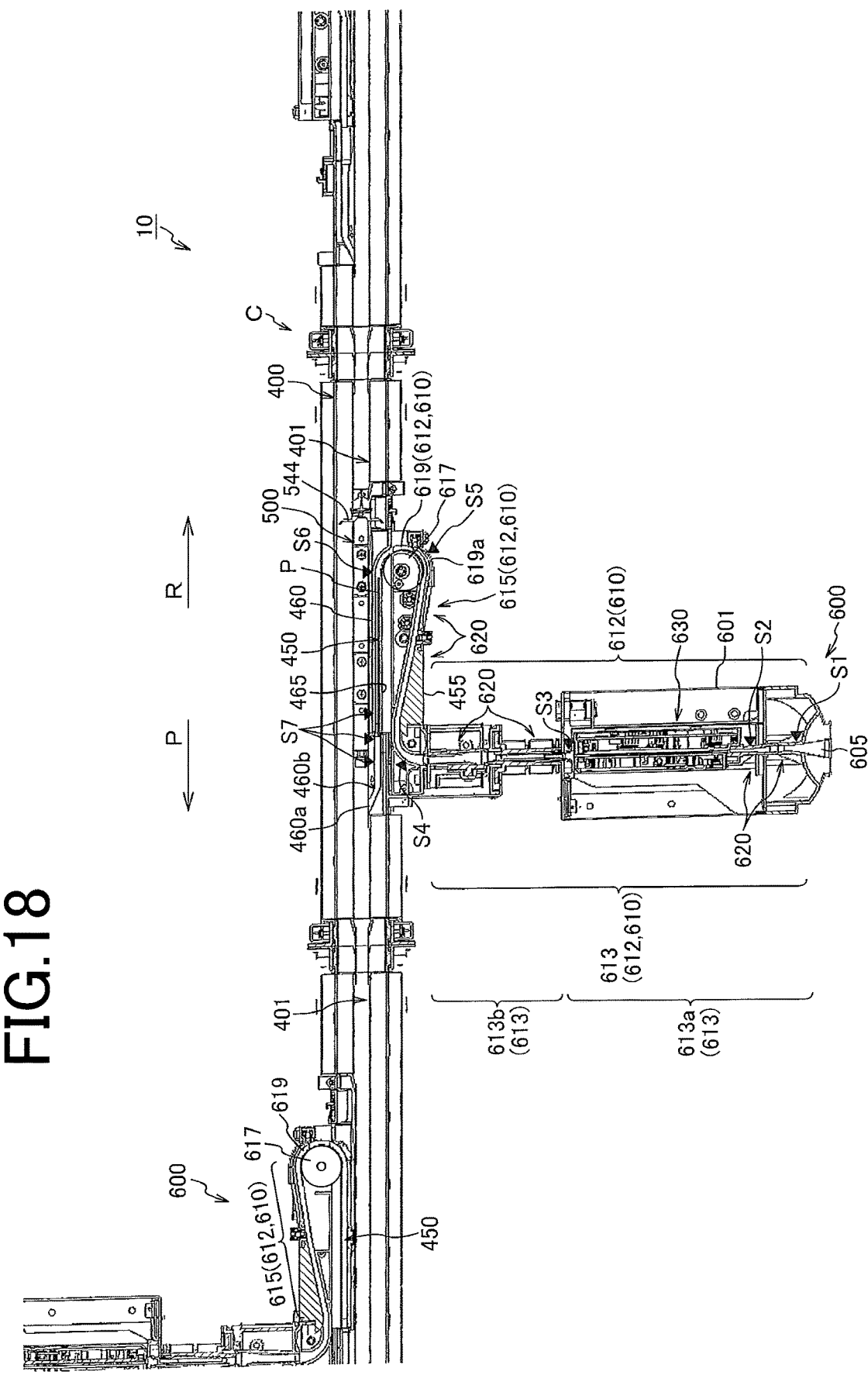
FIG. 18 is a horizontal sectional view of a portion of a banknote transport device C.

FIG. 15 is a perspective view illustrating a configuration of a coupling portion between the receiving unit and the transport tube 400, FIG. 16 is a perspective view illustrating a portion of the transport tube in FIG. 15 in vertical cross section, FIG. 17 is a horizontal sectional perspective view illustrating a configuration of the coupling portion between the receiving unit and the transport tube 400, and FIG. 18 is a horizontal sectional view of a portion of the banknote transport device C.

The banknote transport system 10 according to the second invention schematically includes the banknote transport device C including the transport tube 400 (the transport path 401) as a mainstream that has at least a portion arranged along the air blowing tube 100 to be adjacent to the air blowing tube 100, the transport body (a banknote transport shuttle) 500 for transporting banknotes that move inside the transport tube 400, and keeping parts 450 as tributaries that are provided at a plurality of places along the transport path 401 and that keep a banknote to be transferred onto the transport body 500, the receiving units 600 that are each arranged at each of the keeping parts to receive a banknote P input one by one from outside and to move the received banknote P to the associated keeping part 450, driving devices (such as a transport mechanism 620) that drives driving targets such as the banknote transport device C and the receiving units 600, the safe unit 700, and the controlling unit (the management unit) 800 that controls these components, in addition to the air blowing tube 100 that forms a flow path of a gas, the moving body 200, the air-blow control unit 300, the blower 310, and the like.

The moving body 200 includes the moving body magnetic material 213, and the transport body 500 includes the transport body magnetic material 523. At least one of the moving body magnetic material and the transport body magnetic material is a magnet, and the transport body is moved in conjunction with movement of the moving body receiving the air flow due to attraction and/or repulsion based on a magnetic force acting between the moving body magnetic material and the transport body magnetic material.

While the transport path 401 as the transport body route extends as a linear route in the present embodiment, this is an example and the transport path 401 may be configured to form a loop including rounded routes.

While each of the receiving units 600 is included in the associated sandwiched machine 2 illustrated in FIG. 1 and the game machine 1 is arranged at a location adjacent to each of the sandwiched machines 2 on the bank facilities L in actual game holes, explanations of the game machines are omitted in the present embodiment.

Each of the receiving units 600 includes a banknote receiving part (paper sheet receiving part) 605 that receives an input banknote, an introducing part 610 that sequentially transfers (guides) the banknote input to the banknote receiving part 605 to the associated keeping part 450, the transport mechanism 620 (details are not illustrated) such as a roller, a belt, and a motor constituting the introducing part 610, and the like.

The transport body 500 moving in the transport path 401 includes the banknote collecting/retaining part (transfer unit) 540 that sequentially collects a banknote stopping at each of the keeping parts 450 in the process of passing the keeping parts with which the receiving units 600 are respectively communicated, transfers the banknote on the transport body in an upright state, and retains the banknotes in a stacked manner. The banknote collecting/retaining part has a configuration to retain banknotes with one face (a side surface) of a following banknote stacked on one face (a side surface) of preceding banknotes that have already been transferred thereon.

The transport path 401 extends between a right end portion (an initial position) in FIGS. 11 to 14 and a banknote discharge position inside the safe system 700, and transport body sensors (photosensors, not illustrated) are arranged at places in the transport path 401, respectively, to check in real time the current location of the transport body 500 in the transport path 401, whether the transport body has passed, and the timing of passage. For example, transport body detecting sensors are arranged at appropriate places such as the initial position, each of the keeping parts 450, and the safe system 700, respectively. Moving body sensors for detecting the location of the moving body 200, whether the moving body has passed, and the timing of passage are also arranged at places in the longitudinal direction of the air blowing tube 100, respectively.

When the sensor in the keeping part 450 in a certain receiving unit 600 detects that there is no banknote in the keeping part, the controlling unit 800 drives the transport mechanism 620 of the introducing part 610 to transfer the following banknote input to the banknote receiving part to the keeping part, and stops the transport mechanism when movement to the keeping part is detected and confirmed. When input of the following banknote to the banknote receiving part 605 is detected while a banknote kept in the keeping part 450 is detected, the controlling unit 800 drives the transport mechanism 620 of the introducing part 610 to receive the banknote and stops the banknote in the introducing part. Therefore, a user of the game machine can uninterruptedly input two paper sheets such as banknotes and the waiting time can be shortened.

<<Receiving Unit 600>>

As illustrated in FIGS. 15 to 18, each of the receiving units (the banknote receiving devices) 600 includes the banknote receiving part (banknote receiving port) 605 that is provided at the front of a body 601 of the receiving unit and that receives a banknote input one by one, and the introducing part 610 that is arranged from the banknote receiving part 605 to the inside of the body 601 and that introduces the received banknote into the associated keeping part 450. The introducing part 610 schematically includes an introducing route 612 that is a space for sequentially transferring (guiding) a banknote input into the banknote receiving part 605 to the keeping part 450, and the transport mechanism 620 constituted of a roller, a belt, a pulley, a gear, a motor, and the like arranged along the introducing route.

A recognition unit 630 that recognizes and judges authentication of an input banknote, denomination thereof, and the like is provided in the introducing part 610 and the controlling unit 800 reverses the transport mechanism 620 to discharge a banknote from the banknote receiving part 605 when the banknote is not to be received. The banknote that is judged to be receivable by the recognition unit 630 is transported by the transport mechanism 620 in the introducing part 610 to the associated keeping part 450.

The introducing route 612 includes a first introducing route part 613 that extends from the banknote receiving part 605 to the transport path 401 to be orthogonal thereto, a second introducing route part 615 that is communicatively connected to the first introducing route part 613 to extend in the retracting direction R that is a direction substantially parallel to the transport path 401 and away from the safe unit 700, and an inversion path (inversion part) 619 that is formed on an outer periphery side of an inversion roller 617 arranged at a termination portion of the second introducing route part 615 and that causes the second introducing route part 615 to be communicated with the keeping part 450 as illustrated in FIGS. 17 and 18. The inversion path 619 is directly communicated with the keeping part 450 and a banknote passing through the inversion path enters the keeping part 450 and stops in the keeping part 450. The inversion path 619 is latched between the outer periphery of the inversion roller 617 and a transport guide plate 619a that is arranged to be opposed to the outer periphery with a predetermined transport space away therefrom.

The keeping part 450 is a space formed in a body 455 to transport and keep a banknote, and is formed of a guide plate 460 on the side of the transport path 401 and another guide plate 465 arranged with a predetermined transport space away from the guide plate 460. The keeping part 450 is designed to have a length and a shape that enable a longest banknote in the long edge direction to be kept therein while the extended attitude parallel to the transport path 401 is maintained in a state where the rear end edge of the longest banknote has passed through the inversion path 619. The banknote kept in the keeping part needs to be positioned in such a manner that the banknote can be transferred from the keeping part onto the transport body (banknote carrier) 500 while the collecting pawls 544 press the rear end edge of the banknote in the forward direction P in contact therewith when the transport body passes the keeping part. The rear end of the banknote kept in the keeping part is configured to be sufficiently separated from inversion driving means such as the inversion roller 617, so that the banknote can be continuously kept without influences of the inversion roller or the like even when the inversion roller is driven.

As illustrated in FIG. 18, a tracking sensor S1 that detects entry of a banknote is installed in the banknote receiving part 605, and other tracking sensors S2 to S5 are provided at appropriate places on the downstream side, for example, the entrance and the exit of the recognition unit 630, the connection portion between the first introducing route part 613 and the second introducing route part 615, and the inversion path 619, respectively.

A sensor S6 that detects entry of a banknote from the inversion path 619 and sensors S7 that detect collection of a banknote from the keeping part are arranged in the keeping part 450.

The first introducing route part 613 includes an entrance route part 613a including the recognition unit 630, and a keeping route part 613b for the following banknote on the downstream side. A banknote that is judged to be receivable on the basis of recognition information obtained when the banknote passes the recognition unit 630 moves to the keeping route part 613b and is transported into the keeping part 450 through the second introducing route part 615 and the inversion path 619 when the sensors S6, S7, and the like detect no preceding banknote kept in the keeping part 450. The range of the keeping location for the following banknote may reach the inversion path 619 beyond the keeping route part 613b.

At the time when the sensors S6, S7, and the like detect that the banknote front end or the banknote rear end has reached the adequate keeping location after passage of the banknote rear end through the inversion path 619, the banknote is stopped in transportation and shifts to a standby state. The location of the banknote rear end at the time when the banknote has shifted to the standby state is set to a location where the rear end is not in contact with a transport unit on the side of the introducing part 610, such as the inversion roller 617 constituting the inversion path, whereby the banknote can maintain the stopped state without interference even when the transport mechanism on the upstream side, including the inversion roller, is driven to transport the following banknote. For example, even when the following banknote is judged to be unreceivable by the recognition unit 630 and the transport mechanism including the first introducing route part 613 and the second introducing route part 615 is accordingly inversely driven, the location of the banknote stopped in the keeping part, and the operation thereof are not affected.

When a banknote P1 in the keeping part is collected by the transport body 500 and it is detected that no banknote is in the keeping part, a following banknote P2 having been kept in the route part 613b or 615 on the upstream side of the inversion path 619 is sent into the keeping part 450 through the inversion path by redriving of the transport mechanism including the inversion roller 617.

<<Transport Body (Banknote Collecting Shuttle>>

Figure 20A:
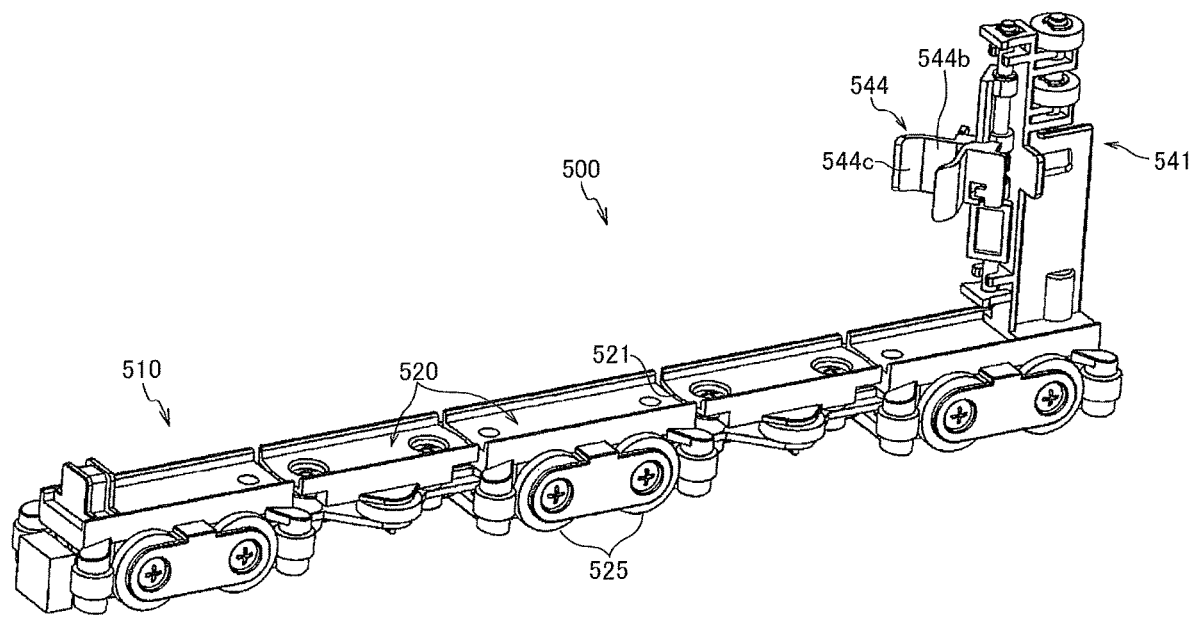
FIGS. 20(a) and 20(b) are an exterior perspective view and a plan view of the transport body 500 in a state where the collecting members (the collecting pawls) are closed.
Figure 20B:
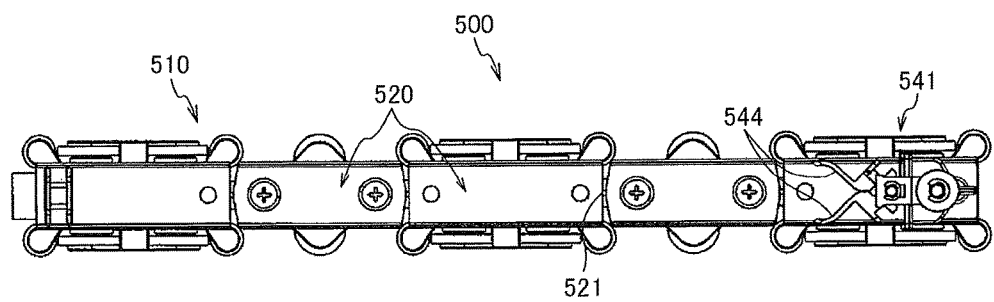
Figure 22C:
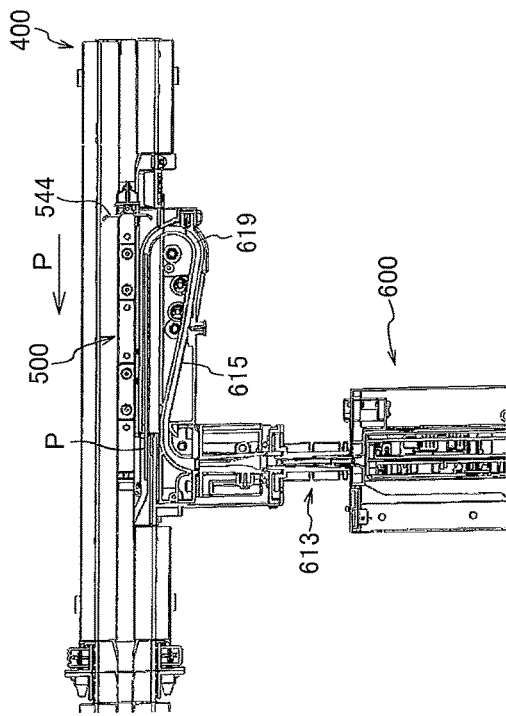
FIGS. 22(a), 22(b), 22(c), and 22(d) are plan horizontal sectional views illustrating a procedure in which the collecting members enter a keeping part to collect a kept banknote in a process of the transport body 500 moving forward.
Figure 22D:
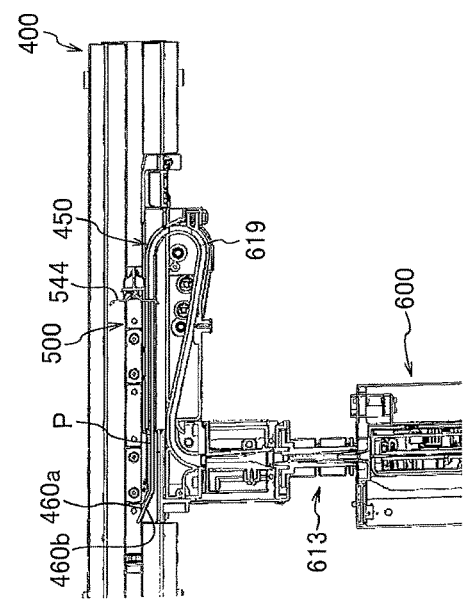
Figure 22A:
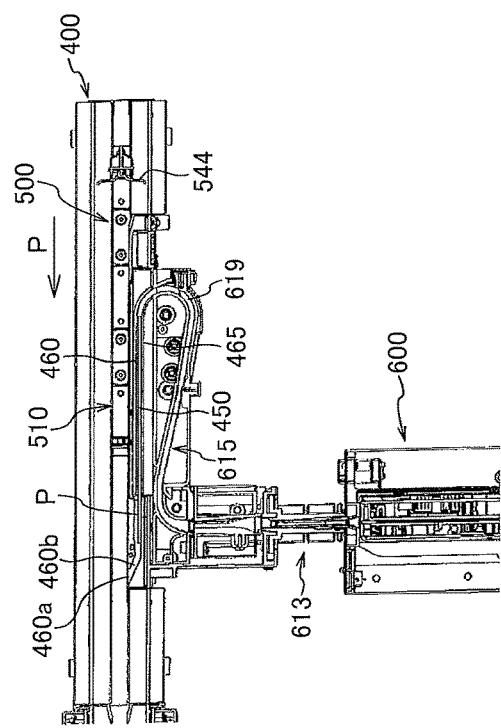
Figure 22B:
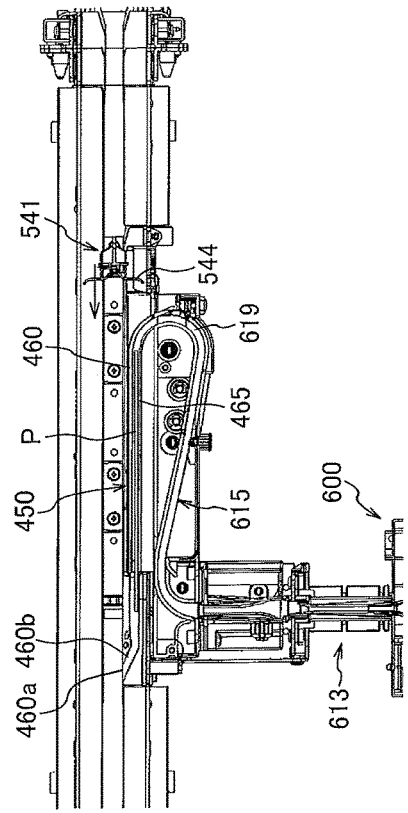
Figure 23:
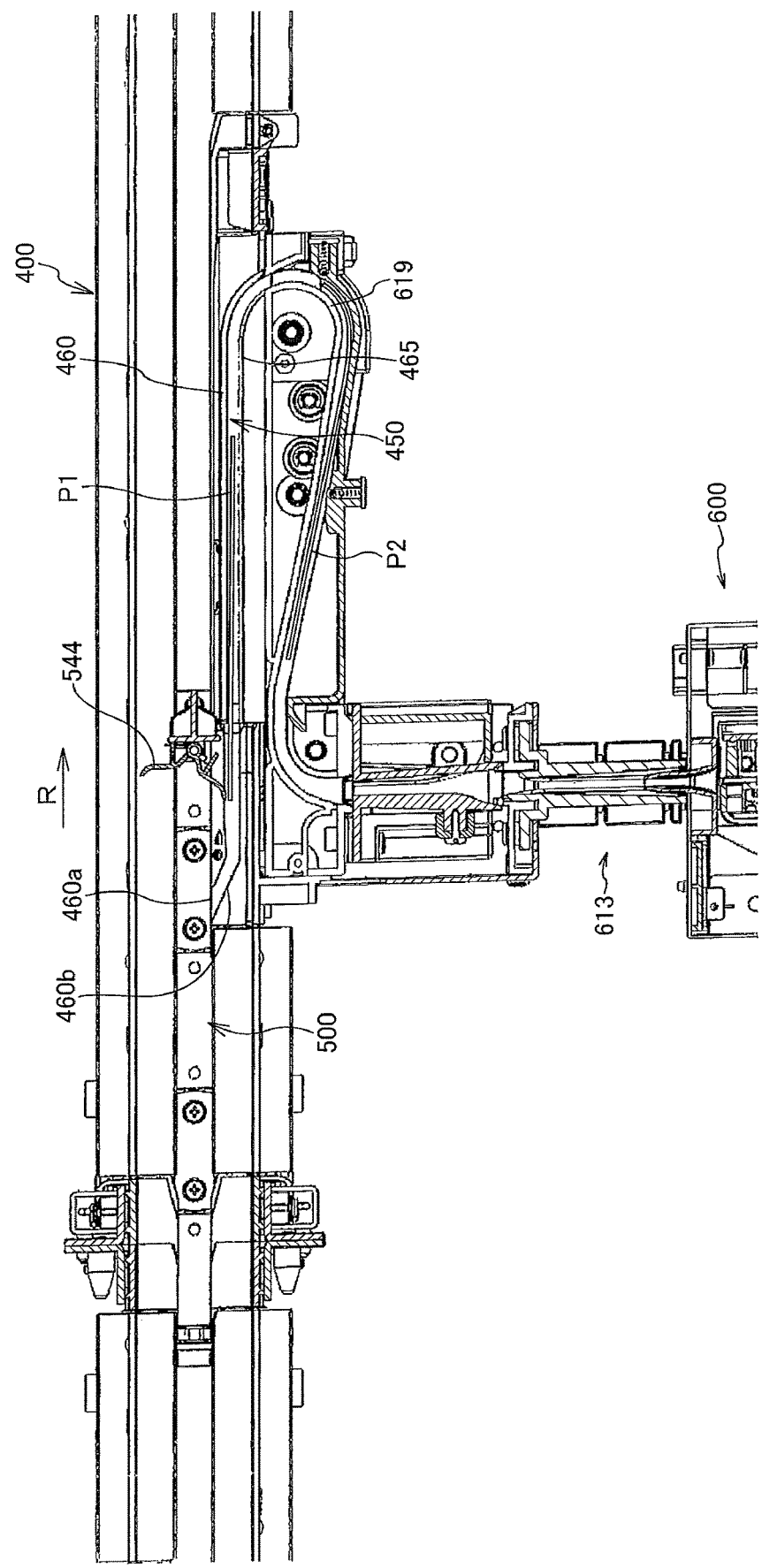
FIG. 23 is a plan horizontal sectional view illustrating a state where one of the collecting pawls deforms in a process of the transport body moving backward.

FIGS. 19(a), 19(b), 19(c), and 19(d) are an exterior perspective view, a front view, a plan view, and a sectional view along A-A in FIG. 19(a) of the transport body 500 in a state where the collecting members (the collecting pawls) are opened. FIGS. 20(a) and 20(b) are an exterior perspective view and a plan view of the transport body 500 in a state where the collecting members (the collecting pawls) are closed. FIG. 21 is a partial sectional view illustrating the location relation between the transport tube 400 and the transport body 500. FIGS. 22(a), 22(b), 22(c), and 22(d) are plan horizontal sectional views illustrating a procedure in which the collecting members enter the keeping part to collect a kept banknote in the process of the transport body 500 moving forward. FIG. 23 is a plan horizontal sectional view illustrating a state where one of the collecting pawls deforms in the process of the transport body moving backward.

The transport body 500 illustrated in FIGS. 19 to 21 are slightly different from the transport body illustrated in FIG. 6 in the configurations of the transport base 510 and the collecting members 544.

That is, the transport base 510 has a configuration in which the divided pieces 520 are coupled to each other with the hinges 521 to be displaceable in the upper-lower or right-left direction (or an oblique direction) and the transport body magnet (the transport body magnetic material) 523 is arranged in an internal space 520a of each of the divided pieces illustrated in FIG. 19(d). A rotatable roller 525 is also arranged on both side surfaces of each of the divided pieces 520 to enable smooth movement in the transport tube 400. Rollers 545 are rotatably arranged on an upper portion of the support member 541 to reduce resistance with the inner wall of the transport tube.

The banknote collecting/retaining part (transfer unit) 540 retains banknotes P to cause the long edge direction of the banknotes P to be in parallel to the longitudinal direction of the transport tube 400 and in an upright attitude. A long side on the lower side of the banknote P horizontally long and in the upright attitude is supported by the upper surface (the flat surface) of the transport base 510 (the divided pieces 520). The rear end edge (one of short sides) of the banknote is supported by the support member 541 and the collecting members 544.

While projections 520b preventing dropping of banknotes are provided on each of the divided pieces 520 on both end edges in the width direction, respectively, a region 520c on the inner side of the projections 520b is a flat surface and can stably support the long side on the lower side of the banknote. Since the regions 520c on the inner sides of the divided pieces 520 are communicated with each other in the longitudinal direction, the banknote can be loaded across the inner regions 520c of plural divided pieces.

The banknote collecting/retaining part 540 erected on the transport base 510 includes, at an end portion on the bank end side in the longitudinal direction of the transport tube 400 (on the distal end side with respect to the safe unit 700), the support member 541 that is upright in a direction away from the air blowing tube 100, and the collecting members 544 including the two collecting pawls 544 that are protruded (spread) in the width direction from the support member 541 in a wing-like manner (at an acute angle or an obtuse angle) in plan view and that are pivotally supported by a pivotally support part 541a on the side of the support member 541 to be openable/closable in the horizontal direction. Since the illustrated pivotally support part 541a is in parallel to the support member 541, that is, in a vertical attitude, the collecting pawls 544 rotating on the pivotally support part horizontally open and close. The rotation direction of the collecting pawls may be other directions.

A pair of the collecting members 544 are arranged at a predetermined height location of the support member 541 unlike the configuration example of FIG. 6 in which upper and lower two pairs of the collecting members are arranged.

The two collecting pawls 544 constituting the collecting members 544 are at the maximum open angle in the spread state illustrated in FIGS. 19 and cannot rotate in the opening direction any more while they can rotate in the closing direction from the spread state. FIG. 20 illustrate a state (closed state) in which the two collecting pawls 544 are at the minimum open angle. Each of the collecting pawls 544 is always elastically biased in the opening direction by a spring (an elastic member) 541b provided on the pivotally support part 541a. When the transport body 500 moves in the forward direction P toward the safe unit 700 on the transport path 401, each of the collecting pawls 544 maintains the spread position with the spring 541b and the collecting pawls can therefore catch the rear end edge of a banknote stopped in the upright state in each of the keeping parts 450 to transfer the banknote onto the transfer base 510 while moving the banknote in the forward direction P in the keeping part. Concave portions 405 (FIGS. 16 and 21) serving as collecting pawl passages are formed at places that are both inner walls of the transport tube 400 and that are passed by the collecting pawls to enable the collecting pawls 544 to maintain the spread position in the process of the transport base 510 moving in the transport path 401 in the forward direction P toward the safe unit 700, respectively. The concave portions 405 in each of the keeping parts 450 are laid out to enable each of the collecting pawls to be brought into contact with the rear end edge of the banknote in the keeping part. It is preferable that the collecting pawls 544 are configured to independently perform the opening/closing operation. In such a case, each of the collecting pawls may be constituted of one coil spring (or a torsion spring) to individually rotate, or the spring 541b may be provided for each of the collecting pawls.

Each of the collecting pawls 544 in the spread state illustrated in FIG. 19 includes a base end piece 544a on the inner side, which is pivotally supported by the pivotally support part 541a to be capable of rotating, an intermediate piece 544b extending outward in the width direction of the transport body from the base end piece 544a, and an end portion piece 544c bent or curved to be protruded in a diagonally forward direction from the intermediate piece 544b. When the collecting pawls 544 pass in the keeping part 450, the intermediate piece 544b and the end portion piece 544c mainly enter the keeping part 450 and push the whole banknote in the forward direction while being in contact with the rear end edge of the kept banknote. If the banknote rear end edge being in contact with the intermediate piece 544b is about to be deviated outward in the width direction along the face of the intermediate piece, the end portion piece 544c can reliably block the deviation because the end portion piece 544c is protruded obliquely from an end portion of the intermediate piece 544b. After the kept banknote is transferred onto the transport base 510, the end portion piece 544c prevents the loaded banknotes from being deviated in the width direction or dropping.

With the configuration of the intermediate piece 544b to have an attitude parallel to the width direction of the transport path 401 or oblique to the forward direction P in the spread position of the collecting pawls 544 as illustrated in FIGS. 19, the intermediate piece reliably seizes and presses the banknote rear end edge in the forward direction when being brought into contact with the read end edge in each of the keeping parts.

In this way, the collecting members 544 include a pair of collecting pawls pivotally supported by the support member to be openable and closable in a substantially horizontal direction, and each of the collecting pawls opens and closes between the spread position protruded outward in the width direction and the retracted position retracted inward in the width direction and is biased toward the spread position by the elastic member.

Since each of the collecting pawls 544 has the configuration described above, only linearly moving the transport body at the time of collecting banknotes in the keeping parts that are alternately positioned at different locations in the longitudinal direction across the transport path 401, enables the banknotes to be reliably collected by the associated collecting pawl and to be accumulated in a central portion of the transport body in the width direction.

When the transport body 500 moves in the retracting direction R in the transport path, the collecting pawls interfere with banknotes in the keeping parts. However, the collecting pawls change the position in the closing direction against the biasing of the elastic member in the process of continuing to move in contact with the banknotes. Accordingly, the transport body 500 can smoothly continue to move in the return direction without providing impact such as damages on the kept banknotes.

Since the method of sequentially loading a collected following banknote with one face of the following banknote stacked on one face (one side surface) of already loaded banknotes in a state where banknotes are already loaded on the transport base 510 in the upright state is adopted, a situation in which the front end edge of the following banknote hits the rear end edge of the already loaded banknotes to disable the loading does not occur.

As illustrated in FIGS. 18, 22, 23, and the like, the guide plate 460 is provided between each of the keeping parts 450 and the transport path 401 as a partition that separates these parts from each other, and an opening part 460a for extracting a banknote to the transport path 401 is provided at an end portion of the guide plate 460 in the forward direction. A slit (not illustrated) through which the associated collecting pawl 544 can pass is formed on the guide plate 460 in parallel to the banknote transport direction, thereby preventing the guide plate 460 from blocking the collecting pawl during passage in the keeping part. A slit (not illustrated) through which the associated collecting pawl 544 can pass is also formed on the other guide plate 465 in parallel to the banknote transport direction, thereby preventing the guide plate 465 from blocking the collecting pawl during passage in the keeping part.

In the process of the banknote in the keeping part being pushed at the rear end edge by the collecting pawl to move in the forward direction P, the front end of the banknote protrudes from the opening portion 460a toward the transport path 401 and separates from the keeping part. An inclined surface 460b that guides the banknote toward the transport path at that time to enable the banknote front end edge to be reliably guided to the side of the transport path is provided on the opening portion (FIGS. 19, 22, and 23).

In this way, in the process of the banknote in each of the keeping parts 450 being pushed by the collecting pawl to move inside the keeping part toward the transport path 401, the movement is always from the front end portion of the banknote and along the longitudinal direction. That is, due to the guide plate 460, the banknote kept in the keeping part cannot move in a direction orthogonal to (approaching) the transport path 401 and moves from the opening portion 460a onto the transport body while moving in the forward direction P along the longitudinal direction of the keeping part. Furthermore, the banknotes already loaded on the transport body and the banknotes kept in the keeping parts are previously set in the location relation to be at the same height location and in the same attitude with the guide plate 460 interposed therebetween, and are arranged in such a manner that the respective locations in the banknote thickness direction (the width direction of the transport path) are reliably displaced (to prevent the banknotes from interfering with each other). Accordingly, when transfer of the banknote pushed out from the opening portion 460a onto the transport body is completed, the banknote is smoothly loaded on one side surface of the already loaded banknotes to be stacked thereon. Therefore, failure in the loading such as deviation or dropping due to hit of the end edges of the banknotes never occurs.

As described above, the kept banknotes in the keeping parts and the loaded banknotes on the transport body are in the location relation not interfering with each other, and only the collecting pawls 544 on the transport body are in the location relation that can interfere with the kept banknotes. Therefore, when the collecting pawls enter the space of each of the keeping parts, the collecting pawls can catch the banknote rear end in the keeping part, push the banknote in the forward direction from the kept location to cause the front end edge of the banknote to be protruded from the opening part 460a, and finally transfer the whole banknote onto the transfer body.

The collecting pawls 544 are configured to be able to individually rotate (retract) in the closing direction against the spring 541b when the collecting pawls 544 are brought into contact with an obstacle (banknotes in the keeping parts 450) in the process of the transport base 510 moving in the transport path 401 in the retracting direction R away from the safe unit 700, and to return to the original spread position after passing the obstacle. Accordingly, even when one of the collecting pawls 544 is brought into contact with a banknote P1 in one keeping part 450 located on the passage route in the process of the transport base 510 moving in the retracting direction R, this collecting pawl passes the banknote while retracting in the closing direction in the process of moving in contact with the banknote. Therefore, the transport base 510 can smoothly move (see FIG. 23).

As illustrated in FIG. 16, the concave portions 405 are formed on two opposing inner walls of the transport path 401, respectively, to enable the two collecting pawls 544 to smoothly pass through. The concave portions 405 are convex portions when seen from outside. While the concave portions 405 are formed on almost the entire length of the transport path 401 (almost the whole of the moving route of the transport body 500), the concave portions 405 are not provided at places where the receiving units 600 are arranged, that is, in a range interfering with the keeping parts 450. That is, convex wall portions of the transport path constituting the concave portions 405 are not provided in each of the exterior bodies 455 (FIGS. 16 and 18) including the associated keeping part 450 therein. A banknote in the kept state is arranged in the space in the exterior body 455 forming each of the keeping parts 450. Therefore, if the convex wall portion constituting each of the concave portions 405 extends to the inside of each of the keeping parts, the wall portion interferes with the space for keeping the banknote. In the exterior body 455 of the keeping part, the slits for avoiding the collecting pawls are formed on the guide plates 460 and 465 forming the keeping part. Accordingly, the collecting pawls entering the exterior body can be brought into contact with the kept banknote and transport the banknote.

A procedure in which the transport body (the banknote collecting/retaining part 540) collects banknotes stopping in the keeping parts 450 in the process of moving on the transport path 401 in the forward direction P toward the safe unit is explained next with reference to FIG. 22.

In a state illustrated in FIG. 22(*a*), while a portion of about two-thirds of the transport body 500 from the head of the transport base 510 reaches a location overlapping with the keeping part 450, the support member 541 is located behind the keeping part and accordingly the collecting pawls 544 are also behind the keeping part. In FIGS. 22(*b*) and 22(*c*), the support member 541 approaches more to the keeping part 450 than in FIG. 22(*a*) while the collecting pawls 544 are still outside the keeping part. In FIG. 22(*d*), the support member 541 enters the keeping part and, when there is a banknote in the keeping part, the collecting pawl 544 on the side of the keeping part is in contact with the rear end edge of the banknote and moves the banknote in the width direction of the transport path 401 while pushing the banknote in the forward direction P. Therefore, the banknote P is transferred (collected) onto the transport base 510 while keeping the upright attitude. When there are banknotes already transferred on the transport base, the banknote P is loaded to be stacked on the lateral side of the already loaded banknotes.

When the transport body 500 passes this keeping part 450 to collect a banknote in the subsequent keeping part located downstream in the moving direction, the collecting pawl 544 located on the side of the next keeping part collects the banknote.

FIG. 23 illustrates a state where one of the collecting pawls 544 rotates in the closing direction to avoid the banknote P stopping in the keeping part 450 in the process of the transport body 500 moving in the transport path 401 in the retracting direction R away from the safe.

With the banknote transport system according to the present invention, even when the transport body is moved at a high speed, a banknote retained in each of the game media dispensing devices (the receiving units) can be reliably and promptly collected and transferred onto the transport body and, at the same time, a plurality of banknotes can be stably transported without paper sheet jam while retained in an aligned manner.

<<Collecting Procedure for Paper Sheets by Transport Body>>

In the banknote transport system 10 having the configuration described above, various types of processing described below can be performed depending on the relation with the keeping parts 450 and whether there is a banknote in the introducing part 610.

Figure 24:
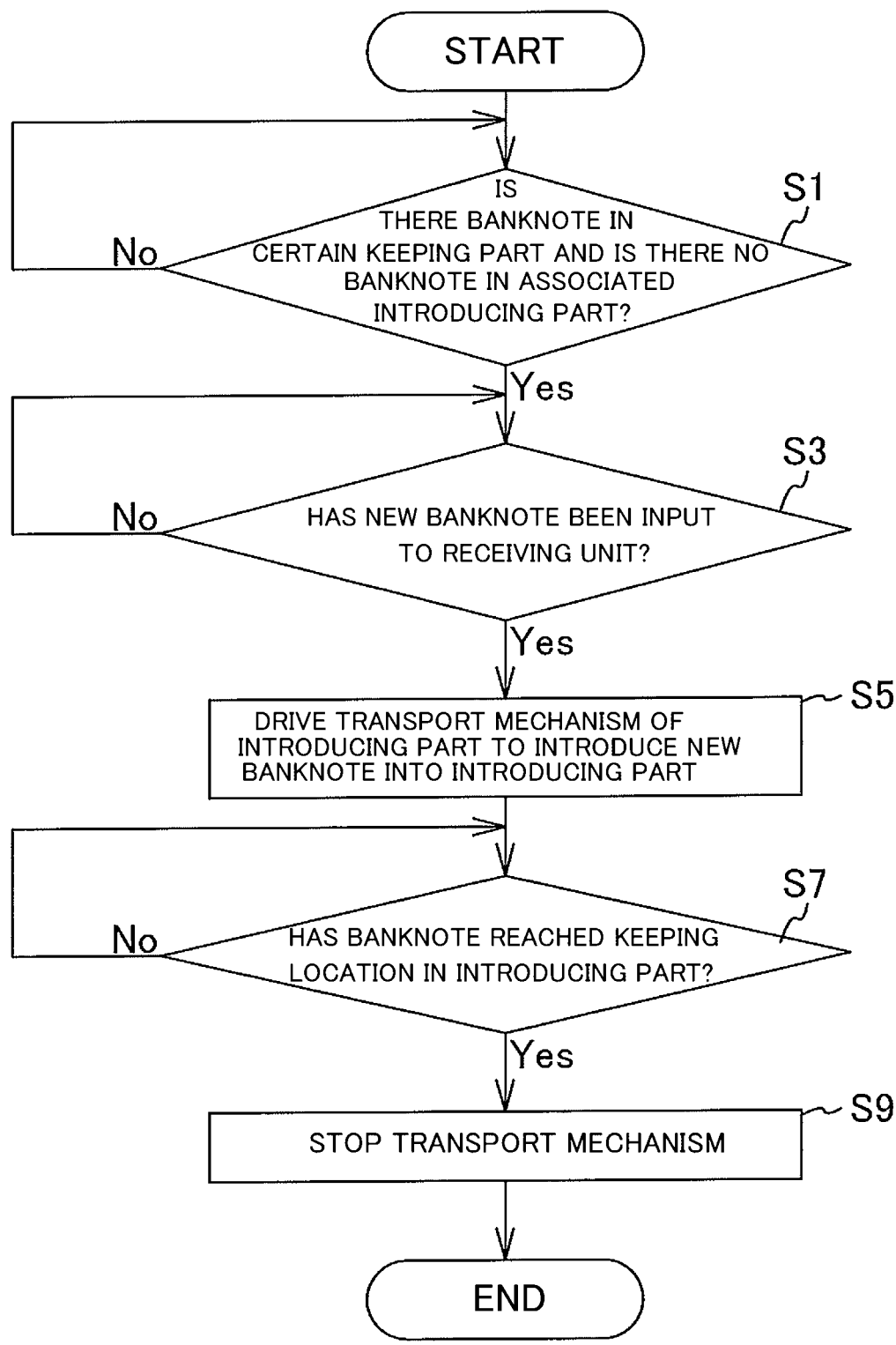
FIG. 24 is a flowchart illustrating an example of a collecting procedure and an introducing procedure for banknotes by the transport body.

FIG. 24 is a flowchart illustrating an example of a collecting procedure and an introducing procedure for banknotes by the transport body.

When it is detected that a banknote is stopping in a certain keeping part 450 and there is no banknote in the associated introducing part 610 (YES at Step S1), and when it is detected that a following banknote has been newly input to the receiving unit (the banknote receiving device) 600 corresponding to the keeping part (YES at Step S3), the controlling unit 800 controls relevant components to receive the following banknote in the introducing part 610 and stop (keep) the banknote inside the introducing part (Steps S5, S7, and S9).

This enables any place in the introducing part 610 on the upstream side of the keeping part 450 to be used as a keeping part for the following banknote, and the second banknote can be therefore input in a state where no banknote is in the keeping part.

Figure 25:
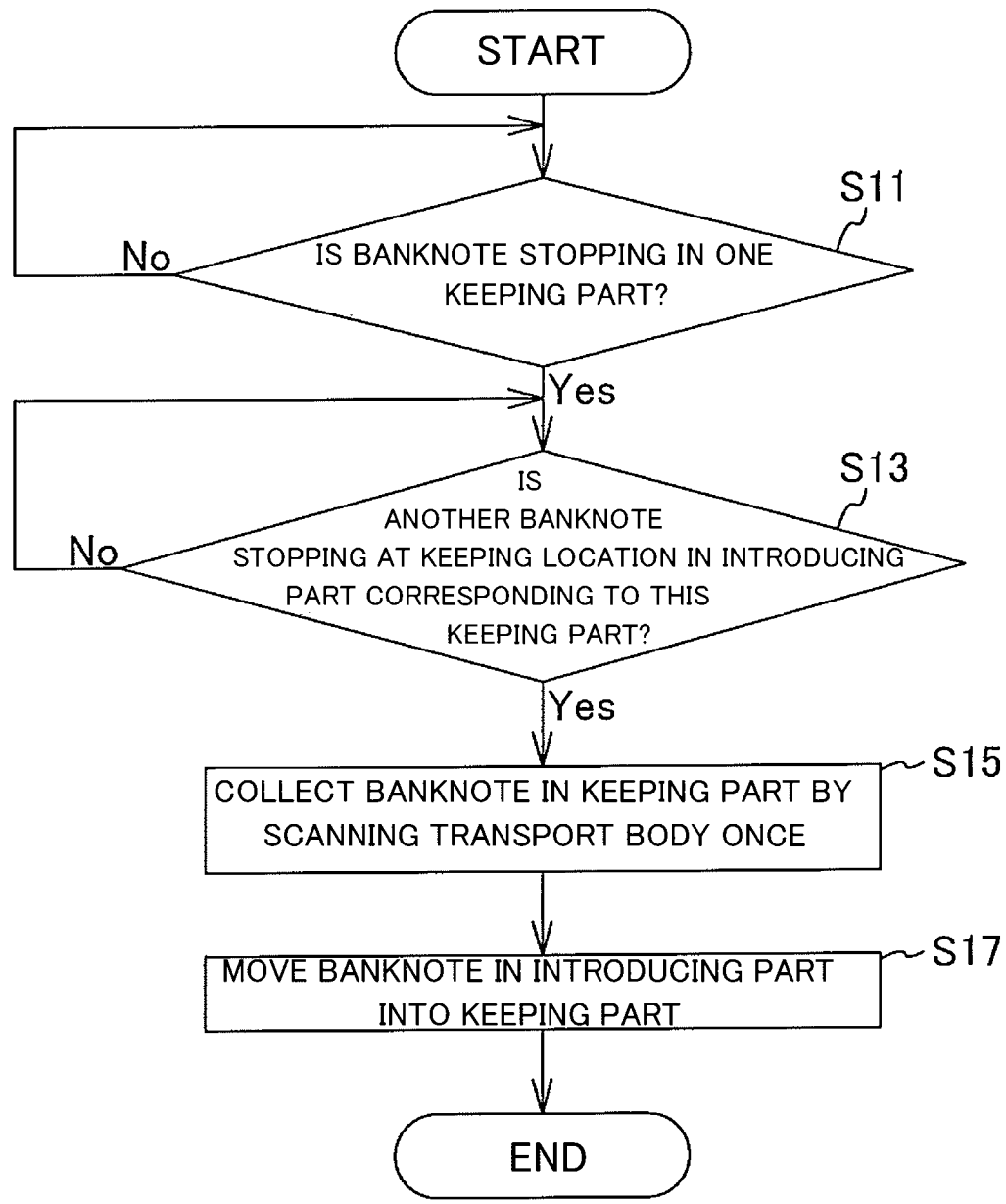
FIG. 25 is a flowchart illustrating another example of the collecting procedure and the introducing procedure for paper sheets by the transport body.

FIG. 25 is a flowchart illustrating another example of the collecting procedure and the introducing procedure for paper sheets by the transport body.

When it is detected that different banknotes are simultaneously in the kept state in any one of the keeping parts 450 and in the introducing part 610 on the upstream side of this keeping part, respectively (YES at Steps S11 and S13), the controlling unit 800 controls relevant components to enable the banknote in the keeping part 450 to be collected by scanning the transport body 500 once from the initial position to the location of the safe system 700 using the moving body 200 (Step S15) and to enable the banknote in the introducing part 610 to move into the keeping part 450 (Step S17).

When banknotes are kept in the keeping part 450 and the introducing part 610, respectively, the third banknote cannot be input. However, the control described above enables the introducing part 610 to be emptied and the third banknote to be input therein.

Figure 26:
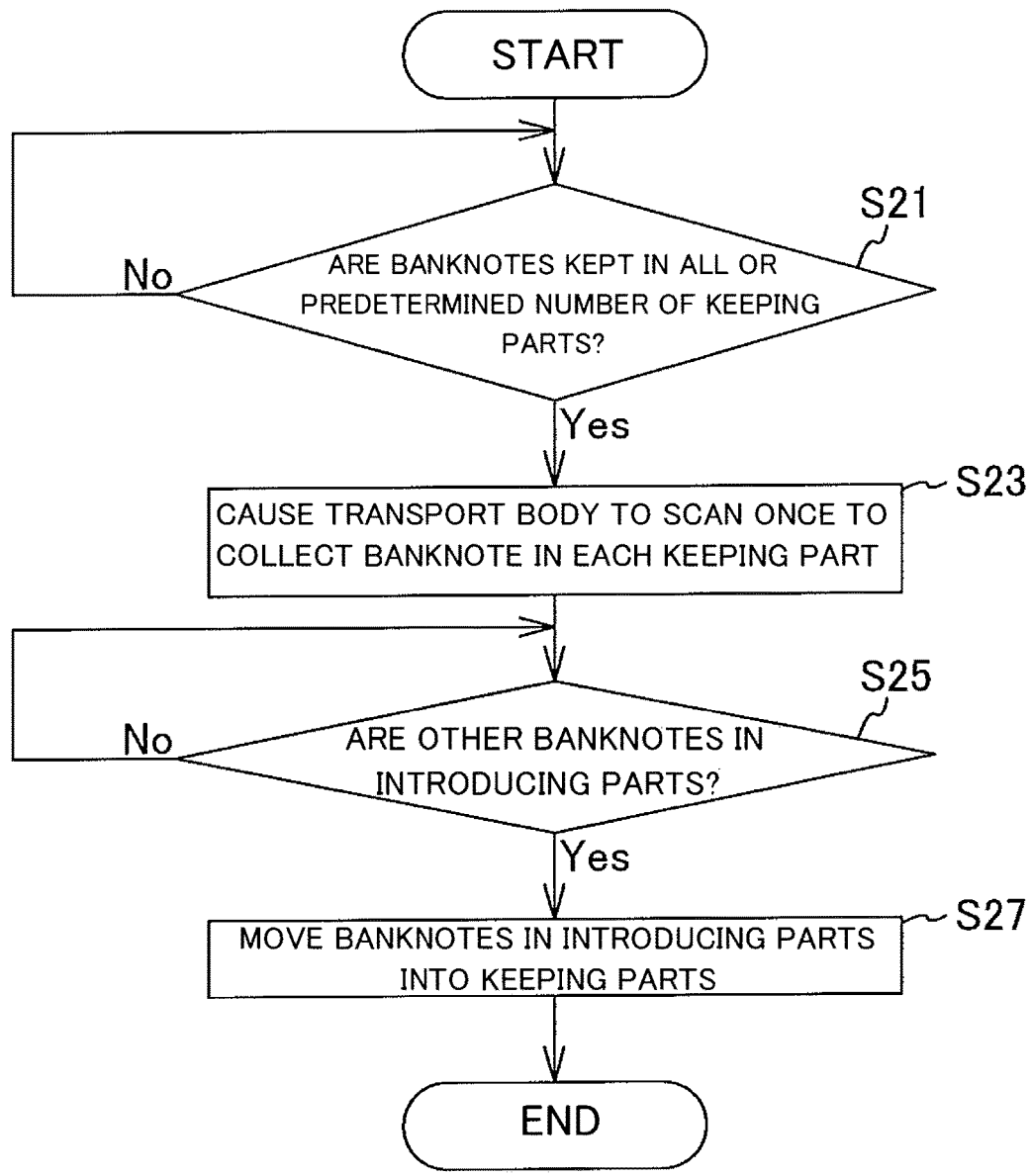
FIG. 26 is a flowchart illustrating another example of the collecting procedure and the introducing procedure for paper sheets by the transport body.

FIG. 26 is a flowchart illustrating another example of the collecting procedure and the introducing procedure for paper sheets by the transport body.

When it is detected that banknotes are in the kept state in all the keeping parts 450 or when it is detected that banknotes are kept in a predetermined number of or more (for example, ten or more) keeping parts, respectively (YES at Step S21), the controlling unit 800 causes the transport body 500 to scan once from the initial position to a location near the safe system 700 using the moving body 200 (Step S23). Accordingly, the controlling unit 800 controls relevant components to collect the banknotes in the keeping parts 450 and, when there are banknotes in the introducing parts 610, move these banknotes into the associated keeping parts, respectively (Steps S25 and S27).

This can reduce the waiting time in which banknotes cannot be input and can increase the convenience of users.

C. Paper Sheet Transport System and Restoration Method According to Third Invention The banknote (paper sheet) transport system and the restoration method according to a third invention are explained next.

FIGS. 27(*a*) and 27(*b*) are a front vertical sectional view of portions of the air blowing tube 100 and the transport body route 401 on the side of the initial position in the banknote transport system according to the third invention, and a front vertical sectional view of portions thereof on the side of the safe system (the bank end unit). FIGS. 28(*a*) and 28(*b*) are a front view illustrating a state where the moving body causes the transport body to normally travel for collection of banknotes, and a front view illustrating a state where the moving body solely travels ahead because the transport body has stopped. FIGS. 29(*a*) and 29(*b*) are front views for explaining a control procedure for restoration.

The third invention is explained while referring also to FIGS. 1 to 26 related to the first and second inventions and parts equivalent to those in the first and second inventions are denoted by like reference signs.

Illustrations of the wall portions (tube walls) respectively constituting the air blowing tube and the transport body route are omitted in FIGS. 28 and 29.

The banknote transport system 10 according to the third invention includes the air flow generating device (the blower) 310, the air blowing tube 100 that forms therein a flow path of an air flow generated by the air flow generating device, the switching unit 320 that controls the direction of the air flow in the air blowing tube, the controlling unit 800 that controls the air flow generating device 310 and the switching unit 320, the moving body 200 that travels inside the air blowing tube while receiving an air flow flowing in a predetermined direction within the air blowing tube 100, the transport body route 400 (401) that has at least a portion arranged along the air blowing tube to be adjacent to the air blowing tube, and the transport body 500 that is configured to be able to retain banknotes and that travels inside the transport body route.

The moving body 200 includes the moving body magnetic material 213, and the transport body 500 includes the transport body magnetic material 523. The system includes a configuration to, using repulsion based on a magnetic force acting between the moving body magnetic material and the transport body magnetic material when the moving body and the transport body are in a predetermined close location relation (docking location relation), move the transport body in conjunction with movement of the moving body while maintaining the close location relation.

When the moving body 200 separates from the range of the close location relation with the transport body 500 due to stop of the transport body in the middle of the transport body route because of a failure such as jam, the controlling unit 800 causes the moving body to travel in a direction further away from the transport body and to temporarily stop while stopping the transport body at a predetermined end portion stop position. Subsequently, the controlling unit 800 causes the moving body to travel toward the transport body (the end portion stop position) at a speed resistible against the repelling force between the magnetic materials, thereby returning the moving body into the range of the close location relation.

More specifically, when the moving body 200 moves ahead and separates from the range of the close location relation due to suspension of the transport body 500 in the process of the moving body moving the transport body that is in the close location relation in a predetermined direction (the forward direction P or the retracting direction R), the controlling unit 800 causes the moving body to move the transport body in the opposite direction to the original travel direction to stop at the predetermined end portion stop position. The controlling unit 800 subsequently causes only the moving body to travel in the direction further away from the transport body, to temporarily stop, and then to travel toward the transport body at a speed resistible against the magnetic repelling force, thereby returning (restoring) the moving body into the range of the close location relation.

In the banknote transport system 10 according to the present invention, there is a region in which the air blowing tube 100 and the transport tube 400 are arranged in parallel to each other in a close upper-lower location relation as illustrated in FIG. 27. In this parallel arrangement region, the moving body 200 and the transport body 500 can have a proximate upper-lower location relation (the close location relation) as illustrated in FIG. 28 with the tube walls respectively constituting the air blowing tube and the transport tube interposed therebetween. When the moving body and the transport body are in the close location relation, the close location relation can be maintained (these bodies can be docked) with the repelling force (or the attracting force) between the magnetic materials 213 and 523 included in the moving body and the transport body, respectively, and the transport body can be synchronously moved in conjunction with the motion of the moving body.

Figure 27A:
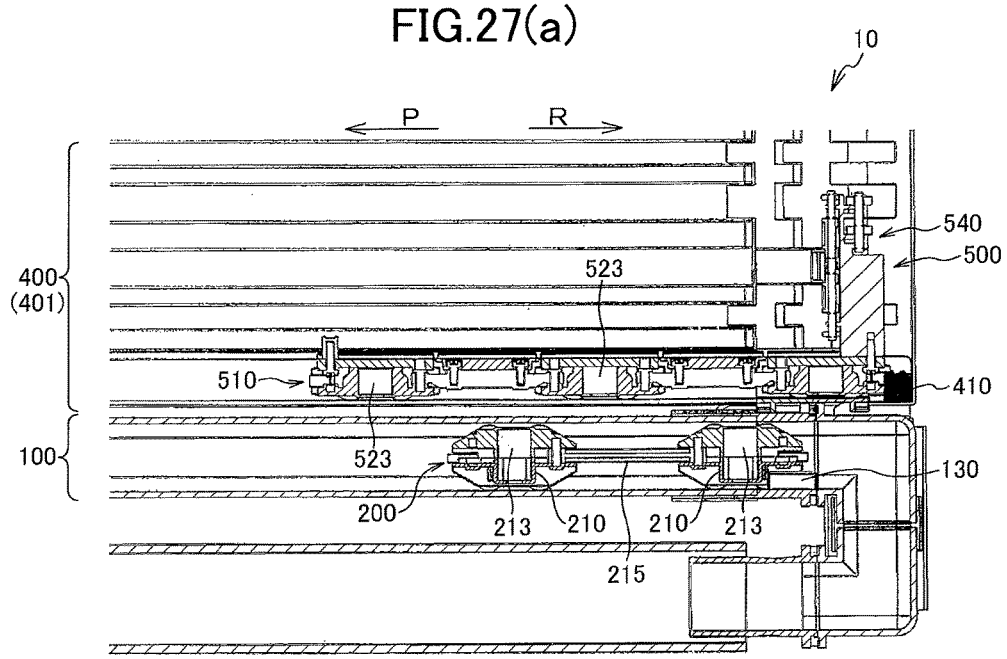
FIGS. 27(a) and 27(b) are a front vertical sectional view of portions of the air blowing tube and the transport body route on the side of an initial position in the banknote transport system according to a third invention, and a front vertical sectional view of portions thereof on the side of a safe system (a bank end unit).

At the upstream end (the initial position) of the banknote transport system 10 illustrated in FIG. 27(a), the air blowing tube 100 and the transport tube 400 are docked in the proximate upper-lower location relation with the respective tube walls thereof interposed therebetween. In this docked state, the transport body 500 moves in the transport tube 400 to follow the moving body 200 in conjunction with the advancing/retracting motion thereof.

A stopper 130 that stops and prevents the moving body from moving any more in the upstream direction (the retracting direction R) is arranged at an upstream end portion of the air blowing tube 100. Similarly, a stopper 410 that stops and prevents the transport body 500 from moving any more in the upstream direction is arranged at an upstream end portion of the transport tube 400.

Figure 27B:
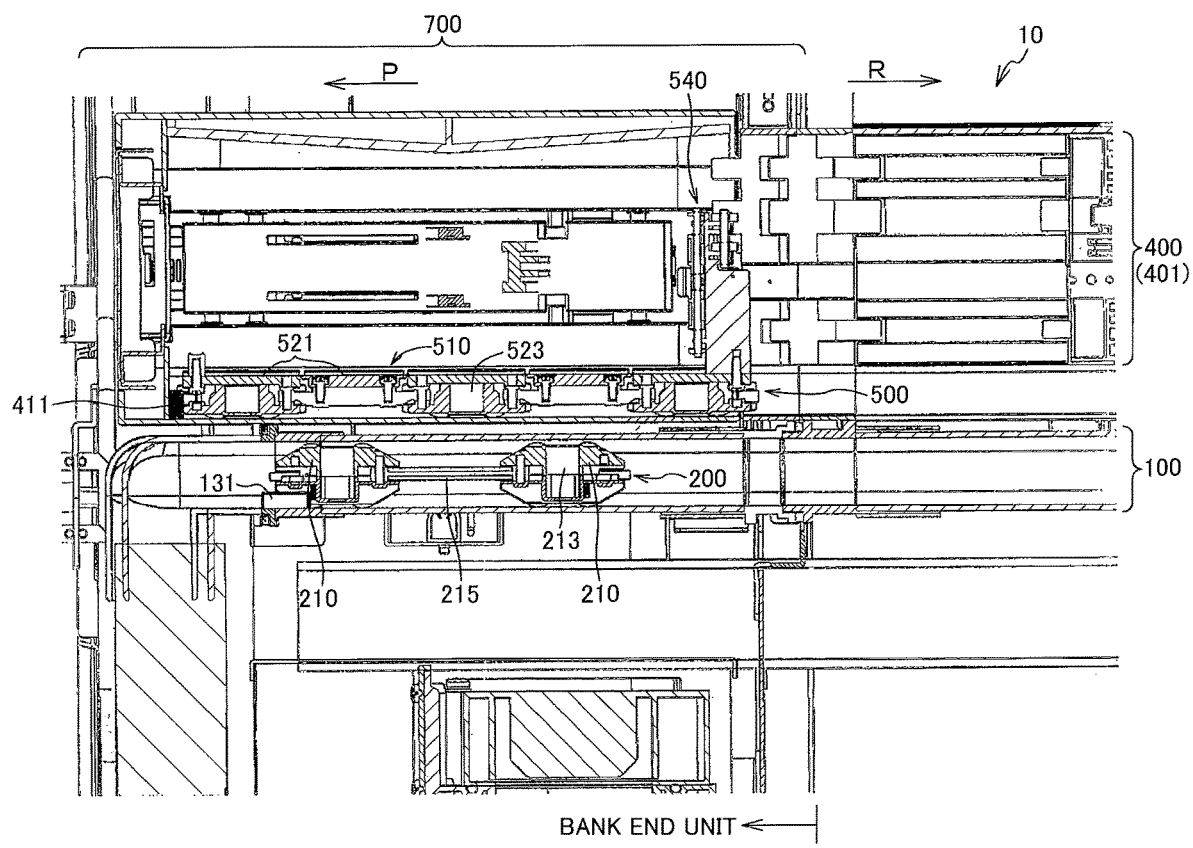

Also in the safe system (the bank end unit) illustrated in FIG. 27(b), a stopper 131 that stops and prevents the moving body from moving any more in the downstream direction is arranged at a downstream end portion of the air blowing tube 100 similarly at the upstream end portion. Similarly, a stopper 411 that stops and prevents the transport body 500 from moving any more in the downstream direction is arranged at a downstream end portion of the transport tube 400. When the transport body is stopped by the stopper 411 at the downstream end portion, the moving body stopped by the stopper 131 is positioned (docked) at a substantially central portion of the transport body in the longitudinal direction.

A control procedure (a restoration method) for position adjustment between the moving body and the transport body, which is the characteristic of the third invention, is explained next with reference to FIGS. 28, 29, and 30.

Figure 30:
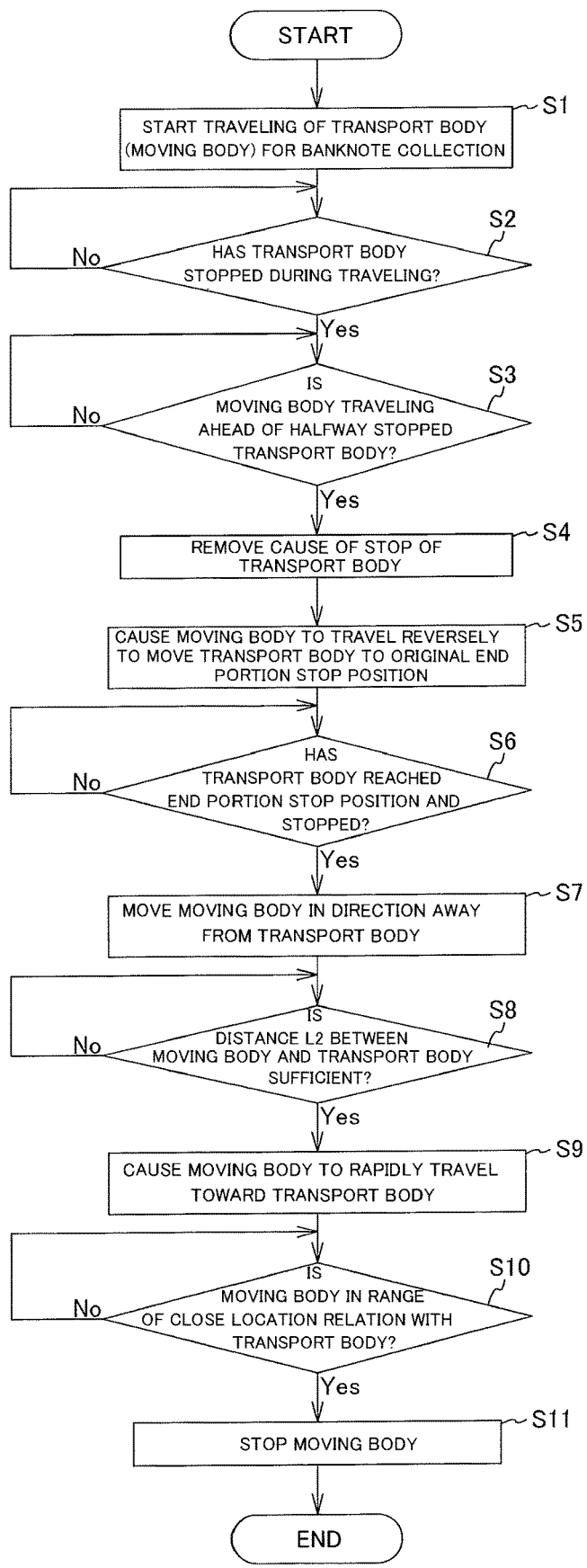
FIG. 30 is a flowchart illustrating a restoration method for the moving body and the transport body by a banknote transport system 10.

FIG. 30 is a flowchart illustrating the restoration method for the moving body and the transport body by the banknote transport system 10.

In the docked state illustrated in FIG. 28(a), the moving body 200 travels in the forward direction P, whereby the transport body 500 located immediately thereabove moves in the same direction in conjunction therewith. At the time of banknote collection, the transport body 500 travels in the same direction while collecting a banknote in each of the keeping parts 450 at locations where the receiving units 600 described in the second invention are respectively arranged (Step S1 in FIG. 30). However, if a banknote has a deformed portion such as a creased portion, the deformed portion may be caught by a curved route of the transport tube 400, a joint of the tube wall constituting the transport tube, or the like, resulting in jam of the banknote. In this case, the transport body stops traveling due to resistance of the jammed banknote P. When the transport body suddenly stops, a situation occurs in which the transport body cannot move forward any more from the stopped position (halfway stop position) while the moving body rapidly traveling separates from the range of the close location relation against the repelling force based on the magnetic force, so that only the moving body moves ahead of the transport body (YES at Step S2 and YES at Step S3 in FIG. 30) as illustrated in FIG. 28(b).

In this case, at the time when it is detected that only the transport body 500 that is supposed to travel with the moving body stops halfway, the controlling unit 800 stops air blowing by the air-flow control apparatus 300 (the blower 310) to prevent damages of banknotes, so that the moving body 200 moving ahead is stopped. Thereafter, an operator performs jam processing such as removal of the banknotes from the transport body (Step S4) and the restoration operation to return the moving body to the proximity location to the transport body as illustrated in FIG. 28(a) is subsequently performed.

A distance L1 illustrated in FIG. 28(b) indicates a distance with which the moving body that cannot crawl in a location (the close location) immediately below the transport body due to the repelling force applied between the magnetic materials 213 and 523 can most approach the transport body.

The distance between the transport body and the moving body sometimes exceeds the distance L1 at a time when the moving body is stopped in association with halfway stop of the transport body 200. Even when the moving body is moved from this separation location toward the transport body, the distance L1 cannot be reduced.

In the restoration operation, the moving body separated from the transport body by at least the distance L1 as in FIG. 28(b) needs to be moved back toward the transport body to be returned to the normal location as illustrated in FIG. 28(a). However, since the repelling force between the magnetic materials is quite strong, the transport body moves away from the moving body when the moving body is attempted to be brought close to the transport body stopping halfway, and the distance L1 cannot be reduced, as explained in association with FIG. 34. Therefore, it is difficult to perform location relation restoration (docking) to the transport body stopping halfway by a usual method. Even when the transport body is moved by the moving body to the end portion stop position where the stopper 410 is installed and is stopped, and then the moving body is brought close to the transport body at a normal traveling speed to reduce the separation distance, it is impossible to enter the range of the close location against the strong magnetic repelling force.

In contrast thereto, according to the present invention, when the moving body 200 (the moving body magnetic material 213) and the transport body 500 (the transport body magnetic material 523) separate from the range of the close location relation as illustrated in FIG. 28(b), control for restoration described below is executed. That is, banknotes on the transport body 500 halfway stopped are first removed (Step S4 in FIG. 30). Next, by moving the moving body 200 in the retracting direction R with power of wind from the blower 310, the transport body 500 located in the middle of the transport body route, that is, at a halfway stop position is stopped at the predetermined end portion stop position, that is, the initial position illustrated in FIG. 29(a) to inhibit the movement in the retracting direction R with the stopper 410 (Step S5 and YES at Step S6). Subsequently, the moving body 200 at a location separated from the transport body by the distance L1 as in FIG. 28(b) is caused to travel in the direction P further away from the transport body 500 and is temporarily stopped at a predetermined location (a location of a distance L2) (FIG. 29(a), Step S7 and YES at Step S8 in FIG. 30). Meanwhile, the transport body stays at the end portion stop position. Subsequently, the moving body is caused to rapidly travel toward the transport body at a speed resistible against the repelling force between the magnetic materials, so that the moving body can be returned into the range of the close location relation as illustrated in FIG. 29(b) (Step S9, and YES at Step S10). The moving body is stopped when reaching the range of the close location relation (Step S11).

The motion states of the moving body and the transport body (whether these bodies are traveling or stopping, the timing thereof, and the travel directions), the current locations thereof, and the like are judged based on detection information from various sensors installed at appropriate places on the air blowing tube 100, the transport body route 400, and the like. The traveling speed of the moving body can be controlled by the air-flow control unit 300.

The above processing is the restoration processing performed in a case in which a situation where the transport body stops in the process of the moving body causing the transport body to travel in the forward direction P, and where the moving body separates from the range of the close location relation occurs.

The same situation and the same need for the restoration processing as described above may also occur in a process of the transport body traveling in the retracting direction R from the safe unit 700 to the initial position.

That is, when reaching the safe unit 700, the transport body 500 transfers all loaded banknotes onto the safe unit with a banknote transfer device (not illustrated), and thereafter starts moving in the retracting direction R to return to the initial position. Also in the process of moving in the retracting direction, a situation in which the transport body stops due to some reason, and the moving body moving ahead separates from the range of the close location relation is envisaged.

FIGS. 31(a) and 31(b) are a front view illustrating a state where the moving body causes the transport body to normally travel to return to the initial position after collection of banknotes and transfer of banknotes to the safe unit are completed, and a front view illustrating a state where the moving body solely travels ahead because the transport body has stopped. FIGS. 32(a) and 32(b) are front views for explaining a control procedure (a restoration method) for restoration.

In this case, at the time when stop of the transport body that is supposed to travel is detected, the controlling unit 800 stops the moving body by stopping the air-flow control apparatus 300 (the blower 310) to prevent damages of banknotes. Subsequently, an operator removes or solves the cause that has stopped the transport body and then the restoration operation for returning the moving body to the proximity location to the transport body as illustrated in FIG. 31(a) is performed.

In the restoration operation, control for restoration described below is executed. That is, by driving the blower 310 to move the moving body 200 in the retracting direction R with the air flow, the transport body 500 at the halfway stop position in the transport body route illustrated in FIG. 31(b) is stopped at the predetermined end portion stop position, that is, the end portion stop position on the side of the safe unit illustrated in FIG. 32(a) to inhibit movement in the forward direction P with the stopper 411. Next, the moving body 200 at a location away from the transport body is caused to travel in the direction R further away from the transport body 500 as in FIG. 32(a) and is temporarily stopped at a predetermined location (the distance L2). Meanwhile, the transport body stays at the end portion stop position. Subsequently, the moving body is caused to rapidly travel toward the transport body at a speed resistible against the repelling force between the magnetic materials, and the moving body is stopped at a time when returned into the range of the close location relation as illustrated in FIG. 32(b).

The value of the speed during high-speed movement of the moving body at the locations illustrated in FIG. 29(a) and FIG. 32(a) toward the transport body, that is, the speed for returning to a location immediately below the transport body while resisting the repelling force between the magnetic materials can be experimentally derived depending on intensities of the magnetic force that produces the repelling force or weights of the moving body.

The speed at the time when the transport body (the moving body) travels in the forward direction P and the retracting direction R during normal transport of banknotes is 1.5 m/sec to 2.0 m/sec while the traveling speed in the retracting direction R at the time of the restoration operation illustrated in FIG. 29(b) or the traveling speed in the forward direction P at the time of restoration operation illustrated in FIG. 32(b) is 3.0 m/sec to 4.0 m/sec.

This control for the restoration operation may be executed each time stop of the transport body is detected, or may be performed once each time the transport body performs a predetermined number of reciprocations (for example, one reciprocation) on the transport body route.

With the control procedure for restoration described above, when a situation in which the transport body (the transport body magnetic material) stops due to jam or the like during traveling in the predetermined direction and only the moving body (the moving body magnetic material) therefore separates from the transport body to move ahead, whereby movement of the transport body in conjunction with the moving body with the magnetic force is disabled occurs, the moving body can be effectively restored to a location proximate to the transport body.

Figure 33:
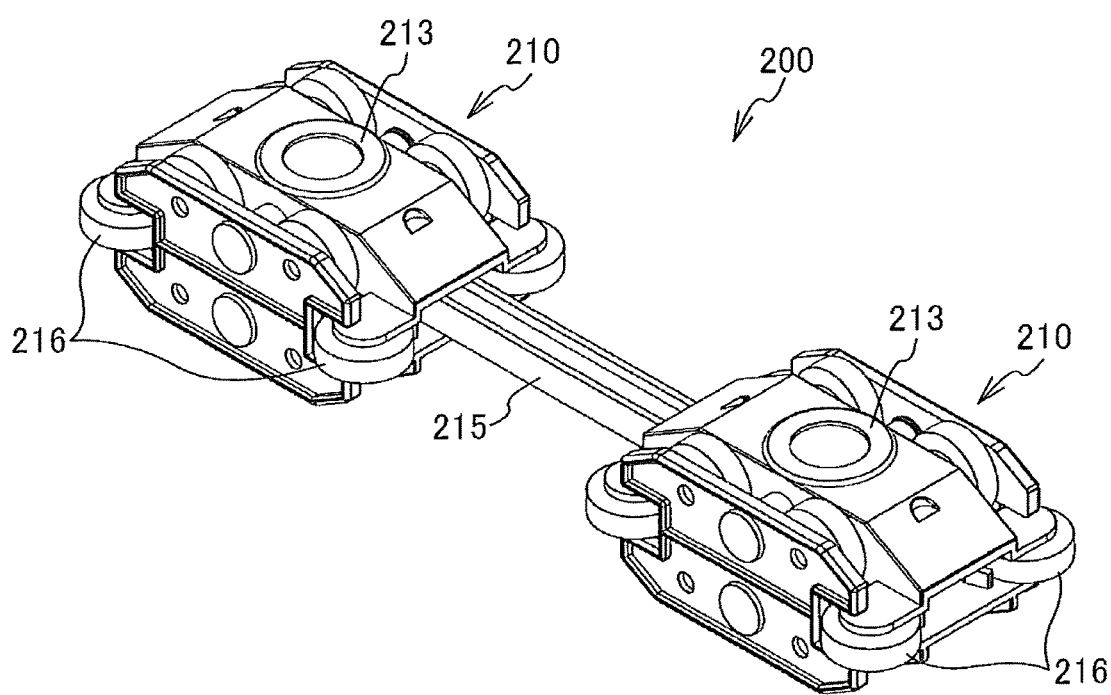
FIG. 33 is a perspective view illustrating another configuration example of the moving body.

The moving body 200 illustrated in FIGS. 28 to 32 has a different shape from the moving body illustrated in FIGS. 4, 7, 8, and the like. FIG. 33 is an exterior perspective view of the moving body 200 illustrated in FIGS. 28 to 32. The moving body 200 includes two divided pieces 210, and a shaft 215 coupling these divided pieces 210, and the divided pieces are pivotally supported by hinge parts (not illustrated) provided on both end portions of the shaft 215 to be rotatable in the horizontal direction, respectively. The moving body magnet 213 is arranged on the upper surface of each of the divided pieces 210, and rollers 216 are arranged at four corners of each of the divided pieces to enable smooth movement in the air blowing tube 100.

[Summary of Configurations, Actions, and Effects of Present Invention]

The paper sheet transport system 10 according to the present invention includes the paper sheet transport device C including the transport body route 401, the transport body 500 for paper sheet transport, that moves on the transport body route, and a plurality of the keeping parts 450 that are installed along the transport body route and that keep paper sheets to be transferred onto the transport body, the paper sheet receiving devices (the receiving units) 600 that are each arranged for each of the keeping parts to receive paper sheets input one by one from outside and to move the paper sheets to the associated keeping parts, the driving device that drives the paper sheet receiving devices and the paper sheet transport device C, and the controlling unit 800 that controls these components, wherein each of the paper sheet receiving devices includes the introducing part 610 that sequentially transfers (guides) an input paper sheet to the associated keeping part, the transport body includes the paper sheet collecting/retaining part (pickup unit) 540 that collects paper sheets stopped at the keeping parts in the process of passing the keeping parts, transfers the paper sheets onto the transport body, and retains the paper sheets in an upright state, the paper sheet collecting/retaining part includes a configuration to retain the paper sheets with one face of the following paper sheet stacked on one face of the preceding paper sheets already transferred thereon, and the controlling unit causes, when a paper sheet is stopped at each of the keeping parts, the following paper sheet input to the paper sheet receiving device to be received by the introducing part and to be kept therein.

According to the present invention, paper sheets kept in the keeping parts can be picked up and transferred onto the transport body without deceleration in the process of the transport body passing the keeping parts at a high speed. Accordingly, the paper sheet input from each of the receiving units and kept in the associated keeping part can be reliably and promptly collected and transferred onto the transport body. At the same time, a plurality of paper sheets can be stably transported without paper sheet jam while the paper sheets are aligned and retained.

Since the method of loading a paper sheet onto the transport body is a method of stacking the paper sheet on a side surface of already loaded paper sheets on the transport body, a loading failure due to collision with the existing paper sheets, and the like can be prevented. Particularly, paper sheets on the transport body and paper sheets in the keeping parts are configured in such a manner that the respective locations in the width direction are surely different and do not interfere with each other with the guide plate 460 interposed therebetween and accordingly collision of paper sheets can be reliably prevented. Even when either of the paper sheets has a deformed portion such as a creased portion, the risk of collision can be eliminated.

In the paper sheet transport system 10 according to the present invention, the paper sheet collecting/retaining part 540 includes the support member 541 that is erected on the transport base 510 moving on the transport body route 401, and the collecting members 544 installed on the support member, and the collecting members include a pair of collecting pawls pivotally supported by the support member to be openable and closable in a substantially horizontal direction. Each of the collecting pawls opens and closes between the spread position protruded outward in the width direction and the retracted position retracted inward in the width direction and is biased toward the spread position by the elastic member.

Only the collecting members of the transport body can be brought into contact with the rear end edge of a paper sheet in each of the keeping parts from behind to push and transport the paper sheet forward in the keeping part, extract the paper sheet from the keeping part into the transport path, and finally stack the paper sheet on the side surface of the already loaded paper sheets. When the transport body returns inside the transport path, the collecting members interfere with the paper sheets in the keeping parts. However, the collecting members change the position in the retracting direction against the biasing of the elastic member in the process of continuously moving in contact with the paper sheets. Therefore, the transport body can smoothly continue to move in the return direction without being affected by the kept paper sheets or affecting the kept paper sheets.

The paper sheet transport system (the transport mechanism) 10 according to the present invention includes the air blowing tube 100 that forms a flow path (the air flow path 101) of a gas, the moving body 200 that travels inside the air blowing tube while receiving an air flow flowing in a predetermined direction (the arrow-B direction and the arrow-C direction) within the air blowing tube, the transport path 401 (the transport tube 400) that has at least a portion arranged along the air blowing tube to be adjacent to the air blowing tube, and the transport body 3500 that is configured to be able to retain paper sheets (paper sheets P) and that travels inside the transport path. The moving body includes a moving body magnetic material (the moving body magnets 213), and the transport body includes a transport body magnetic material (the transport body magnets 523). At least one of the moving body magnetic material and the transport body magnetic material is formed of a magnet. The paper sheet transport mechanism is characterized in moving the transport body in conjunction with movement of the moving body receiving the air flow due to attraction and/or repulsion based on a magnetic force applied between the moving body magnetic material and the transport body magnetic material.

The moving body is caused to travel with the air flow and the transport body is caused to travel with a magnetic force in conjunction with movement of the moving body. Since no mechanical driving means such as a motor, a gear, and a transport belt are required to cause the moving body and the transport body to travel, the durability of members constituting the transport mechanism can be increased and the running cost of the transport mechanism can be reduced.

When a repelling force is to be applied between the transport body magnetic material and the moving body magnetic material, the transport body is less likely to be in contact with the transport path. As a result, reduction of the transport force due to generation of a frictional force or generation of dust due to contact of the members can be prevented.

Since the air blowing tube and the transport path have separate and independent configurations, an airtight flow path can be formed in the air blowing tube. Air leakage to outside the air blowing tube can be prevented and reduction in the transport force can be therefore prevented. An air flow generating device (the blower 310) that is relatively inexpensive and outputs low power can be adopted as a device that generates an air flow inside the air blowing tube and reduction in the cost of the transport mechanism is realized. Control of the air flow in the airtight air blowing tube is easy even when the transport distance of paper sheets is increased.

The air-flow control apparatus (the air-blow control unit 300) according to the present invention includes the air flow switching unit 320 that includes the first to fourth flow paths (323a to 323d) respectively connecting to external pipes, and the switching valve 325 arranged in a joint portion of the first to fourth flow paths and switching a communication state among the flow paths, the first circulation pipe 330 that has one end portion 330a communicatively connected to the first flow path 323a and the other end portion 330b communicatively connected to the second flow path 323b to form an air flow path in an endless manner through the air flow switching unit, the air flow generating device (the blower 310) that is arranged at an appropriate place in the first circulation pipe and that generates an air flow flowing in a certain direction inside the first circulation pipe, and the second circulation pipe (the air blowing tube 100) that has one end portion 100a connected to the third flow path 323c and the other end portion 100b connected to the fourth flow path 323d to form an air flow path in an endless manner through the air flow switching unit and that moves the moving body 200 arranged therein in a predetermined direction with the air flow.

The switching valve is characterized in being configured to be able to switch among the neutral position (FIG. 5(a)) for establishing communication between the first and second flow paths, the first communication position (FIG. 5(b)) for generating an air flow flowing in the first direction inside the second circulation pipe by establishing communication between the first and fourth flow paths and communication between the second and third flow paths, and the second communication position (FIG. 5(c)) for generating an air flow flowing in the second direction inside the second circulation pipe by establishing communication between the first and third flow paths and communication between the second and fourth flow paths.

According to the present aspect, while an air flow in a certain direction (the arrow-A direction) is generated by a single air flow generating device, three states including a state where no air flow is generated inside the air blowing tube, a state where an air flow flowing in the first direction (the arrow-B direction) is generated inside the air blowing tube, and a state where an air flow flowing in the second direction (the arrow-C direction) is generated inside the air blowing tube can be switched by changing the position of the switching valve.

The paper sheet transport system (the transport mechanism) 10 according to the present invention includes the air flow generating device 310 that generates an air flow and that can adjust the flow speed and the flow volume of the generated air flow, the air blowing tube 100 that forms therein a flow path of the air flow generated by the air flow generating device, the switching unit 320 that controls the direction of the air flow in the air blowing tube, the controlling unit 800 that controls the air flow generating device and the switching unit, the moving body 200 that travels inside the air blowing tube while receiving the air flow flowing within the air blowing tube, the transport body routes 400 and 401 having at least a portion arranged along the air blowing tube to be adjacent to the air blowing tube, and the transport body 500 configured to be able to retain paper sheets and traveling inside the transport body route, the moving body 200 includes the moving body magnetic material 213, the transport body includes the transport body magnetic material 523, a configuration to move the transport body in conjunction with movement of the moving body due to repulsion based on a magnetic force applied between the moving body magnetic material and the transport body magnetic material when the moving body magnetic material and the transport body magnetic material are in a close location relation is included, and when the moving body separates from a range of the close location relation due to halfway stop of the transport body in a process of the moving body moving the transport body in the close location relation in a predetermined direction, the controlling unit causes the moving body to move the transport body in an opposite direction to an original travel direction to stop the transport body at a predetermined end portion stop position, subsequently causes only the moving body to travel in a direction further away from the transport body to temporarily stop the moving body, and then returns the moving body into the range of the close location relation by causing the moving body to travel toward the transport body at a speed resistible against the repelling force.

The transport body rapidly traveling in the narrow transport body route while having paper sheets loaded thereon is supposed to be stuck and stopped in the middle due to paper sheet jam or some other causes. In this case, the moving body traveling to move the transport body moves ahead beyond the range of magnetic repulsion from the transport body, and these bodies are in a separated state. In the present invention, after the cause of the stop of the transport body is removed, the transport body is moved to the end portion stop position and is stopped to return the moving body to a close location to the transport body. Subsequently, the moving body is moved to a location sufficiently away from the transport body and is then moved toward the transport body at a high speed, thereby being returned into the range of the close location.

Since the work for restoration, which is performed after the cause of the stop of transport body stopped halfway is removed, can be automatically and quickly performed as a series of operations, the operation ratio of the paper sheet transport system is not greatly lowered.

The restoration method in the paper sheet transport system 10 according to the present invention includes a step of causing the moving body to move the transport body in an opposite direction to an original travel direction to stop the transport body at a predetermined end portion stop position when the moving body moves ahead and separates from a range of the close location relation due to halfway stop of the transport body in a process of the moving body 200 moving the transport body in the close location relation in a predetermined direction, a step of subsequently causing only the moving body to travel in a direction further away from the transport body to temporarily stop the moving body, and a step of returning the moving body into the range of the close location relation by causing the moving body to travel from a location of the temporary stop toward the transport body at a speed resistible against the repelling force, in the paper sheet transport system including the configuration described above.

According to this restoration method, the work for restoration, which is performed after the cause of the stop of the transport body stopped halfway is removed, can be automatically and quickly performed as a series of operations. Therefore, the operation ratio of the paper sheet transport system is not greatly lowered.

REFERENCE SIGNS LIST

L bank facility, P banknote (paper sheet), 1 game machine, 2 sandwiched machine, 10 banknote transport system (paper sheet transport mechanism), 100 air blowing tube (second circulation pipe), 100a one end portion, 100b other end portion, 101 air flow path, 110 first air blowing tube, 111 moving route part, 120 second air blowing tube, 130, 131 stopper, 200 moving body, 210 divided piece, 211 hinge part, 213 moving body magnet (moving body magnetic material), 300 air-blow control unit (air-flow control apparatus), 310 blower (air flow generating device), 320 switching unit, 321 casing, 323 flow path, 325 switching valve, 330 first circulation pipe, 330a one end portion, 330b other end portion, 331 discharge tube, 333 intake tube, 340 connection pipe, C banknote (paper sheet) transport device, 400 transport tube, 401 transport path (transport body route), 402 base transport path, 403 banknote (paper sheet) transport path, 405 concave portion, 410, 411 stopper, 450 keeping part, 460, 465 guide plate, 500 transport body, 510 transport base, 520 divided piece, 520a internal space, 520b projection, 520c inner region, 521 hinge part, 523 transport body magnet (transport body magnetic material), 525 roller, 540 banknote collecting/retaining part, 541 support member, 541a pivotally support part, 541b spring (elastic member), 544 collecting pawl (collecting member), 545 roller, 600 receiving unit (paper sheet receiving device), 601 body, 605 paper sheet receiving part, 610 introducing part, 612 introducing route, 613 first introducing route part, 613a entrance route part, 613b keeping route part, 615 second introducing route part, 617 inversion roller, 619 inversion path (inversion part), 620 transport mechanism, 630 recognition unit, 700 safe unit, 800 management unit (controlling unit), 801 body

The invention claimed is:

1. A paper sheet transport system comprising:
an air flow generating device, an air blowing tube that forms therein a flow path of an air flow generated by the air flow generating device, a switching unit that controls switching of directions of an air flow in the air blowing tube, a controlling unit that controls the air flow generating device and the switching unit;
a moving body that travels inside the air blowing tube while receiving an air flow flowing within the air blowing tube;
a transport body route having at least a portion arranged along the air blowing tube to be adjacent to the air blowing tube; and
a transport body configured to be able to retain paper sheets and traveling inside the transport body route, wherein
the moving body includes a moving body magnetic material, and the transport body includes a transport body magnetic material,
a configuration to move the transport body in conjunction with movement of the moving body due to repulsion based on a magnetic force applied between the moving body magnetic material and the transport body magnetic material when the moving body magnetic material and the transport body magnetic material are in a close location relation is included, and
when the moving body moves ahead and separates from a range of the close location relation due to halfway stop of the transport body in a process of the moving body moving the transport body in the close location relation in a predetermined direction, the controlling unit causes the moving body to move the transport body in an opposite direction to an original travel direction to stop the transport body at a predetermined end portion stop position, subsequently causes only the moving body to travel in a direction further away from the transport body to temporarily stop the moving body, and then returns the moving body into the range of the close location relation by causing the moving body to travel toward the transport body at a speed resistible against a repelling force.

2. A restoration method in a paper sheet transport system comprising:
an air flow generating device, an air blowing tube that forms therein a flow path of an air flow generated by the air flow generating device, a switching unit that controls switching of directions of an air flow in the air blowing tube;
a moving body that travels inside the air blowing tube while receiving an air flow flowing within the air blowing tube;
a transport body route having at least a portion arranged along the air blowing tube to be adjacent to the air blowing tube;
a transport body configured to be able to retain paper sheets and traveling inside the transport body route; and
a moving body magnetic material included in the moving body, and a transport body magnetic material included in the transport body, and
including a configuration to move the transport body in conjunction with movement of the moving body due to repulsion based on a magnetic force applied between the moving body magnetic material and the transport body magnetic material when the moving body magnetic material and the transport body magnetic material are in a close location relation, the method comprising:
a step of causing the moving body to move the transport body in an opposite direction to an original travel direction to stop the transport body at a predetermined end portion stop position when the moving body moves ahead and separates from a range of the close location relation due to halfway stop of the transport body in a process of the moving body moving the transport body in the close location relation in a predetermined direction;

a step of subsequently causing only the moving body to travel in a direction further away from the transport body to temporarily stop the moving body; and a step of returning the moving body into the range of the close location relation by causing the moving body to travel from a location of a temporary stop toward the transport body at a speed resistible against a repelling force.

\* \* \* \* \*